US012166292B2

(12) United States Patent
Feng et al.

(10) Patent No.: US 12,166,292 B2
(45) Date of Patent: Dec. 10, 2024

(54) ANTENNA AND COMMUNICATION SYSTEM

(71) Applicants: Beijing BOE Sensor Technology Co., Ltd., Beijing (CN); BOE Technology Group Co., Ltd., Beijing (CN)

(72) Inventors: Chunnan Feng, Beijing (CN); Zhifeng Zhang, Beijing (CN); Yong Li, Beijing (CN); Haoyang Zhang, Beijing (CN); Chuncheng Che, Beijing (CN); Jingjun Du, Beijing (CN); Jiaqiang Wang, Beijing (CN); Feng Qu, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/772,841

(22) PCT Filed: Jun. 25, 2021

(86) PCT No.: PCT/CN2021/102350

§ 371 (c)(1),
(2) Date: Apr. 28, 2022

(87) PCT Pub. No.: WO2022/088714

PCT Pub. Date: May 5, 2022

(65) Prior Publication Data

US 2024/0162616 A1 May 16, 2024

(30) Foreign Application Priority Data

Oct. 30, 2020 (CN) ........................ 202011198060.0

(51) Int. Cl.
*H01Q 1/36* (2006.01)
*H01Q 9/04* (2006.01)
*H01Q 21/08* (2006.01)

(52) U.S. Cl.
CPC ............ *H01Q 9/0414* (2013.01); *H01Q 1/36* (2013.01); *H01Q 21/08* (2013.01); *H01Q 9/045* (2013.01)

(58) Field of Classification Search
CPC .. H01Q 1/36; H01Q 1/38; H01Q 3/34; H01Q 9/0414; H01Q 9/045; H01Q 21/06; H01Q 21/08; H01Q 21/24
See application file for complete search history.

(56) References Cited

U.S. PATENT DOCUMENTS

2013/0187830 A1 7/2013 Warnick et al.
2019/0363452 A1* 11/2019 Ting ...................... G02F 1/1313

FOREIGN PATENT DOCUMENTS

CN 111063996 A * 4/2020 ............... H01Q 1/38

OTHER PUBLICATIONS

Supplemental Partial European Search Report issued on Dec. 22, 2023, for application No. CN21884455.3.

* cited by examiner

*Primary Examiner* — Jimmy T Vu
(74) *Attorney, Agent, or Firm* — Nath, Goldberg & Meyer; Joshua B. Goldberg

(57) ABSTRACT

An antenna according to an embodiment of the present disclosure includes a first substrate, the first substrate includes: a first base substrate; at least one first radiation unit on a side of the first base substrate; a first electrode layer on a side of the first base substrate away from the at least one first radiation unit; and at least one second radiation unit on a side of the at least one first radiation unit away from the first electrode layer; wherein an orthographic projection of (Continued)

each second radiation unit on the first base substrate at least partially overlaps an orthographic projection of one first radiation unit on the first base substrate; and an orthographic projection of the at least one first radiation unit on the first base substrate is within an orthographic projection of the first electrode layer on the first base substrate.

19 Claims, 20 Drawing Sheets

| Name | Theta | Ang | Mag |
|---|---|---|---|
| m1 | 360.0000 | -0.0000 | 12.3568 |
| m2 | 318.0000 | -42.0000 | -2.3239 |
| m3 | 42.0000 | 42.0000 | -2.9688 |

ANTENNA AND COMMUNICATION SYSTEM

This is a National Phase Application filed under 35 U.S.C. 371 as a national stage of PCT/CN2021/102350, filed Jun. 25, 2021, an application claiming the benefit of Chinese Patent Application No. 202011198060.0 entitled "antenna and communication system" filed on Oct. 30, 2020, the content of each of which is hereby incorporated by reference in its entirety.

TECHNICAL FIELD

The present disclosure belongs to the communication field, and particularly relates to an antenna and a communication system.

BACKGROUND

An antenna generally includes a first substrate, wherein the first substrate includes a first base substrate, a first radiation unit arranged on a side of the first base substrate and a feeding structure arranged in a same layer as the first radiation unit and electrically connected to the first radiation unit. A reference electrode layer is arranged on a side of the first base substrate away from the first radiation unit and the feeding structure. A radio frequency signal is input to the feeding structure, and then transmitted to the first radiation unit through the feeding structure. A radiation area of the first radiation unit is small, so that the radiation efficiency is low.

SUMMARY

The present disclosure is directed to at least one of the problems of the prior art, and provides an antenna for improving the radiation efficiency.

In a first aspect, an embodiment of the present disclosure provides an antenna, including a first substrate, wherein the first substrate includes:

a first base substrate;

at least one first radiation unit on a side of the first base substrate;

a first electrode layer on a side of the first base substrate away from the at least one first radiation unit; and at least one second radiation unit on a side of the at least one first radiation unit away from the first electrode layer, wherein an orthographic projection of each of the at least one second radiation unit on the first base substrate at least partially overlaps an orthographic projection of a corresponding one of the at least one first radiation unit on the first base substrate; and an orthographic projection of the at least one first radiation unit on the first base substrate is within an orthographic projection of the first electrode layer on the first base substrate.

In the antenna according to the embodiment of the present disclosure, the at least one first radiation unit and the at least one second radiation unit cooperate to radiate a radio frequency signal, so that compared with an antenna only provided with the first radiation unit, a clearance height of the antenna is effectively increased, and therefore the radiation efficiency is improved.

In some examples, the antenna further includes a second electrode layer, which is in a same layer as the at least one first radiation unit, and the orthographic projection of the at least one first radiation unit on the first base substrate does not overlap an orthographic projection of the second electrode layer on the first base substrate.

In some examples, the first base substrate includes a first side extending in a first direction; the second electrode layer includes at least one second sub-electrode; each of the at least one second sub-electrode is on a side of one of the at least one first radiation unit close to the first side;

each of the at least one second sub-electrode includes a first structure and a second structure; the first structure extends along the first direction, and the second structure extends along a second direction; and the first direction intersects with the second direction.

In some examples, the second structure is connected to a midpoint of the first structure in the first direction, and the first direction is perpendicular to the second direction; wherein a width of the first structure is less than a width of the second structure.

In some examples, the antenna further includes a first feeding unit, which is in a same layer as the at least one first radiation unit; the first feeding unit includes a plurality of first feeding lines, and each of the at least one first radiation unit is electrically connected to at least one of the plurality of first feeding lines.

In some examples, every two of the plurality of first feeding lines are electrically connected to one of the at least one first radiation unit, and for each of the at least one first radiation unit, one of the at least one second sub-electrode is between the two first feeding lines electrically connected to the first radiation unit, to isolate signals in the two first feeding lines from each other.

In some examples, the antenna further includes a third electrode layer, which is in a same layer as the at least one second radiation unit, and an orthographic projection of the at least one second radiation unit on the first base substrate does not overlap an orthographic projection of the third electrode layer on the first base substrate.

In some examples, the first base substrate further includes a second side extending in a first direction; an orthographic projection of the third electrode layer on the first base substrate is on a side of the first base substrate close to the second side;

the third electrode layer includes a main body structure, and a first extension structure and a second extension structure which are connected to both sides of the main body structure, respectively, the main body structure extends along the first direction, and the first extension structure and the second extension structure both extend along a second direction; wherein the first direction and the second direction intersect with each other.

In some examples, the first direction and the second direction are perpendicular to each other; a length of the main body structure in the first direction is less than or equal to that of the second side.

In some examples, the antenna further includes a first feeding unit, which is in a same layer as the at least one first radiation unit; the first feeding unit includes a plurality of first feeding lines, and every two of the plurality of first feeding lines are electrically connected to one of the at least one first radiation unit.

In some examples, each of the at least one first radiation unit has a shape of a centrosymmetric pattern having a symmetry center, for each of the at least one first radiation unit, a position where one of the two first feeding lines is connected to the first radiation unit is a first connecting point, and a position where the other of the two first feeding lines is connected to the first radiation unit is a second connecting point, and wherein for each of the at least one first radiation unit, an extending direction of a connecting line between the first connecting point and the symmetry center intersects of the first radiation unit with an extending direction of a connecting line between the second connecting point and the symmetry center of the first radiation unit.

In some examples, for each of the at least one first radiation unit, the extending direction of the connecting line between the first connecting point and the symmetry center of the first radiation unit is perpendicular to the extending direction of the connecting line between the second connecting point and the symmetry center of the first radiation unit.

In some examples, the antenna further includes a second substrate; the second substrate includes a second base substrate and a second feeding unit on a side of the second base substrate and electrically connected to the first feeding unit.

In some examples, the second base substrate and the first base substrate have a one-piece structure, and the second feeding unit is in a same layer as the at least one first radiation unit.

In some examples, an included angle is between the second substrate and the first substrate.

In some examples, the at least one first radiation unit is of a mesh structure; wherein a unit area of an orthographic projection of the second feeding unit on the second base substrate is greater than a unit area of the orthographic projection of the at least one first radiation unit on the first base substrate.

In some examples, the second feeding unit includes a first feeding sub-unit and a second feeding sub-unit, each of the first feeding sub-unit and the second feeding sub-unit includes one first port and at least one second port;

for each of the at least one first radiation unit, one of the two first feeding lines electrically connected to the first radiation unit is electrically connected to one of the at least one second port of the first feeding sub-unit, and different first feeding lines are connected to different second ports of the first feeding sub-unit, respectively; the other of the two first feeding lines electrically connected to the first radiation unit is electrically connected to one of the at least one second port of the second feeding sub-unit, and different first feeding lines are connected to different second ports of the second feeding sub-unit, respectively.

In some examples, each of the at least one first radiation unit has an area greater than an area of each of the at least one second radiation unit, and an orthographic projection of each of the at least one second radiation unit on the first base substrate overlaps an orthographic projection of a corresponding first radiation unit on the first base substrate and is within the orthographic projection of the corresponding first radiation unit on the first base substrate.

In some examples, each of the at least one first radiation unit has an area less than an area of each of the at least one second radiation unit, and an orthographic projection of each of the at least one first radiation unit on the first base substrate overlaps an orthographic projection of a corresponding second radiation unit on the first base substrate and is within the orthographic projection of the corresponding second radiation unit on the first base substrate.

In some examples, at least one of the at least one first radiation unit, the at least one second radiation unit and the first electrode layer is of a mesh structure.

In some examples, both the at least one first radiation unit and the at least one second radiation unit are of a mesh structure; wherein metal wires for the mesh structure are not connected to each other at edges of each of the at least one first radiation unit and/or each of the at least one second radiation unit; or the metal wires for the mesh structure are short connected to each other at the edges of each of the at least one first radiation unit and/or each of the at least one second radiation unit.

In some examples, all the at least one first radiation unit, the at least one second radiation unit and the first electrode layer are of a mesh structure; and projections of hollow portions of the mesh structures of the at least one first radiation unit, the at least one second radiation unit and the first electrode layer on the first base substrate substantially overlap each other.

In some examples, a ratio of an area of an orthographic projection of each of the at least one first radiation unit on the first base substrate to an area of an orthographic projection of each of the at least one second radiation unit on the first base substrate ranges from 0.45:1 to 1.54:1.

In some examples, the antenna further includes a third substrate, which is on a side of the first substrate away from the first electrode layer; the third substrate includes a third base substrate; wherein the at least one second radiation unit is on a side of the third base substrate.

In some examples, the antenna further includes a fourth substrate, which is on a side of the first substrate away from the at least one first radiation unit; the fourth substrate includes a fourth base substrate; wherein the first electrode layer is on a side of the fourth base substrate close to the first substrate.

In some examples, the first substrate further includes a first metal mesh layer, which is on a side of the first base substrate away from the first electrode layer; the first metal mesh layer includes the at least one first radiation unit; and the first metal mesh layer has at least one first cutout therein, and each of the at least one first cutout separates out one of the at least one first radiation unit.

In some examples, the antenna further includes a third substrate, which is arranged on a side of the first substrate away from the first electrode layer; the third substrate includes a third base substrate and a second metal mesh layer on a side of the third base substrate away from the first base substrate; the second metal mesh layer includes the at least one second radiation unit; and the second metal layer has at least one second cutout therein, and each of the at least one second cutout separates out one of the at least one second radiation unit.

In some examples, at least one first groove is on a side of the first base substrate away from the at least one first radiation unit, and an orthographic projection of each of the at least one first groove on the first base substrate covers an orthographic projection of a corresponding one of the at least one first radiation unit on the first base substrate.

In some examples, the antenna further includes a first feeding unit, which is in a same layer as the at least one first radiation unit; the first feeding unit includes a plurality of first feeding lines, and every two of the plurality of first feeding lines are connected to one of the at least one first radiation unit; and wherein the orthographic projection of each of the at least one first groove on the first base substrate covers orthographic projections of the two first feeding lines connected to the corresponding first radiation unit on the first base substrate.

In some examples, a ratio of an area of the orthographic projection of each of the at least one first groove on the first base substrate to an area of an orthographic projection of each of the at least one first radiation unit on the first base substrate ranges from 5:1 to 2:1; and a symmetry axis of each of the at least one first radiation unit in a first direction and a symmetry axis of a corresponding first groove in the first direction substantially coincide with each other, where an orthographic projection of the first radiation unit on the first base substrate overlaps an orthographic projection of the corresponding first groove on the first base substrate.

In some examples, the first base substrate is divided by the second base substrate into a first region and a second region along a length direction of the first base substrate; and a width of the first region in a direction perpendicular to the length direction of the first base substrate is less than a width of the second region in the direction perpendicular to the length direction of the first substrate.

In some examples, the antenna further includes a third substrate, which is on a side of the first substrate away from the first electrode layer; the third substrate includes a third base substrate and a surrounding plate obliquely arranged at an edge of the third base substrate; wherein the at least one second radiation unit is on a side of the third base substrate away from the at least one first radiation unit;

the antenna further includes a fourth substrate, which is on a side of the first substrate away from the at least one first radiation unit; the fourth substrate includes a fourth base substrate; wherein the first electrode layer is on a side of the fourth base substrate close to the first substrate; and the second base substrate, a part of the third base substrate corresponding to the first region, the surrounding plate closest to the second base substrate and a part of the third base substrate corresponding to the first region define an accommodating space.

In a second aspect, an embodiment of the present disclosure provides a communication system, which includes the above antenna.

DETAIL DESCRIPTION OF EMBODIMENTS

Figure 1:
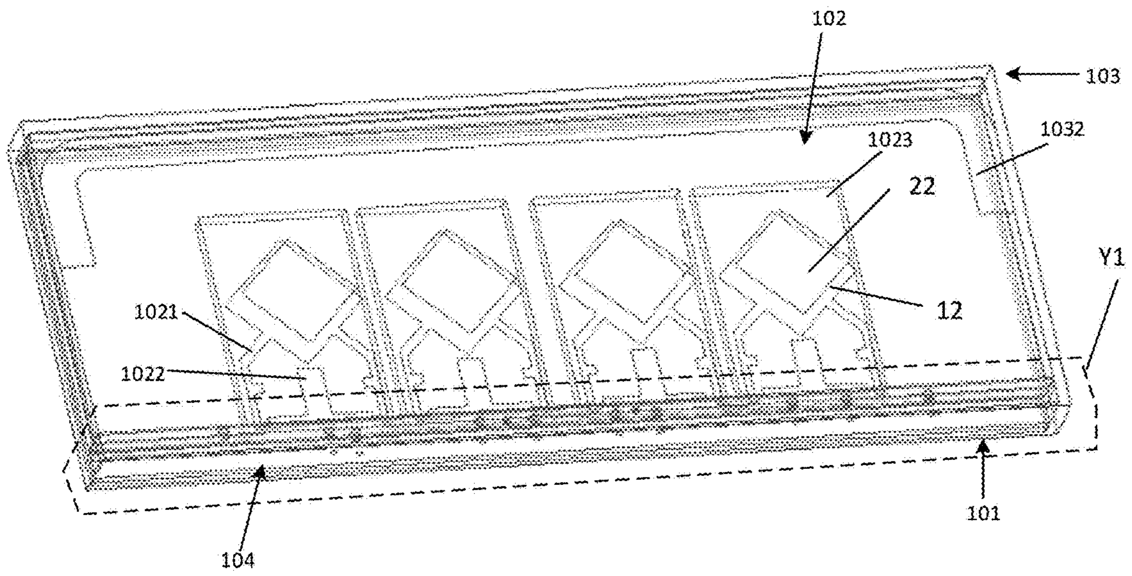
FIG. 1 is a schematic diagram of a structure of an antenna according to an embodiment of the present disclosure.

In order to make the objects, technical solutions and advantages of the present disclosure more apparent, the present disclosure will be described below in further detail with reference to the accompanying drawings. Obviously, the described embodiments are only some, but not all, embodiments of the present disclosure. All other embodiments, which may be obtained by one of ordinary skill in the art without any creative effort based on the embodiments in the present disclosure, belong to the protection scope of the present disclosure.

Shapes and sizes of components in the drawings do not reflect an actual scale, but are merely intended to facilitate an understanding of the contents of the embodiments of the present disclosure.

Unless defined otherwise, technical or scientific terms used herein shall have the ordinary meaning as understood by one of ordinary skill in the art to which the present disclosure belongs. The words “first”, “second”, and the like used in the present disclosure do not denote any order, quantity, or importance, but rather distinguish one element from another element. Likewise, the word “a”, “an”, or “the” or the like does not denote a limitation of quantity, but rather denotes the presence of at least one. The word “comprising” or “comprises”, or the like, means that the element or item preceding the word includes the element or item listed after the word and its equivalent, but does not exclude other elements or items. The word “connected” or “coupled” or the like is not restricted to physical or mechanical connections, but may include electrical connections, whether direct or indirect. “Upper”, “lower”, “left”, “right”, and the like are used only to indicate relative positional relationships, and when the absolute position of the object being described is changed, the relative positional relationships may also be changed accordingly.

It should be noted that in the present embodiment, a shape of an antenna is not limited, and may be, for example, a rectangle, a circle, a hexagon, or the like, and alternatively may be other shapes. The following descriptions are given by taking a rectangular antenna as an example. When the antenna is rectangular, circular, hexagonal, etc., a first substrate is correspondingly rectangular, circular, hexagonal, etc. adapted (conforming) to the antenna. The first substrate is hereinafter described as being rectangular. In an embodiment where the first substrate is rectangular, the first substrate has a first side and a second side opposite to each other, and a third side and a fourth side opposite to each other, wherein the first side and the second side both extend along a first direction S1, and the third side and the fourth side both extend along a second manner S2, wherein the first direction S1 is a length direction of a long side of the first substrate, the second direction S2 is a length direction of a short side of the first substrate. The first direction S1 intersects with the second direction S2, and a specific angle may be changed according to a shape of the first substrate. In the embodiment where the first substrate is rectangular, the first direction S1 is perpendicular to the second direction S2. The following descriptions are given by taking an example that the first direction S1 and the second direction S2 are perpendicular to each other.

The embodiments of the present disclosure are not limited to the embodiments shown in the drawings, but include modifications of configurations formed based on a manufacturing process. Thus, a region illustrated in the drawings has a schematic property, and a shape of the region shown in the figure illustrates a specific shape of the region of an element, but is not intended to be limiting.

An embodiment of the present disclosure provides an antenna including a first substrate, wherein the first substrate includes: a first base substrate, one or more first radiation units arranged on a side of the first base substrate, and a first electrode layer arranged on a side of the first base substrate away from the one or more first radiation units. The antenna further includes one or more second radiation units arranged on a side of the one or more first radiation units away from the first electrode layer. An orthographic projection of each second radiation unit on the first base substrate at least partially overlaps an orthographic projection of a corresponding first radiation unit on the first base substrate. In some examples, the first radiation units and the second radiation units may be in a one-to-one correspondence with each other, i.e., an orthographic projection of one second radiation unit on the first base substrate at least partially overlaps an orthographic projection of a corresponding first radiation unit on the first base substrate, and orthographic projections of different second radiation units on the first base substrate at least partially overlap orthographic projections of corresponding first radiation units on the first base substrate, respectively. Furthermore, an orthographic projection of at least one first radiation unit on the first base substrate is within an orthographic projection of the first electrode layer on the first base substrate. The first electrode layer is an electrode layer for providing a reference voltage.

For example, in an embodiment of the antenna shown in FIGS. 1 to 10, the first electrode layer includes a first reference electrode layer 1012. For another example, in an embodiment of the antenna shown in FIGS. 16 to 34, the first electrode layer includes a reference electrode layer 23. The one or more first radiation units and the one or more second radiation units cooperate to radiate a radio frequency signal, so that compared with an antenna only provided with a first radiation unit, a clearance height of the antenna is effectively increased, and therefore the radiation efficiency is improved.

An antenna in an embodiment of the present disclosure is specifically described below.

In a first aspect, referring to FIGS. 1 to 10, an embodiment of the present disclosure provides an antenna, which may include a first substrate 102, wherein the first substrate 102 includes a first base substrate 21, and at least one first radiation unit 12 is provided on a side of the first base substrate 21. In this embodiment, a first electrode layer includes a first reference electrode layer 1021, and the first reference electrode layer 1021 is arranged on a side of the first base substrate 21 away from the at least one first radiation unit 12.

In some examples, the antenna may further include a fourth substrate 101 and a third substrate 103 which are aligned and assembled to form a cell, the first substrate 102 is arranged on the fourth substrate 101 and the third substrate 103, and the antenna may further include a second substrate 104 obliquely arranged on the first substrate 102.

Figure 4:
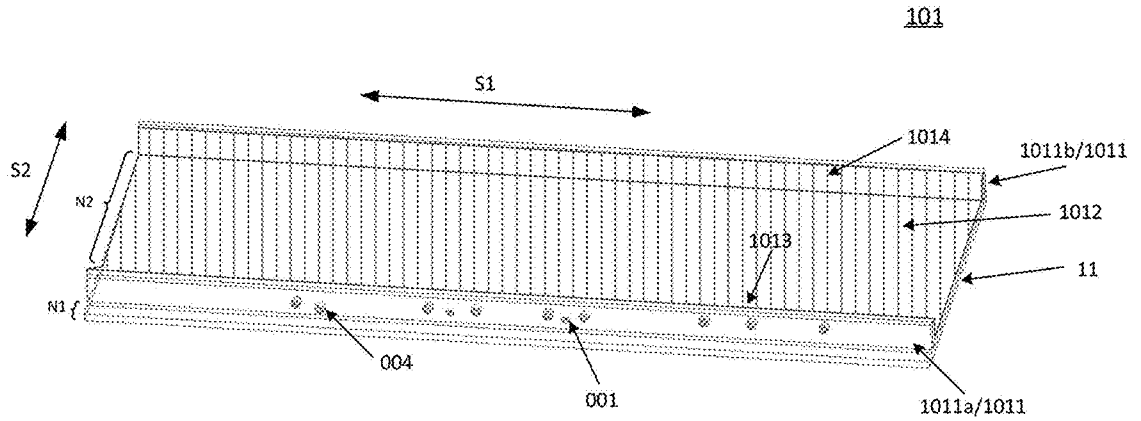
FIG. 4 is a schematic diagram of a structure of a bottom plate of an antenna according to an embodiment of the present disclosure.

Specifically, referring to FIG. 4, the fourth substrate 101 includes a fourth base substrate 11, at least one side plate 1011, and the first reference electrode layer 1012. The at least one side plate 1011 is connected to the fourth base substrate 11 in a length direction (for example, a first direction S1 shown in the figure). A certain included angle exists between the at least one side plate 1011 and the fourth base substrate 11, the included angle may range from 0° to 180°. In the following embodiments, all descriptions are given by taking an example in which the at least one side plate 1011 is perpendicular to the fourth base substrate 11 (the included angle is 90°). The first reference electrode layer 1012 is arranged on a side of the fourth base substrate 11 close to the first substrate 102.

Figure 5:
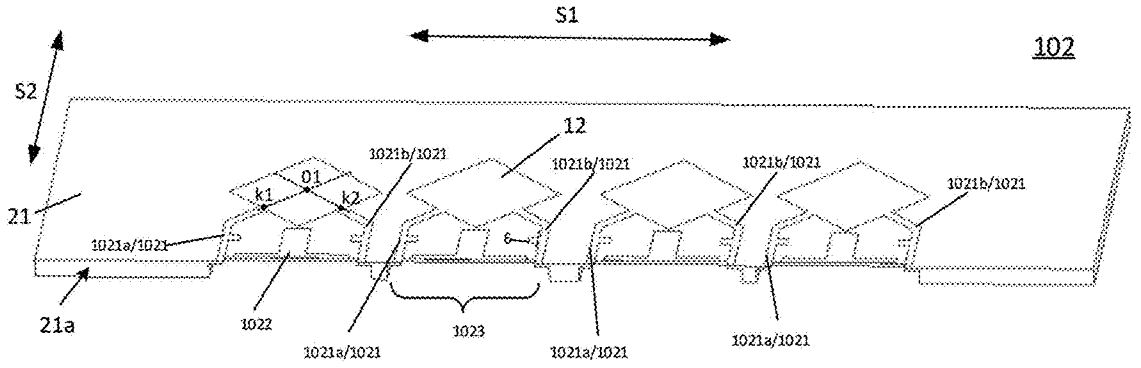
FIG. 5 is a schematic diagram of a structure of a substrate of an antenna according to an embodiment of the present disclosure.

Further, referring to FIG. 5, the first substrate 102 is arranged on the fourth base substrate 11 of the fourth substrate 101, and the first substrate 102 includes the first base substrate 21, the at least one first radiation unit 12, and at least one first feeding line 1021. The first base substrate 21 is arranged on a side of the fourth base substrate 11 close to the third substrate 103, and a side portion 21*a* of the first base substrate 21 along the length direction (for example, the first direction S1 as shown in the figure) abuts against one side plate 1011 of the fourth substrate 101. The at least one first radiation unit 12 is arranged on a side of the first base substrate 21 away from the fourth substrate 101, and an orthographic projection of the at least one first radiation unit 12 on the first base substrate 21 at least partially overlaps an orthographic projection of the first reference electrode layer 1012 on the first base substrate 21.

In some examples, the antenna further includes a first feeding unit, the first feeding unit is arranged in a same layer as the at least one first radiation unit 12, and the first feeding unit may include a plurality of first feeding lines 1021. The at least one first feeding line 1021 is electrically connected to one first radiation unit 12. For example, in a dual-polarized antenna, every two first feeding lines 1021 are electrically connected to one first radiation unit 12. Alternatively, one first feeding line 1021 may be electrically connected to one first radiation unit 12, or four first feeding lines 1021 may be electrically connected to one first radiation unit 12, or the like, which is not limited herein. In the following embodiments, as an example, every two first feeding lines 1021 are electrically connected to one first radiation unit 12. Specifically, a first end of each first feeding line 1021 is connected to one first radiation unit 12, and a second end of the first feeding line 1021 extends to an edge of the first base substrate 21, and the edge of the first base substrate 21 is close to the side portion 21*a* abutting against the side plate 1011. In the antenna according to the embodiment of the present disclosure, the first feeding lines 1021 are all led out toward a same side (the edge close to the side portion 21*a*), so that a feeding structure for receiving a signal may be provided on only one side.

In some examples, referring to FIG. 5, the antenna further includes a plurality of impedance matching structures 6, which are electrically connected to the first feeding unit for matching the first feeding unit with a second feeding unit. In some examples, the impedance matching structures 6 are in a one-to-one correspondence with the first feeding lines, each first feeding line is connected to one impedance matching structure 6.

For convenience of description, in the following, as an example, the fourth substrate 101 includes two side plates 1011, namely a first side plate 1011*a* and a second side plate 1011*b*. The first side plate 1011*a* and the second side plate 1011*b* are arranged on opposite sides which are along the length direction of the fourth base substrate 11. For convenience of description, in the following, as an example, the side portion 21*a* of the first base substrate 21 of the first substrate 102 abuts against the first side plate 1011*a*.

Further, the antenna may further include the second substrate 104, the second substrate 104 includes a second base substrate 1041, and a second feeding unit 1042 arranged on a side of the second base substrate 1041. The second feeding unit 1042 is electrically connected to the first feeding unit, and feeds a signal to the first radiation unit 12 through the first feeding unit. In some examples, for example, in the embodiment of the antenna shown in FIGS. 1 to 10, the second base substrate 1041 is arranged obliquely with respect to the first base substrate 102, that is, there is an included angle between the second base substrate 1041 an the first base substrate 102. The second base substrate 1041 is arranged close to the side portion 21*a* of the first substrate 102, and the second feeding unit 1042 is arranged on a side of the second base substrate 1041 away from the side portion 21*a*, and feeds a signal to the first feeding unit (specifically, the first feeding line) side-on. In some examples, for example, in the embodiments of the antenna shown in FIGS. 16 to 34, the second base substrate 1041 and the first base substrate 21 have a one-piece structure, that is, the second feeding unit 1042 and the first feeding unit are arranged in a same layer and have a one-piece structure, and the second feeding unit 1042 is arranged in a same layer as the first radiation unit 12.

Figure 9:
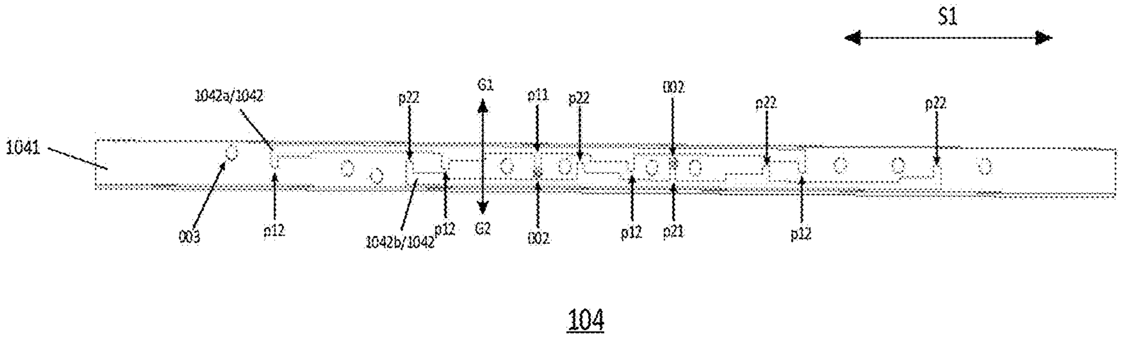
FIG. 9 is a schematic diagram of a structure of a first circuit board of an antenna according to an embodiment of the present disclosure.
Figure 10A:
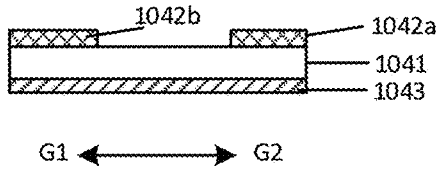
FIG. 10*a* is a cross-sectional view taken along a line G1-G2 in FIG. 9.

Specifically, in some examples, referring to FIGS. 9 and 10, FIG. 10 is a cross-sectional view taken along a line G1-G2 in FIG. 9. The antenna according to an embodiment of the present disclosure further includes the second substrate 104, and the second substrate 104 is arranged on a side of the first side plate 1011*a* away from the side portion 21*a* of the first base substrate 21. The second substrate 104 includes the second base substrate 1041, the at least one second feeding unit 1042, and a second reference electrode layer 1043. The at least one second feeding unit 1042 is arranged on a side of the second base substrate 1041 away from the side portion 21*a* of the first base substrate 21, and the at least one second feeding unit 1042 is configured to feed a signal to the first radiation unit 12 through the at least one first feeding line 1021. For example, the second feeding unit 1042 includes a first port and at least one second port, and each second port of the second feeding unit 1042 is electrically connected to one first radiation unit 12 through one first feeding line 1021. The second reference electrode layer 1043 is arranged on a side of the second base substrate 1041 close to the side portion 21*a* of the first base substrate 21, and an orthographic projection of the second reference electrode layer 1043 on the second base substrate 1041 at least covers an orthographic projection of the at least one second feeding unit 1042 on the second base substrate 1041.

In the antenna according to the embodiment of the present disclosure, the second substrate 104 including the second feeding unit 1042 is arranged on the first side plate 1011*a*, and the first feeding line 1021 connected to the first radiation unit 12 is led out toward a same side of the first base substrate 21, so that the second feeding unit 1042 may be prevented from occupying a planar wiring space, signal interference caused by coupling between transmission ports (e.g., the first port and the second port) of the feeding structure due to a too small distance between the ports may be avoided, and a radio frequency signal may be received from only one side of the first base substrate 21, thereby simplifying a manufacturing process.

In some examples, for example, in an embodiment where an included angle is between the second base substrate 1041 and the first base substrate 102, the at least one first radiation unit 12 has a mesh structure; a unit area of an orthographic projection of the second feeding unit 1042 on the second base substrate 1041 is greater than a unit area of the orthographic projection of the first radiation unit 12 on the first base substrate 21. That is, the second feeding unit 1042 on the second base substrate 1041 may be formed as a whole layer of a metal wire structure, and no hollow portion may be arranged in the metal wire structure (i.e. a metal mesh is not adopted), thereby ensuring feeding stability and improving a carrying power of the second feeding unit 1042.

Figure 7:
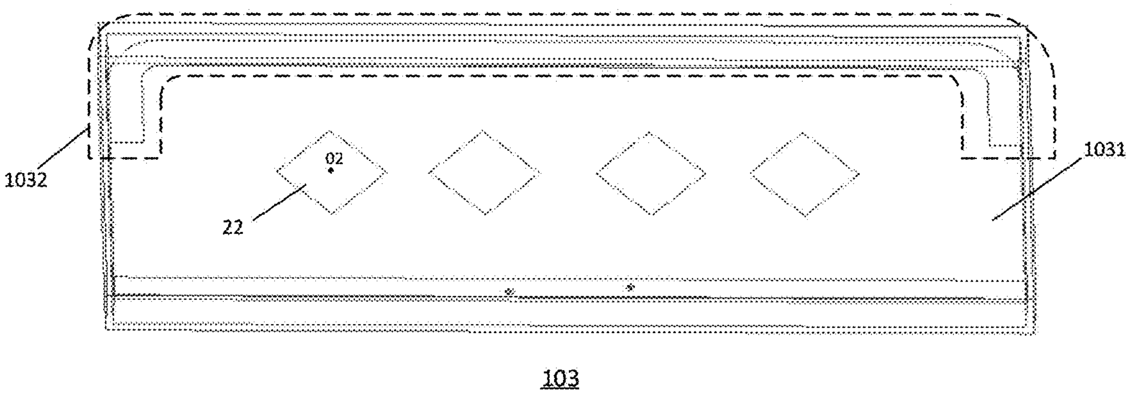
FIG. 7 is a schematic diagram of a structure of a top plate of an antenna according to an embodiment of the present disclosure.

Further, referring to FIG. 7, the third substrate 103 includes a third base substrate 1031 and at least one second radiation unit 22. The at least one second radiation unit 22 is located on a side of the third base substrate 1031, and is opposite to the at least one first radiation unit 12. In some embodiments, the at least one second radiation unit 22 is arranged on a side of the third base substrate 1031 close to the first substrate 102. In some embodiments, the at least one second radiation unit 22 is arranged on a side of the third base substrate 1031 away from the first substrate 102, which is not limited herein. An orthographic projection of each second radiation unit 22 on the third base substrate 1031 at least partially overlaps an orthographic projection of a corresponding first radiation unit 12 on the third base substrate 1031, and orthographic projections of different second radiation units 22 on the third base substrate 1031 at least partially overlap orthographic projections of corresponding first radiation units 12 on the third base substrate 1031, respectively.

It should be noted that the antenna in the embodiment of the present disclosure may be a receiving antenna or a transmitting antenna, and may transmit and receive signals simultaneously. The antenna disclosed in this embodiment may include N number of the first radiation units 12 and N number of the second radiation units 22, where N is any integer greater than 0. The number of the first radiation units 12 and the number of the second radiation units 22 may be different from each other, as long as each second radiation unit 22 is arranged corresponding to one first radiation unit 12. In the embodiment of the present disclosure, as an example, four first radiation units 1212 are provided at intervals on the first base substrate 21 along the first direction S1, and four second radiation units 22 are provided at intervals on the third base substrate 1031 along the first direction, which is not intended to limit the present disclosure.

It should be noted that the first reference electrode layer 1012 and the second reference electrode layer 1043 include, but are not limited to, a ground electrode layer. In the embodiment of the present disclosure, as an example, the first reference electrode layer 1012 and the second reference electrode layer 1043 are both a ground electrode layer.

It should be noted that in the present specification, the first direction S1 is a length direction of long sides of the fourth base substrate 11, the first base substrate 21, and the third base substrate 1031, the second direction S2 is a length direction of short sides of the fourth base substrate 11, the first base substrate 21, and the third base substrate 1031, and there is a certain included angle between the first direction S1 and the second direction S2. In the following, the first direction S1 is perpendicular to the second direction S2, as an example.

When the antenna transmits a signal, a radio frequency signal is received through a first port of a second feeding unit 1042, the second feeding unit 1042 divides the radio frequency signal into a plurality of sub-signals, each sub-signal is output through one second port to a first feeding line 1021 connected to the second port, and then output through the first feeding line 1021 to a first radiation unit 12 connected to the first feeding line 1021, and the first radiation unit 12 feeds the sub-signal to a second radiation unit 22 directly opposite to the first radiation unit 12. When the radiation antenna receives a signal, any one of the second radiation units 22 receives and feeds the radio frequency signal to a first radiation unit 12 directly opposite to the second radiation unit 22, the first radiation unit 12 transmits the radio frequency signal to a second port of a second feeding unit 1042 through a first feeding line 1021 connected to the first radiation unit 12, and the radio frequency signal is transmitted to the first port through the second port.

In the antenna according to the embodiment of the present disclosure, the at least one first radiation unit 12 and the at least one second radiation unit 22 cooperate to radiate a radio frequency signal, so that compared with an antenna only provided with a first radiation unit 12, a clearance height of the antenna is effectively increased, and therefore the radiation efficiency is improved. The antenna of the embodiment of the present disclosure is an antenna, which facilitate an embellishment of the antenna.

In some examples, referring to FIGS. 1 to 7, a shape of each first radiation unit 12 and a shape of each second radiation unit 22 are both centrosymmetric patterns. Specifically, the shape of each first radiation unit 12 and the shape of each second radiation unit 22 may be a square, a cross, or an equilateral rhombus, etc. It should be noted that the square, the cross, and the equilateral rhombus may not be the square, the cross, and the equilateral rhombus in the strict sense, and the shape of each first radiation unit 12 and the shape of each second radiation unit 22 may be approximately a square, a cross, or an equilateral rhombus. In the following, as an example, the shape of each first radiation unit 12 and the shape of each second radiation unit 22 are a square. Further, each first radiation unit 12 and a corresponding second radiation unit 22 may be arranged directly opposite to each other, that is, an orthographic projection of a symmetry center of each first radiation unit 12 on the third base substrate 1031 coincides with an orthographic projection of a symmetry center of a second radiation unit 22 corresponding to the first radiation unit 12 on the third base substrate 1031. Referring to FIGS. 5 and 7, as an example, all the second radiation units 22 in FIG. 7 are square radiation units, a symmetry center of each second radiation unit 22, which is a square radiation unit, is an intersection point of two diagonal lines of the square radiation unit, which is referred to as a second symmetry center O2. As an example, all the first radiation units 12 in FIG. 5 are square radiation units, a symmetry center of each first radiation unit 12, which is a square radiation unit, is an intersection point of two diagonal lines of the square radiation unit, which is referred to as a first symmetry center O1. The first radiation units 12 are arranged directly opposite to the corresponding second radiation units 22, respectively, so that an orthographic projection of the first symmetric center O1 of each first radiation unit 12 on the third base substrate 1031 coincides with an orthographic projection of the second symmetric center O2 of the second radiation unit 22 corresponding to the first radiation unit 12 on the third base substrate 1031, so that the first radiation units 12 may receive all radiation energy of a signal fed by the second radiation units 22 as much as possible, thereby improving radiation efficiency of the antenna. It should be noted that each second radiation unit 22 receives a signal fed by one second radiation unit 22, that is, the first radiation unit 12 corresponds to the second radiation unit 22.

In some examples, referring to FIG. 5, as an example, the antenna of the present embodiment is a dual-polarized antenna, at least one first radiation unit 12 and a first feeding unit including at least two first feeding lines 1021 are arranged on the first base substrate of the first substrate 102, the at least two first feeding lines 1021 of the first feeding unit are averagely divided into two groups, which are a first group of first feeding lines and a second group of first feeding lines, respectively, the first feeding line in the first group of first feeding lines is referred to as a first feeding line 1021*a*, and the first feeding line in the second group of first feeding lines is referred to as a first feeding line 1021*b*.

In some examples, referring to FIG. 9, adapting to the embodiment of the above-described dual-polarized antenna, the second substrate 104 includes at least one second feeding unit 1042; the at least one second feeding unit 1042 includes a first feeding sub-unit 1042*a* and a second feeding sub-unit 1042*b*; and the first feeding sub-unit 1042*a* includes one first port p11 and at least one second port p12. The second feeding sub-unit 1042*b* includes one first port p21 and at least one second port p22. The first port p11 of the first feeding sub-unit 1042*a* is connected to an external connector to receive a radio frequency signal through a path, and the radio frequency signal is divided into at least one sub-signal with equal power division, and each sub-signal is transmitted to one second port p12; one second port p12 of the first feeding sub-unit 1042*a* is connected to a second end of a corresponding first feeding line 1021*a* in the first group of first feeding lines, and different second ports p11 of the first feeding sub-unit 1042*a* are connected to second ends of corresponding first feeding lines 1021*a*, respectively. The first port p21 of the second feeding sub-unit 1042*b* is connected to the external connector, receives a radio frequency signal through other path, and the radio frequency signal is divided into at least one sub-signal with equal power division, and each sub-signal is transmitted to one second port p22; one second port p21 of the second feeding sub-unit 1042*b* is connected to a second end of a corresponding first feeding line 1021*b* in the second group of first feeding lines, and different second ports p21 of the second feeding sub-unit 1042*b* are connected to second ends of corresponding first feeding lines 1021*b*, respectively.

For convenience of description, in the present embodiment, as an example, the substrate 103 includes four first radiation units 12 and eight first feeding lines 1021, the eight first feeding lines 1021 are averagely divided into two groups, the first group includes four first feeding lines 1021*a*, and the second group includes four first feeding lines 1021*b*. The second substrate 104 includes the first feeding sub-unit 1042*a* and the second feeding sub-unit 1042*b*, and both of them are of a one-to-four power division feeding structure, as an example. That is, the first feeding sub-unit 1042*a* includes one first port p11 and four second ports p12, and the second feeding sub-unit 1042*b* includes one first port p21 and four second ports p22. The connection among the second feeding unit 1042, the first feeding line 1021, and the first radiation unit 12 will be described below.

Specifically, referring to FIGS. 5 and 9, a second end of each first feeding line 1021*a* in the first group of first feeding lines is connected to one second port p12 of the first feeding sub-unit 1042*a*, a first end of the first feeding line 1021*a* is connected to one first radiation unit 12 at a position which is referred to as a first connecting point k1, where first ends of different first feeding lines 1021*a* are connected to corresponding first radiation units 12, respectively. A second end of each first feeding line 1021*b* in the second group of first feeding lines is connected to one second port p22 of the second feeding sub-unit 1042*b*, a first end of the first feeding line 1021*b* is connected to one first radiation unit 12 at a position which is referred to as a second connecting point k2, where first ends of different first feeding lines 1021*b* are connected to corresponding first radiation units 12, respectively. For one first radiation unit 12, there is a certain included angle between an extending direction of a connecting line of the first connecting point k1 and the symmetry center (i.e. the first symmetry center 01) of the first radiation unit 12 and an extending direction of a connecting line of the second connecting point k2 and the symmetry center (i.e. the first symmetry center 01) of the first radiation unit 12, so as to ensure that a first polarization direction of a first path for the radio frequency signal, from the second port p12 of the first feeding sub-unit 1042*a* to the first feeding line 1021*a* to the first radiation unit 12, is different from a second polarization direction of a second path for the radio frequency signal, from the second port p22 of the second feeding sub-unit 1042*b* to the first feeding line 1021*b* to the first radiation unit 12, thereby isolating the radio frequency signals transmitted or received through the first path and the second path from each other. If the antenna transmits and receives signals simultaneously, the transmitted signal may be fed to the first radiation unit 12 from one of the first path and the second path, and meanwhile, a signal received by the second radiation unit 22 may be fed to the first radiation unit 12, and the first radiation unit 12 receives the signal through the other of the first path and the second path, so that it may be ensured that the signals through the first path and the second path do not interfere with each other, and the dual-polarized antenna is formed.

In some examples, with continued reference to FIGS. 5 and 9, the first polarization direction and the second polarization direction may specifically include various forms. For example, the first polarization direction may be at +45°, the second polarization direction may be at −45°. Based on the above, in order that the first polarization direction and the second polarization direction are at ±45°, respectively, for one first radiation unit 12, the extending direction of the connecting line between the first connecting point k1 and the symmetry center (i.e. the first symmetry center 01) of the first radiation unit 12 is perpendicular to the extending direction of the connecting line between the second connecting point k2 and the symmetry center (i.e. the first symmetry center 01) of the first radiation unit 12, so as to ensure that the polarization direction formed by the second port p12 of the first feeding sub-unit 1042*a*, the first feeding line 1021*a* and the first radiation unit 12 is at +45°, and the polarization direction formed by the second port p22 of the second feeding sub-unit 1042*b*, the first feeding line 1021*b* and the first radiation unit 12 is at −45°. The polarization orthogonality of ±45° may ensure that the isolation between the antennas of +45° and −45° meets the requirement of intermodulation on the isolation between the antennas (greater than or equal to 30 dB). It should be noted that the polarization direction may be regarded as an angle between a microwave signal radiated by the first radiation unit 12 or the second radiation unit 22 and the ground plane. In this embodiment, the first polarization direction is perpendicular to the second polarization direction (that is, an included angle between the first polarization direction and the second polarization direction is 90°), an angle between the first polarization direction and the ground plane is 45°, and an angle between the second polarization direction and the ground plane is 45°, so that one of the first polarization direction and the second polarization direction is defined as +45°, the other is −45°. As an example, the first polarization direction is at +45°, and the second polarization direction is at −45°. Alternatively, the two polarization directions may be other angles, and are not limited herein.

In some examples, each first radiation unit 12 is a square radiation unit, and accordingly, the second radiation unit 12 is also a square radiation unit. For one first radiation unit 12, the first connecting point k1 and the second connecting point k2 are respectively located at two adjacent sides of the first radiation unit 12. Specifically, the first connecting point k1 may be located at a midpoint of one side of the first radiation unit 12 in a length direction thereof; the second connecting point k2 may be located at a midpoint of a side of the first radiation unit 12 adjacent to the side in a length direction thereof. Since any two adjacent sides of the first radiation unit 12, which is a square radiation unit, are perpendicular to each other, an extending direction of a connecting line from k1 to o1 and an extending direction of a connecting line from k2 to o1 are also perpendicular to each other.

In some examples, the second base substrate 1041 of the second substrate 104 may be made of a microwave plate; metal layers, i.e. a metal layer forming the second reference electrode layer 1041 and a metal layer forming the second feeding unit 1042, are arranged on both sides of the second base substrate 1041. A copper layer is generally used as the metal layer, and the second substrate 104 is vertically disposed on the side plate 1011, so that the second substrate 104 may be prevented from affecting the transmittance of light for the antenna. The second port of the feeding structure 1041 on the second substrate 104 is electrically connected to the first feeding line 1021 by soldering, so as to ensure the reliability of an electrical connection. The energy carried by the antenna is mainly determined by a position where a thinner line of the feeding structure 1041 is located, the energy on the feeding structure 1041 is stronger, a line width of the feeding structure 1041 is smaller, and the carrying power is lower, but the second substrate 104 is made of a microwave plate and coated with copper on both sides, so that the carrying power of the antenna is greatly improved, and a power capacity of 20 watts is achieved.

In some examples, a length and a shape of each first feeding line 1021*a* in the first group of the first feeding lines is the same as a length and a shape of each first feeding line 1021*a* in the second group of the first feeding lines, respectively. For one first radiation unit 12, one first feeding line 1021*a* in the first group and one first feeding line 1021*b* in the second group connected thereto are mirror-symmetric with respect to a center line thereof in the first direction S1, so that a transmission difference between the first feeding line 1021*a* and the first feeding line 1021*b* may be reduced.

In some examples, with continued reference to FIGS. 1 to 9, the first radiation units 12 and the second radiation units 22 are arranged in a one-to-one correspondence with each other, that is, in the antenna disclosed in this embodiment, the first radiation units 12 and the second radiation units 22 are the same in number, the first radiation units 12 and the second radiation units 22 are arranged in a one-to-one correspondence with each other, and an area of each first radiation unit 12 may be slightly greater than an area of a second radiation unit 22 corresponding to the first radiation unit 12, that is, an area of an orthographic projection of the first radiation unit 12 on the third base substrate 1031 is greater than an area of an orthographic projection of the second radiation unit 22 on the third base substrate 1031, and each first radiation unit 12 is arranged opposite to a corresponding second radiation unit 22, that is, the orthographic projection of the second radiation unit 22 on the third base substrate 1031 is within the orthographic projection of the first radiation unit 12 corresponding to the second radiation unit 22 on the third base substrate 1031. Alternatively, the area of the first radiation unit 12 may be equal to or less than the area of the second radiation unit 22, which is only an exemplary illustration and does not limit the present disclosure. In some examples, a ratio of an area of an orthographic projection of one first radiation unit 12 on the first base substrate 21 to an area of an orthographic projection of one second radiation unit 22 on the first base substrate 21 ranges from 0.45:1 to 1.54:1. Further, the ratio may be in a range of 0.55:1 to 1.44:1. Specifically, in an embodiment shown in FIGS. 1 to 10, the ratio may be 1.44:1, and in an embodiment shown in FIGS. 16 to 34, the ratio may be 0.55:1, which is not limited herein.

In some examples, with continued reference to FIGS. 1 to 9, a size of the first radiation unit 121 and/or the second radiation unit 22 may be set according to a wavelength of a microwave signal transmitted by the antenna. For example, the first radiation unit 12 and/or the second radiation unit 22 may be a square radiation unit, a length of a side of the square radiation unit may be one half or one quarter of the wavelength of the microwave signal. Alternatively, the size of the first radiation unit 121 and/or the second radiation unit 22 may be other sizes, which is not limited herein. The size of the first radiation unit 12 may be slightly greater than that of the second radiation unit 22. Specifically, a size relationship between the first radiation unit 12 and the second radiation unit 22 may be set according to the wavelength of the microwave signal. For example, the first radiation unit 12 and the second radiation unit 22 may be square radiation units, the length of the side of the first radiation unit 12 may be greater than the length of the side of the second radiation unit 22 by one eighth of the wavelength of the microwave signal. Alternatively, the size relationship between the first radiation unit 12 and the second radiation unit 22 may be in other manners, which is not limited herein.

Figure 2:
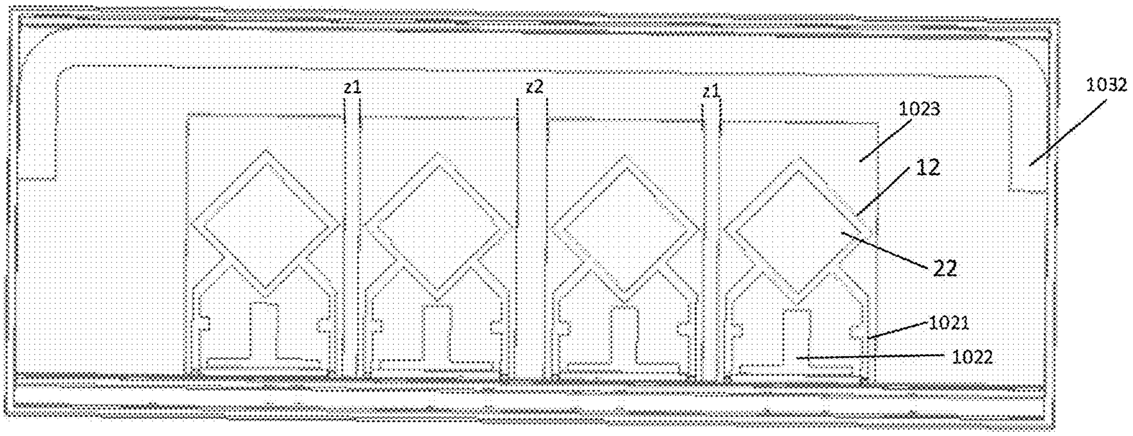
FIG. 2 is a schematic diagram (top view) of a structure of an antenna according to an embodiment of the present disclosure.

In some examples, referring to FIGS. 1 and 2, the first substrate 102 includes a plurality of first radiation units 12, and N adjacent first radiation units 12 form a group. For example, by taking the antenna of FIGS. 1 and 2 as an example, the first substrate 102 includes four first radiation units 12, N is equal to 2, adjacent first and second first radiation units 12 form a first group, and adjacent third and fourth first radiation units 12 form a second group. For one group of first radiation units 12, a spacing between any two adjacent first radiation units 12 is a first spacing z1; for any two adjacent groups of the first radiation units 12, a distance between the first radiation unit 12 closest to the second group in the first group and the first radiation unit 12 closest to the first group in the second group is a second spacing z2, wherein the second spacing z2 is greater than the first spacing z1, wherein N is greater than or equal to 2. By adjusting the first spacing z1 between different first radiation units 12 and the second spacing z2 between different groups of first radiation units 12, a width of a beam of the antenna in the horizontal direction may be changed, so that a signal strength in a middle region is greater than a signal strength on both sides of the middle region.

Figure 8:
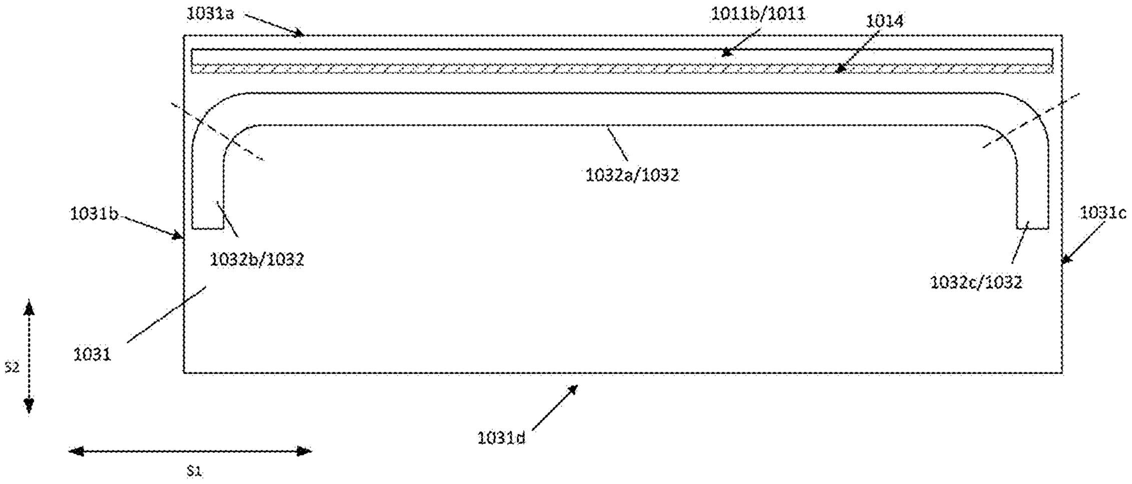
FIG. 8 is a schematic diagram (top view) of a structure of a top plate of an antenna according to an embodiment of the present disclosure.

In some examples, referring to FIG. 4, the fourth substrate 101 may include the first side plate 1011*a* and the second side plate 1012*b* connected to opposite sides of the fourth base substrate 11 which are along the first direction S1, and the second substrate 104 is arranged on a side of the first side plate 1011*a* away from the second side plate 1011*b*. The fourth substrate 101 further includes a fourth reference electrode layer 1014, which is arranged on a side of the second side plate 1011*b* close to the first side plate 1011*a*, and is connected to the first reference electrode layer 1012, i.e. the fourth reference electrode layer 1014 and the first reference electrode layer 1012 are in a common potential. Referring to FIGS. 7 and 8, in order to illustrate the positional relationship between the third electrode layer 1032 and the second side plate 1011*b*, FIG. 8 only shows a partial structure. The third substrate 103 may further include the third electrode layer 1032, the reference electrode structure 1032 is arranged on a side of the third base substrate 1031 close to the first substrate 102, and the reference electrode structure 1032 is arranged along a side of the third base substrate 1031 close to the second side plate 1011*b*, there is a certain distance between the third electrode layer 1032 and the fourth reference electrode layer 1014 on the inner side of the second side plate 1011*b*, and a coupling occurs when the distance between the third electrode layer 1032 and the fourth reference electrode layer 1014 satisfies the requirement that a signal is transmitted between the third electrode layer 1032 and the fourth reference electrode layer 1014, so that the third electrode layer 1032 may receive a reference voltage at the fourth reference electrode layer 1014 in a coupling manner. That is, the third electrode layer 1032 serves as an extension structure of the fourth reference electrode layer 1014, and the fourth reference electrode layer 1014 is extended onto the third base substrate 1031 to adjust a center frequency of the antenna.

In some examples, referring to FIG. 8, the third base substrate 1031 includes a first side 1031*a*, and a second side 1031*b* and a third side 1031*c* respectively located at both sides of the first side 1031*a*, wherein the first side 1031*a* extends along a length direction of the third base substrate 1031 (i.e., the first direction S1), and the second side 1031*b* and the third side 1031*c* extend along a width direction of the third base substrate 1031 (i.e., the second direction S2). The third electrode layer 1032 may have various forms. For example, the third electrode layer 1032 includes a main body structure 1032*a*, and a first extension structure 1032*b* and a second extension structure 1032*c* respectively connected to two sides of the main body structure 1032*a*, the main body structure 1032*a* extends along the first side 1031*a* and conforms to the first side 1031*a*; the first extension structure 1032*b* extends along the second side 1031*b* and conforms to the second side 1031*b*; and the second extension structure 1032*c* extends along the third side 1031*c* and conforms to the third side 1031*c*, wherein a length of the main body structure 1032*a* is substantially the same as a length of the first side 1031*a*; a length of the first extension structure 1032*b* is less than a length of the second side 1031*b*; and a length of the second extension structure 1032*c* is less than a length of the third side 1031*c*.

In some examples, referring to FIGS. 1, 2, and 5, at least one first groove 1023 is provided on a side of the first base substrate 21 away from the at least one first radiation unit 12, an orthographic projection of each first groove 1023 on the first base substrate 21 covers an orthographic projection of a corresponding first radiation unit 12 on the first base substrate 21, and orthographic projections of different first grooves 1023 on the first base substrate 21 cover orthographic projections of corresponding first radiation units 12 on the first base substrate 21, respectively. The at least one first groove 1023 is equivalent to an air cavity formed by hollowing out a portion at the lower side of the first base substrate 21, which is located directly below the at least one first radiation unit 12, so that a dielectric layer below the at least one first radiation unit 12 is changed from the first base substrate 21 to air plus a small portion of the first base substrate 21. Since a transmission loss of the air is extremely small, the efficiency of the antenna is greatly increased, and the weight of the first base substrate 21 is also reduced, and further the weight of the antenna is reduced. It should be noted that a depth of the first groove 1023 is less than a thickness of the second base substrate 21.

In some examples, the orthographic projection of each first groove 1023 on the first base substrate 21 covers an orthographic projection of at least one first feeding line 1021 connected to the corresponding first radiation unit 12 on the first base substrate 21. The first groove may extend from a position where the corresponding first radiation unit 12 is located to an edge where the corresponding first feeding line 1021 is led out, i.e. the edge close to the side portion 21*a*, so that the dielectric layer below the first radiation unit 12 and the first feeding line 1021 becomes air and a small portion of the first base substrate 21, further increasing the efficiency of the antenna, and reducing the weight of the first base substrate 21.

In some examples, the orthographic projection of each first groove 1023 on the first base substrate 21 covers an orthographic projection of two first feeding lines connected to the corresponding first radiation unit 12 on the first base substrate 21. A ratio of an area of the orthographic projection of each first groove 1023 on the first base substrate 21 to an area of the orthographic projection of the corresponding first radiation unit 12 on the first base substrate 21 ranges from 5:1 to 2:1. Specifically, the ratio may be 3.68:1. A spacing between any two adjacent first grooves 1023 in the plurality of first grooves 1023 may be not constant. For example, the spacing may be in a range of 4 mm to 12 mm. Specifically, the spacing may be in a range of 5 mm to 10 mm, which is not limited herein.

In some examples, a symmetry axis (extending along the second direction S2) of each first radiation unit 12 in the first direction S1 and a symmetry axis (extending along the second direction S2) of the corresponding first groove 1023, of which the orthographic projection on the first base substrate 21 overlaps the orthographic projection of the first radiation unit 12 on the first base substrate 21, in the first direction S1 are substantially coincident with each other. That is, each first radiation unit 12 and the corresponding first groove 1023, of which the orthographic projection on the first base substrate 21 overlaps the orthographic projection of the first radiation unit 12 on the first base substrate 21, may be arranged directly opposite to each other.

In some examples, based on the above-described embodiment in which the at least one first groove 1023 is arranged on the first base substrate 21, referring to FIG. 5, the first substrate 102 may include the at least one first radiation unit 12 and the at least two first feeding lines 1021, where the at least two first feeding lines 1021 are averagely divided into two groups, namely, the first group of first feeding lines and the second group of first feeding lines, respectively, and the first feeding line in the first group of first feeding lines is referred to as the first feeding line 1021*a* and the first feeding line in the second group of first feeding lines is referred to as the first feeding line 1021*b*. The second end of each first feeding line 1021*a* in the first group of first feeding lines is connected to one second port p12 of the first feeding sub-unit 1042*a*, the first end of the first feeding line 1021*a* is connected to one first radiation unit 12, and the first ends of different first feeding lines 1021*a* are connected to corresponding first radiation units 12, respectively. The second end of each first feeding line 1021*b* in the second group of first feeding lines is connected to one second port p22 of the second feeding sub-unit 1042*b*, the first end of the first feeding line 1021*b* is connected to one first radiation unit 12, and the first ends of different first feeding lines 1021*b* are connected to corresponding first radiation units 12, respectively. Each first radiation unit 12 is connected to one first feeding line 1021*a* in the first group and one first feeding line 1021*b* in the second group, and the corresponding first groove 1023 is located directly below the first radiation unit 12, the first feeding line 1021*a* in the first group, and the first feeding line 1021*b* in the second group, so that a dielectric between the first feeding line 1021*a* in the first group and the first feeding line 1021*b* in the second group becomes air and a small portion of the first base substrate 21, causing the first feeding lines 1021*a* and 1021*b* to be easily coupled with each other, and thus causing a signal crosstalk. Therefore, the first substrate 102 may further include at least one second sub-electrode 1022, and the at least one second sub-electrode 1022 is arranged on a side of the first base substrate 21 away from the fourth substrate 101. For one radiation unit 12, a corresponding second sub-electrode 1022 is arranged on a side of the first radiation unit 12 close to the side portion 21*a* and located between the first feeding line 1021*a* in the first group and the first feeding line 1021*b* in the second group connected to the first radiation unit 12, so as to isolate signals of the first feeding line 1021*a* in the first group from the first feeding line 1021*b* in the second group, and avoid the coupling therebetween.

Figure 6:
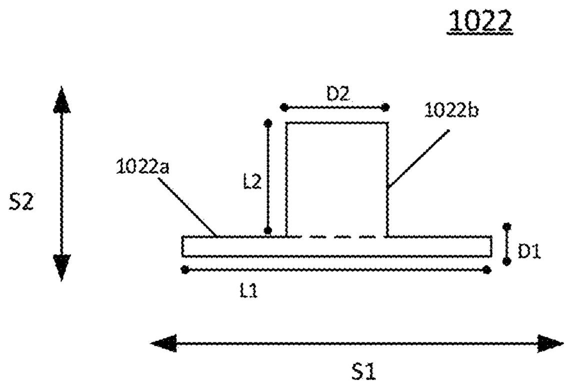
FIG. 6 is a schematic diagram of a structure of an isolation structure of an antenna according to an embodiment of the present disclosure.

In some examples, the at least one isolating electrode 1022 is made of a conductive material, e.g., a metal such as copper, aluminum, etc. FIG. 6 is a schematic diagram of a structure of the second sub-electrodes 1022. Referring to FIG. 6, each second sub-electrode 1022 includes a first structure 1022*a* and a second structure 1022*b*. The first structure 1022*a* extends along the side of the first base substrate 21 close to the side portion 21*a*, that is, along the length direction (i.e., the first direction S1) of the first base substrate 21, the second structure 1022*b* extends along the width direction (i.e., the second direction S2) of the first base substrate 21, the second structure 1022*b* is connected to a midpoint of the first structures 1022*a* in the extending direction thereof (i.e., the first direction S1), and the extending direction of the second structure 1022*b* is perpendicular to the extending direction of the first structure 1022*a*. A width D1 of the first structure 1022*a* is less than a width D2 of the second structure 1022*b*; a length L1 of the first structure 1022*a* is greater than a length L2 of the second structure 1022*b*.

In some examples, the antenna further includes a plurality of connecting structures (not shown). Referring to FIG. 4, the fourth substrate 101 further includes a third reference electrode layer 1013, the third reference electrode layer 1013 is arranged on a side of the first side plate 1011*a* away from the second substrate 104, the third reference electrode layer 1013 is connected to the first reference electrode layer 1012, that is, the third reference electrode layer 1013 and the first reference electrode layer 1012 are in a common potential, and the first reference electrode layer 1012 receives a reference voltage (for example, a ground voltage GND) through a connecting line. The first side plate 1011*a* is further provided with a plurality of first through holes 001, and one connecting structure passes through a corresponding first through hole 001 to electrically connect the third reference electrode layer 1013 to the second reference electrode layer 1043, so as to transmit the reference voltage at the third reference electrode layer 1013 to the second reference electrode layer 1043 of the second substrate 104.

Figure 15:
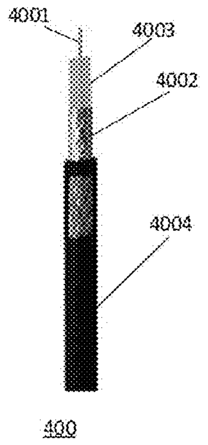
FIG. 15 is a schematic diagram of a structure of a coaxial line of an antenna according to an embodiment of the present disclosure.

In some examples, the connecting structure may employ a variety of connecting structures, for example, referring to FIG. 15, each connecting structure is a coaxial line 400, and the coaxial line 400 includes a core probe 4001 for transmitting a radio frequency signal and an outer wire 4002 for transmitting a reference voltage. The coaxial line 400 further includes a first insulating layer 4004 wrapped outside the outer wire, and a second insulating layer 4003 arranged between the outer wire 4002 and the core probe 4001. The outer wire 4002 at least partially wraps the core probe 4001, and the core probe 4001 is partially exposed. Referring to FIG. 9, the second base substrate 1041 of the second substrate 104 is provided with at least one second through hole 002, each second through hole 002 is arranged at the first port of one second feeding unit 1042, and an orthographic projection of each first through hole 001 on the second base substrate 1041 and an orthographic projection of a corresponding second through hole 002 on the second base substrate 1041 coincide with each other. For one coaxial line, the outer wire 4002 passes through a corresponding first through hole 001, and is electrically connected to the third reference electrode layer 1013 and the second reference electrode layer 1043, so as to transmit the reference voltage at the third reference electrode layer 1013 to the second reference electrode layer 1043, the part of the core probe 4001 wrapped by the outer wire 4002 passes through the first through hole 001 along with the outer wire 4002, and the exposed part of the core probe 4001 passes through a corresponding second through hole 002 and is electrically connected to a first port of a corresponding feeding unit 1042, so as to transmit the radio frequency signal to the first port, or receive the radio frequency signal input through the first port. In this embodiment, the second substrate 104 includes the first feeding sub-unit 1042*a* and the second feeding sub-unit 1042*b*, two second through holes 002 are arranged in the second base substrate 1041 and are located at the first port p11 of the first feeding sub-unit 1042*a* and the first port p12 of the second feeding sub-unit 1042*b*, respectively, the two first through holes 001 are arranged in the first side plate 1011*a* of the fourth substrate 101, the core probe 4001 of one of the two coaxial lines 400 is inserted into the first through hole 001 and the second through hole 002 on the left side to be electrically connected to the first port p11 of the first feeding sub-unit 1042*a*, and the core probe 4001 of the other of the two coaxial lines 400 is inserted into the first through hole 001 and the second through hole 002 on the right side to be electrically connected to the first port p21 of the second feeding sub-unit 1042*b*.

In some examples, referring to FIGS. 4 and 9, the second base substrate 1041 has a plurality of third through holes 003 arranged at intervals therein. The side plate 1011 (e.g. the first side plate 1011*a*) on which the second substrate 104 is arranged has a plurality of fourth through holes 004 arranged at intervals therein. The antenna may further include a plurality of fixing members (not shown in drawings), each fixing member passes through a corresponding third through hole 003 and a corresponding fourth through hole 004, so as to fix the second substrate 104 onto the first side plate 1011*a*. The fixing member may be a screw, and inner sides of the corresponding third through hole 003 and the corresponding fourth through hole 004 may have an internal thread thereon adapted to the screw.

The antenna according to an embodiment of the present disclosure may be a transparent antenna that may be used in a glass window system for an automobile, a train (including a high-speed rail train), an aircraft, a building, or the like. The antenna may be fixed on an inner side of the glass window (a side closer to the room). Since the antenna has a higher optical transmittance, the antenna has little influence on the transmittance of the glass window while realizing a communication function, and the antenna will also become a trend toward an embellished antenna. The glass window according to an embodiment of the present disclosure includes, but is not limited to, a double-layer glass, and a type of the glass window may alternatively be a single-layer glass, a laminated glass, a thin glass, a thick glass, or the like. In an embodiment of the present disclosure, the glass window attached with the transparent antenna is applied to a subway window system, which is taken as an example for explanation.

In some examples, the fourth base substrate 11 may include a first base material and a first fixing plate that are stacked; the first reference electrode layer 1012 is arranged on a side of the first base material away from the first fixing plate, wherein the first reference electrode layer 1012 may be fixedly connected to the first base material through a first transparent adhesive layer. And/or, the first base substrate 21 includes a second base material and a second fixing plate which are stacked, and the at least one first radiation unit 12 and the at least one feeding line 1021 may be arranged on a side of the second base material away from the second fixing plate, wherein the at least one first radiation unit 12 and the at least one feeding line 1021 may be fixedly connected to the second base material through a second transparent adhesive layer. And/or, the third base substrate 1031 may include a third base material and a third fixing plate that are stacked, and the at least one second radiation unit 22 is arranged on a side of the third base material away from the second fixing plate, where the at least one second radiation unit 22 may be fixedly connected to the third base material through a third transparent adhesive layer.

Materials of the first base material, the second base material and the third base material may be the same or different; for example, each of the first base material, the second base material, and the third base material is made of a flexible film, and then a metal layer may be formed on the flexible film, and the metal layer may be patterned to form the first radiation unit 12, the first feeding line 1021, the second radiation unit 22, the first reference electrode layer 1012, and the like, thereby forming a conductive film. A material of the flexible film includes, but is not limited to, Polyethylene Terephthalate (PET) or Polyimide (PI), or the like. In the embodiments of the present disclosure, as an example, the first base material, the second base material, and the third base material are all made of PET. A thickness of each of the first base material, the second base material and the third base material is in a range of about 50 μm to about 250 μm. Since the first base material, the second base material, and the third base material are flexible and cannot provide good support for the first radiation unit 12, the second radiation unit 22, and the first reference electrode layer 1012, respectively, the first fixing plate is employed to maintain a rigidity of the fourth base substrate 11, the second fixing plate is employed to maintain a rigidity of the first base substrate 21, and the third fixing plate is employed to maintain a rigidity of the third base substrate 1031. The materials of the first, second, and third fixing plates include, but are not limited to, Polycarbonate (PC), Copolymers of Cycloolefin (COP), or acrylic/Polymethyl Methacrylate (PMMA), so as to ensure the transparency of the fourth base substrate 11. A thickness of any one of the first fixing plate, the second fixing plate and the third fixing plate is in a range of about 1 mm to about 3 mm. Materials of the first adhesive layer and the second adhesive layer may be the same or different, for example, both the materials of the first adhesive layer and the second adhesive layer are Optically Clear Adhesive (OCA). Here, the first base substrate 12 and the third base substrate 1031 may both adopt the same structure as the fourth base substrate 11 to ensure transparency, which is not described herein again.

It should be noted that referring to FIG. 4, in some examples, the first side plate 1011*a* and the second side plate 1011*b* are provided on the opposite sides of the fourth base substrate 11 in the length direction, and the first side plate 1011*a* and the second side plate 1011*b* may also adopt the above-mentioned structure formed by stacking a fixed plate and a base material, so that the base material layer made of the thin film material covers the inner sides of the fourth base substrate 11, the first side plate 1011*a*, and the second side plate 1011*b*, and then a conductive layer is formed thereon to form a conductive film, so as to be etched into the first reference electrode layer 1012, the third reference electrode layer 1013, and the fourth reference electrode layer 1014.

In some examples, referring to FIGS. 1 and 4, the side plate 1011 (i.e., the first side plate 1011*a*) provided with the second substrate 104 divides the first base substrate 21 (and also the fourth base substrate 11) into a first region N1 and a second region N2 along the length direction (i.e., the first direction S1) of the fourth base substrate 11. The second substrate 104 is arranged on a side of the first side plate 1011*a* close to the first region N1. A width of the first region N1 in a direction (i.e., the second direction S2) perpendicular to the length direction of the fourth base substrate 11 is less than a width of the second region N2 in the direction (i.e., the second direction S2) perpendicular to the length direction of the fourth base substrate 11. An orthographic projection of the first base substrate 21 on the fourth base substrate 11 is located in the second region N2 of the fourth base substrate 11.

Figure 3:
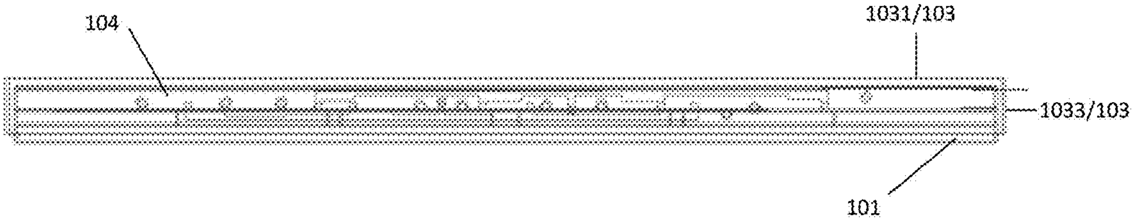
FIG. 3 is a schematic diagram (side view) of a structure of an antenna according to an embodiment of the present disclosure.

In some examples, referring to FIG. 3, the third substrate 103 further includes a surrounding plate 1033 arranged along an edge of the third base substrate 1031 and on a side of the third base substrate 1031 close to the substrate 101. When the third substrate 103 and the fourth substrate 101 are aligned and assembled to form a cell, the surrounding plate 1033 and the third base substrate 1031 form an outer cover to enclose the fourth substrate 101 therein.

When the third substrate 103 and the fourth substrate 101 are aligned and assembled to form a cell, a side plate 1011 (i.e., the first side plate 1011*a*) provided with the second substrate 104 thereon, a portion of the fourth base substrate 11 of the fourth substrate 101 located in the first region N1, the surrounding plate 1033 on a side of the third substrate 103 closest to the first side plate 1011*a*, and a portion of the third base substrate 1031 of the third substrate 103 corresponding to the first region N1 define an accommodating space Y1. When the antenna is attached to the glass window with the first side plate 1011*a* facing the bottom surface and the second side plate 1011*b* facing the sky, rainwater may accumulate in the accommodating space Y1 if entering the antenna, thereby preventing the antenna from being influenced by rainwater, and the second substrate 104 is arranged on the first side plate 1011*a*, thereby preventing the rainwater from being in contact with the second substrate 104.

Figure 35:
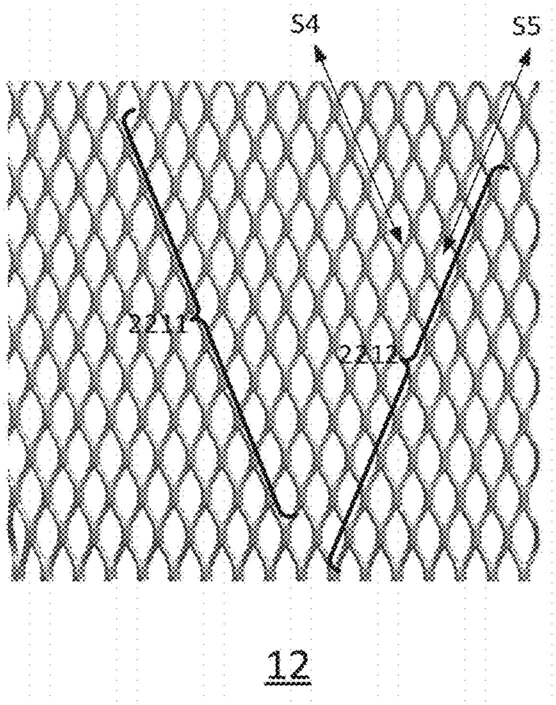
FIG. 35 is a schematic diagram of a structure of an embodiment of a first radiation unit with a mesh structure of an antenna according to an embodiment of the present disclosure.
Figure 36:
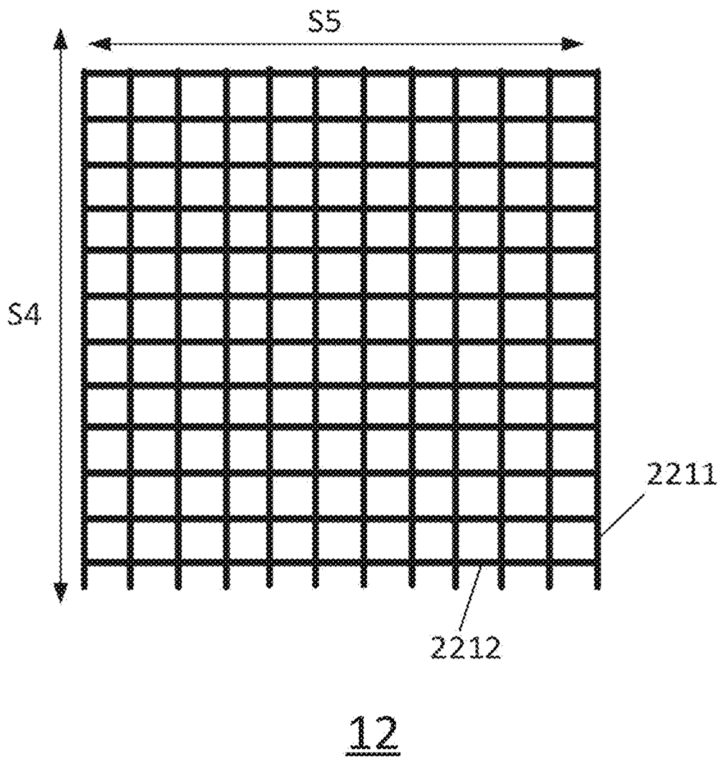
FIG. 36 is a schematic diagram of a structure of another embodiment of a first radiation unit with a mesh structure of an antenna according to an embodiment of the present disclosure.

In some examples, at least one of the first radiation unit 12, the second radiation unit 22, the first feeding line 1021, the first reference electrode layer 1012, the second reference electrode layer 1043, the third reference electrode layer 1013, and the fourth reference electrode layer 1014 includes a mesh structure (mesh metal), so that transmittance of the antenna may be ensured. In some examples, at least one of the first radiation unit 12, the second radiation unit 22, the first feeding line 1021, the first reference electrode layer 1012, the second reference electrode layer 1043, the third reference electrode layer 1013, and the fourth reference electrode layer 1014 may be of a mesh structure formed by intersecting a plurality of first conductive filaments and a plurality of second conductive filaments, wherein an extending direction of each first conductive filament is different from that each second conductive filament. For example, referring to FIGS. 35 and 36, by taking the second radiation unit 22 as an example, the second radiation unit 22 may be of a mesh structure formed by intersecting a plurality of first conductive filaments 2211 and a plurality of second conductive filaments 2212, wherein the first conductive filaments 2211 extend along a fourth direction S4, the second conductive filaments 2212 extend along a fifth direction, the fourth direction S4 is not parallel to the fifth direction S5. Specifically, the fourth direction S4 and the fifth direction S5 may be various forms, for example, referring to FIG. 35, an extending direction of the first conductive filaments 2211 (the fourth direction S4) and an extending direction of the second conductive filaments 2212 (the fifth direction S5) may be set according to the polarization direction of the second radiation unit 22 (i.e., a direction of a current generated by a signal input by a power division feeding structure 3).

In some examples, a line width, a line thickness, and a line spacing of each of the plurality of first conductive filaments 2211 are the same as those of each of the plurality of second conductive filaments 2212, respectively. For example, the first conductive filament 2211 and the second conductive filament 2212 both have a line width of 2 μm to 30 μm, a line spacing of 50 μm to 250 μm, and a line thickness of 1 μm to 10 μm, so that the transmittance may reach 70% to 80%. Where the first radiation unit 12 is made of a metal mesh, the first radiation unit 12 may be formed on a surface of the second base material away from the second fixing plate through a process including, but not limited to, imprinting or etching, and other structures are formed in a same manner.

In some examples, the mesh structure may be made of a plurality of conductive materials, e.g., metal materials such as copper, silver, aluminum, etc., which is not limited herein.

In some examples, the at least one first radiation unit 12 and the at least one second radiation unit 22 may each be of a mesh structure. The metal wires (e.g. the plurality of first conductive filaments 2211 and the plurality of second conductive filaments 2212) forming the mesh structure may be of an open structure in the first radiation unit 12 and/or the second radiation unit 22, that is, edges of the first radiation unit 12 and/or the second radiation unit 22 are not connected to each other; alternatively, the metal wires (e.g., the first conductive filaments 2211 and the second conductive filaments 2212) forming the mesh structure may be of a closed structure in the first radiation unit 12 and/or the second radiation unit 22, that is, edges of the first radiation unit 12 and/or the second radiation unit 22 are short connected to each other, which is not limited herein.

In some examples, the at least one first radiation unit 12, the at least one second radiation unit 22, and the first electrode layer are all of a mesh structure, projections of hollow portions of the mesh structures of these layers on the first base substrate 21 substantially overlap each other, that is, the extending directions of the conductive filaments of the mesh structures of these layers may be parallel to each other.

Figure 10B:
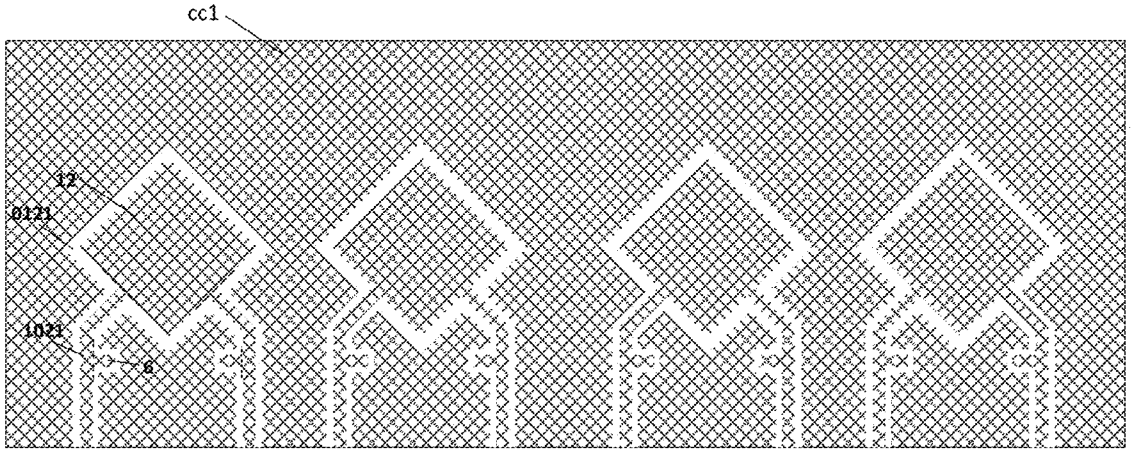
FIG. 10*b* is a top view of a first metal mesh layer of an antenna according to an embodiment of the present disclosure.

In some examples, referring to FIG. 10*b*, the first base substrate 21 further includes a first metal mesh layer, which is arranged on a side of the first base substrate 21 away from the first electrode layer. The first metal mesh layer includes at least one first radiation unit 12, and the first feeding unit connected to the first radiation unit 12, the first feeding unit may include the plurality of first feeding lines 1021, and an impedance matching structure 6 may be connected to each first feeding line 1021. The first metal mesh layer has at least one first cutout 0121, and each first cutout 0121 separates out one first radiation unit 12 from the first metal mesh layer, that is, a part of the metal mesh is removed according to the shape of the first radiation unit 12 in the first metal mesh layer to form the first cutout 0121, so as to obtain the first radiation unit 12. Accordingly, if a part of the metal mesh is removed according to shapes of the first feeding unit and the impedance matching structure 6, the first feeding line and the impedance matching structure 1021 may be obtained. In the above manner, the parts of the first metal mesh layer forming the first radiation unit 12, the first feeding unit and the impedance matching structure 6, and the rest parts are all metal meshes, so that each part of the first metal mesh layer has a uniform reflectivity.

Figure 10C:
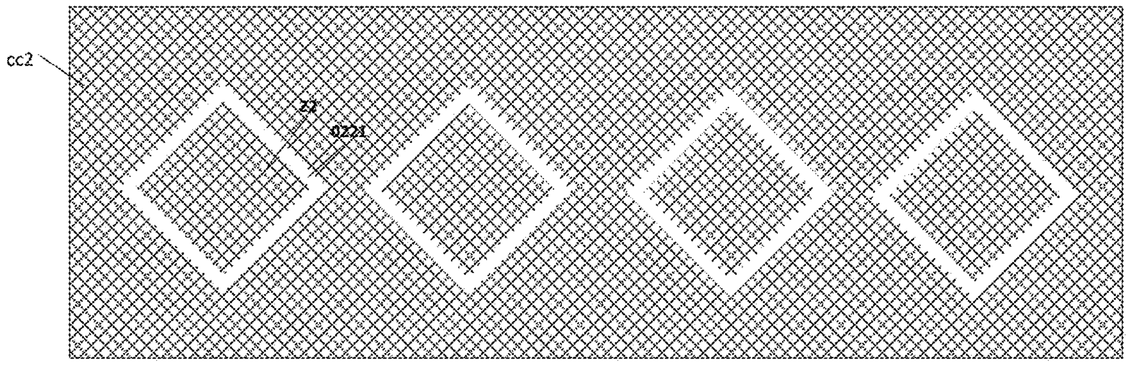
FIG. 10*c* is a top view of a second metal mesh layer of an antenna according to an embodiment of the present disclosure.

In some examples, referring to FIG. 10*c*, the third substrate 103 may further include a third base substrate 1031 and a second metal mesh layer, which is arranged on a side of the third base substrate 1031 away from the first base substrate 21. The second metal mesh layer has at least one second cutout 0221, and each second cutout 0221 separates out one second radiation unit 22 from the second metal mesh layer, that is, a part of the metal mesh is removed according to the shape of the second radiation unit 22 in the second metal mesh layer to form the second cutout 0221, so as to obtain the second radiation unit 22. In the above manner, a part of the second metal mesh layer forming the second radiation unit 22, and the rest parts are all metal meshes, so that each part of the second metal mesh layer has a uniform reflectivity.

Figure 11:
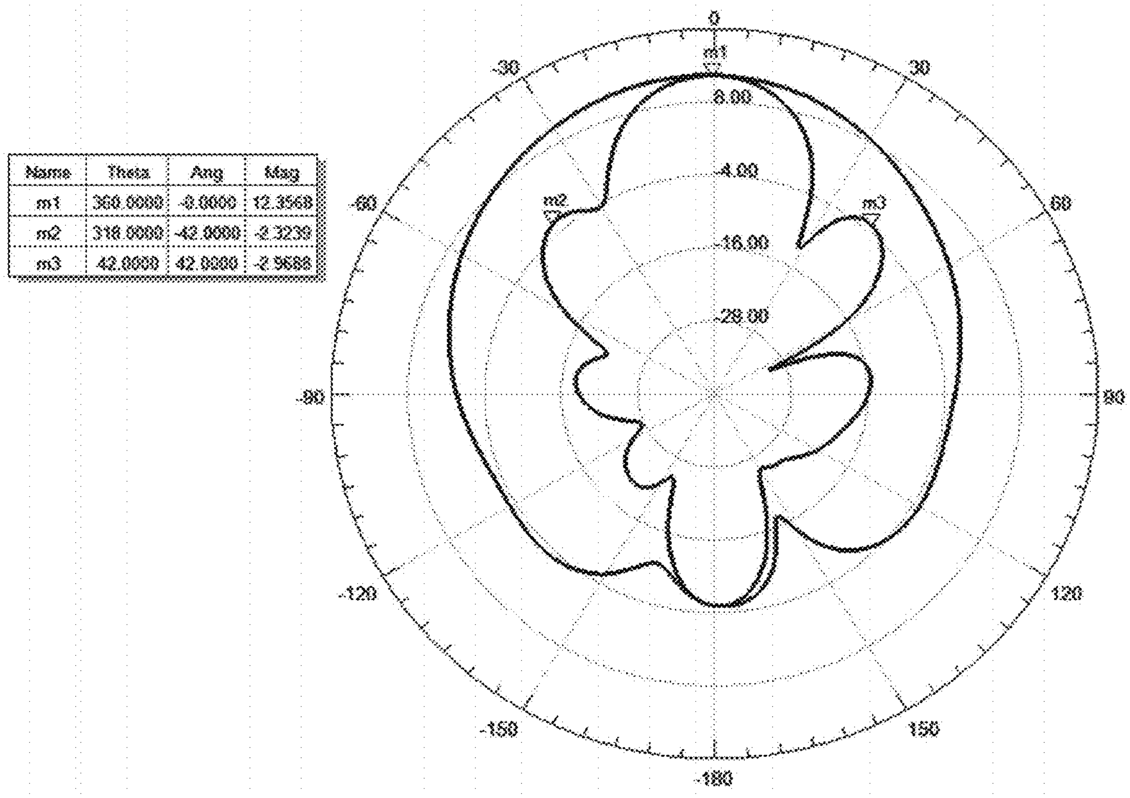
FIG. 11 is a schematic diagram of beam patterns of an antenna in two polarization directions according to an embodiment of the present disclosure.
Figure 12:
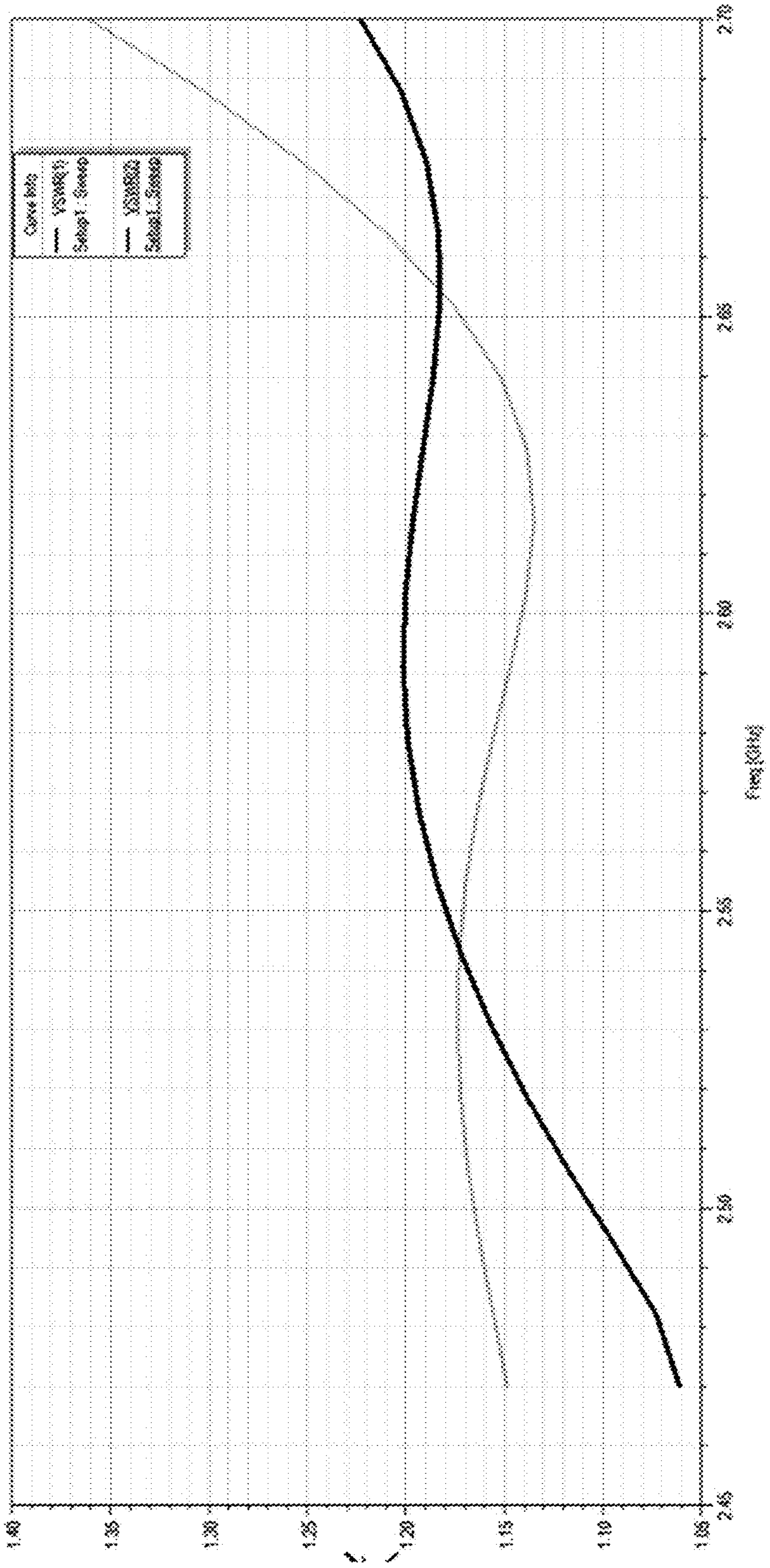
FIG. 12 is a schematic diagram of standing wave ratios of an antenna in two polarization directions according to an embodiment of the present disclosure.
Figure 13:
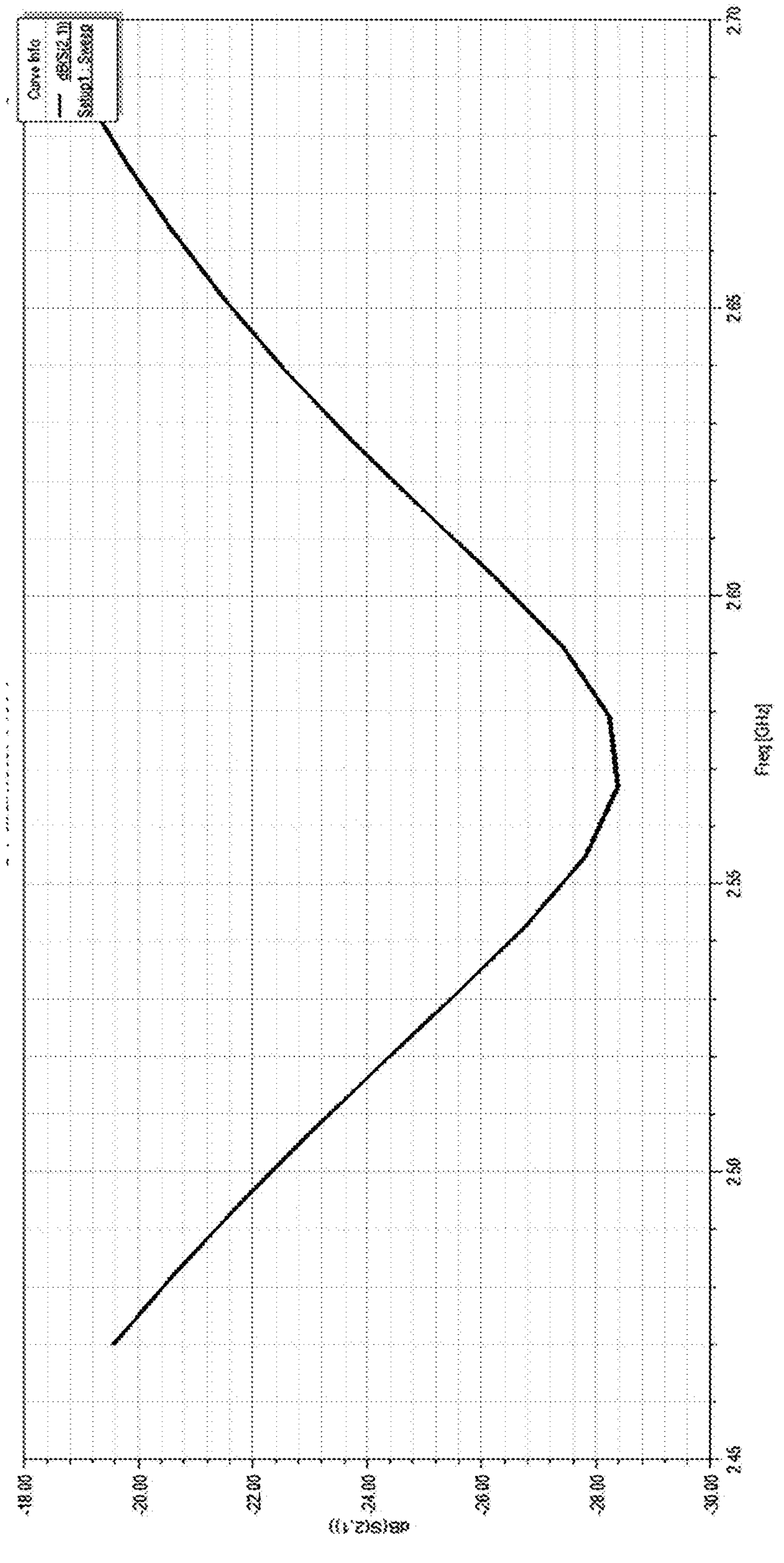
FIG. 13 is a schematic diagram of an isolation of an antenna according to an embodiment of the present disclosure.
Figure 14:
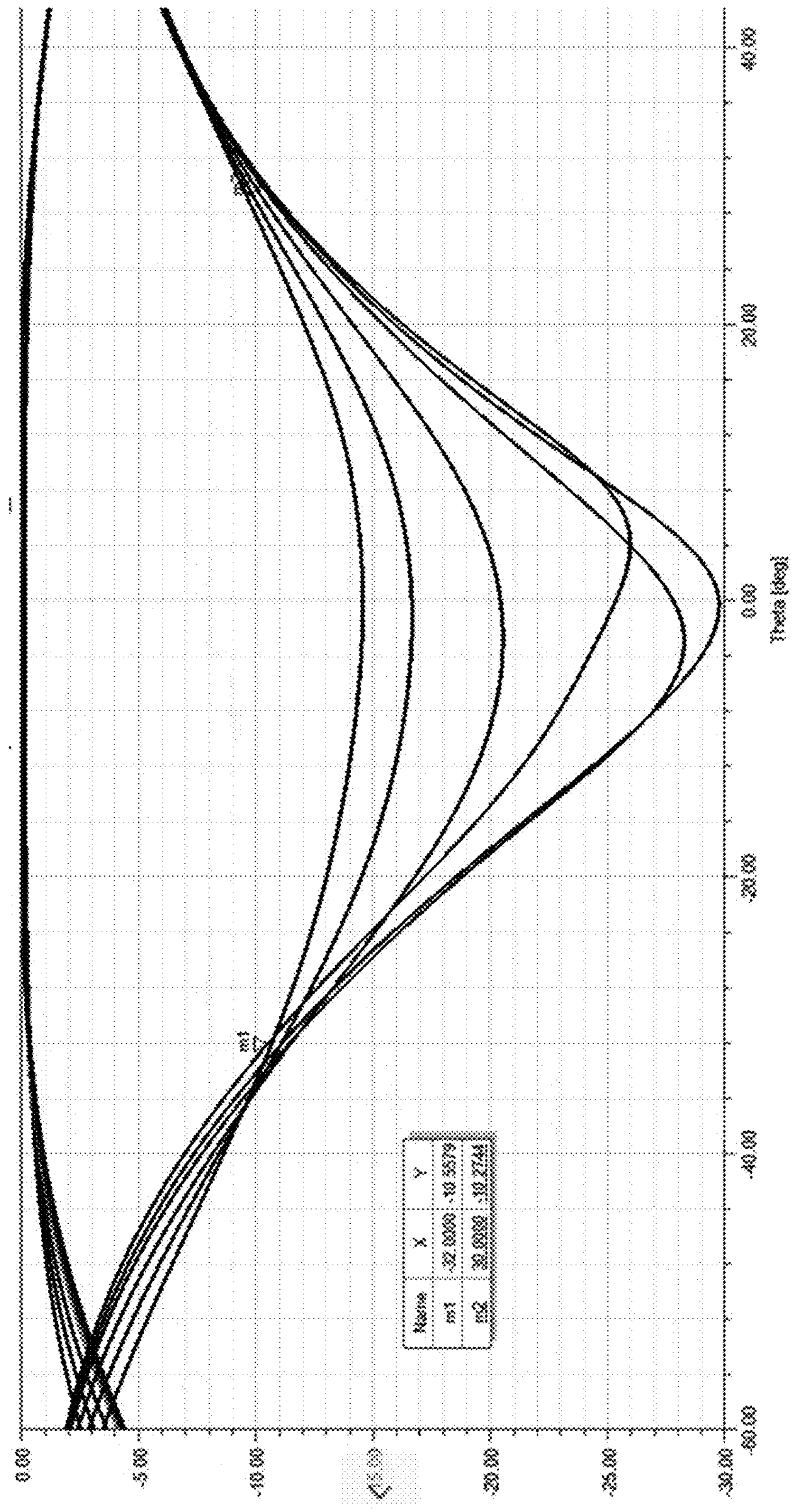
FIG. 14 is a schematic diagram of cross-polarizations of an antenna in different directions according to an embodiment of the present disclosure.

According to the above antenna, the inventors have conducted simulation experiments. FIG. 11 illustrates beam patterns of an antenna in two polarization directions according to an embodiment of the present disclosure, and it may be seen from the figure that the antenna may realize beam directions of various angles. FIG. 12 is a schematic diagram of a standing wave ratio of an antenna according to an embodiment of the present disclosure. As may be seen from FIG. 12, through optimization, the antenna according to the embodiment of the present disclosure obtains excellent matching characteristics with a standing wave ratio of less than 1.36 in an operating frequency. FIG. 13 is a schematic diagram of an isolation of an antenna according to an embodiment of the present disclosure. The antenna according to an embodiment of the present disclosure has an isolation greater than 19.5 dB within the operating frequency. FIG. 14 is a schematic diagram of cross-polarizations of an antenna in different directions according to an embodiment of the present disclosure. The antenna according to the embodiment of the present disclosure may implement cross-polarization in each direction.

In a second aspect, an embodiment of the present disclosure provide a glass window system (i.e., a communication system) that includes the antenna as described above, which may be fixed to an inner side of the glass window.

The glass window system according to an embodiment of the present disclosure may be used in a glass window system for an automobile, a train (including a high-speed rail train), an aircraft, a building, or the like. The antenna may be fixed to an inner side (a side close to the room) of the glass window. Since the antenna has a higher optical transmittance, it has little influence on the transmittance of the glass window while realizing a communication function, and the antenna will also be a trend toward an embellished antenna. The glass window according to an embodiment of the present disclosure includes, but is not limited to, a double-layer glass, and the type of the glass window may alternatively be a single-layer glass, a laminated glass, a thin glass, a thick glass, or the like.

Figure 16:
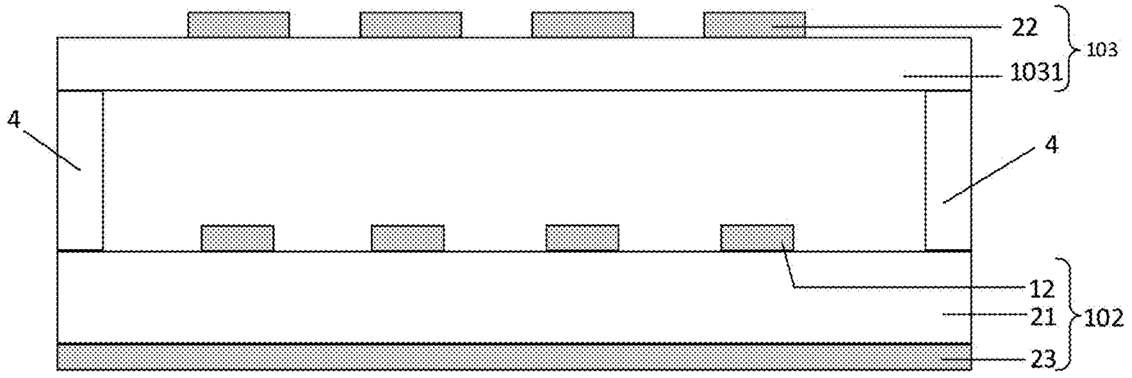
FIG. 16 is a cross-sectional view of an embodiment of an antenna according to an embodiment of the present disclosure.
Figure 17:
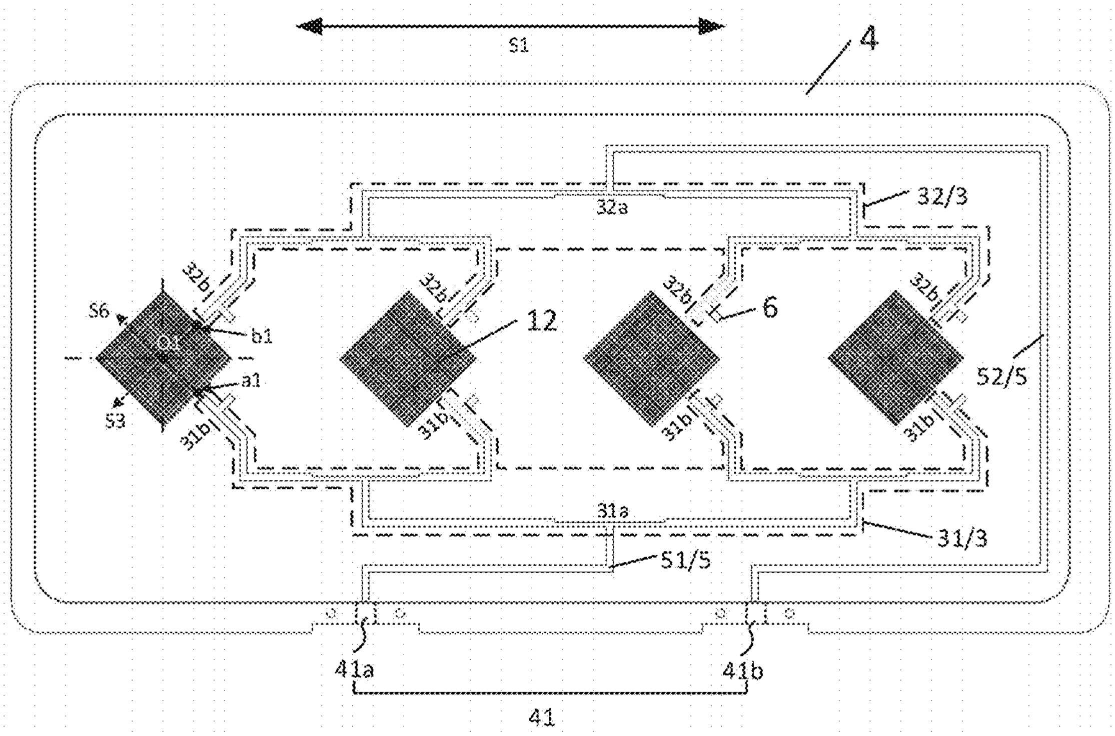
FIG. 17 is a top view of an embodiment (a first substrate) of an antenna according to an embodiment of the present disclosure.
Figure 18:
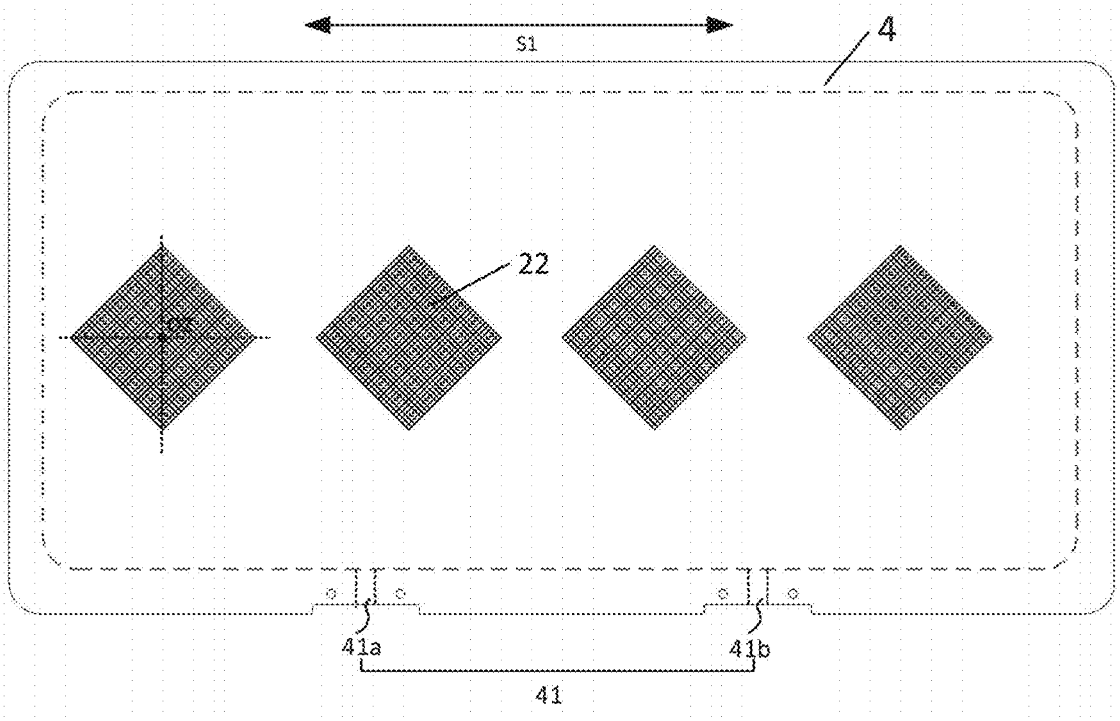
FIG. 18 is a top view of an embodiment (a third substrate) of an antenna according to an embodiment of the present disclosure.

An embodiment of the present disclosure provides an antenna, which includes the first substrate 102 and the third substrate 103 that are oppositely arranged. As shown in FIGS. 16 to 18, FIG. 16 is an exemplary cross-sectional view of the antenna according to an embodiment of the present disclosure. FIG. 17 is an exemplary top view of the first substrate 102 of the antenna according to an embodiment of the present disclosure, and FIG. 18 is an exemplary top view of the third substrate 103 of the antenna according to an embodiment of the present disclosure. The third substrate 103 may include the third base substrate 1031 and the at least one second radiation unit 22, where the at least one second radiation unit 22 is located on a side of the third base substrate 1031 away from the first substrate 102. The first substrate 102 may include the first base substrate 21, the at least one first radiation unit 12, and at least one power division feeding structure 3. The at least one first radiation unit 12 is located on a side of the first base substrate 21 close to the third substrate 103, the at least one first radiation unit 12 is arranged in a one-to-one correspondence with the at least one second radiation unit 22, and an orthographic projection of each first radiation unit 12 on the first base substrate 21 and an orthographic projection of the second radiation unit 22 corresponding to the first radiation unit 12 on the first base substrate 21 at least partially overlap each other. That is, each second radiation unit 22 and the corresponding first radiation unit 12 are arranged opposite to each other, a radio frequency signal is fed to the first radiation unit 12 firstly, and then fed to the corresponding second radiation unit 22 from the first radiation unit 12. The first radiation unit 12 corresponds to the second radiation unit 22, which means that the radio frequency signal transmitted by the first radiation unit 12 is fed to the corresponding second radiation unit 22.

Further, the at least one power division feeding structure 3 on the first base substrate 21 is arranged on a side of the first base substrate 21 close to the third substrate 103, each power division feeding structure 3 has one first port (for example, 31*a* and 32*a* in FIG. 17) and a plurality of second ports (for example, 31*b* and 32*b* in FIG. 17), each second port of each power division feeding structure 3 is correspondingly connected to one first radiation unit 12. The antenna according to the embodiment of the present disclosure may be used as a receiving antenna, or a transmitting antenna, and may transmit and receive signals simultaneously. When the antenna transmits a signal, the first port of each power division feeding structure 3 receives a radio frequency signal, the power division feeding structure 3 divides the radio frequency signal into a plurality of sub-signals, each sub-signal is output to the first radiation unit 12 connected to one second port through the second port, and the first radiation unit 12 feeds the sub-signal to the second radiation unit 22 directly opposite to the first radiation unit 12. When the antenna receives a signal, after any one of the second radiation units 22 receives a radio frequency signal, the radio frequency signal is fed to the first radiation unit 12 directly opposite to the second radiation unit 22, and the first radiation unit 22 transmits the radio frequency signal to the first port through the second port connected to the first radiation unit 12.

It should be noted that in this embodiment, the second base substrate 1041 of the second substrate 104 is integrally arranged with the first base substrate 21 of the first substrate 102, so that the first feeding unit and the second feeding unit have a one-piece structure, and the structure formed by the first feeding unit and the second feeding unit is hereinafter referred to as a power division feeding unit 3.

It should be noted that the antenna disclosed in this embodiment may include N number of the first radiation units 12 and N number of the second radiation units 22, where N is any integer greater than 0. The number of the second radiation units 22 and the number of the first radiation units 12 may be different from each other, as long as each first radiation unit 12 is arranged corresponding to one second radiation unit 22. In an embodiment of the present disclosure, as an example, four second radiation units 22 are arranged on the first base substrate 1, and four first radiation units 12 are arranged on the second base substrate 2, but the present disclosure is not limited thereto.

In the antenna according to the embodiment of the present disclosure, the at least one second radiation unit 22 and the at least one first radiation unit 12 are arranged opposite to each other, and a signal (for example, a radio frequency signal) is fed to the second radiation unit 22 through the corresponding first radiation unit 12, so that compared with a case where only one of the second radiation unit and the first radiation unit is provided, a radiation area of the radiation unit is increased by the second radiation unit 22 and the first radiation unit 12 that are opposite to each other, thereby effectively improving radiation efficiency.

In some examples, the first substrate 102 of the antenna according to the embodiment of the present disclosure may further include the reference electrode layer 23, and the reference electrode layer 23 is arranged on a side of the first base substrate 21 away from the first radiation unit 12, and a reference voltage is input to the reference electrode layer 23, so as to provide a reference potential for the antenna. The reference electrode layer 23 may be a planar electrode covering an entire surface of the first base substrate 21 away from the first radiation unit 12; the reference electrode layer 23 may alternatively be patterned, as long as an orthographic projection of the reference electrode layer 23 on the first base substrate 21 may cover an orthographic projection of each of the first radiation unit 12 and/or the second radiation unit 22 on the first base substrate 21, which is not limited herein.

In some examples, a thickness of the first base substrate 21 of the first substrate 102 may be in a range from 100 micrometers to 1000 micrometers, and a thickness of the third base substrate 1031 may be in a range from 100 micrometers to 1000 micrometers. For example, the thickness of the first base substrate 21 may be set to have a larger thickness value, for example, 1000 micrometers, so that by increasing the thickness of the first base substrate 21, a distance between the first radiation unit 12 and the reference electrode layer 23 may be increased, and at the same time, a distance between the second radiation unit 22 and the reference electrode layer 23 may be increased, and therefore, a capacitance to ground between the first radiation unit 12 and the reference electrode layer 23 is small, and similarly, a capacitance to ground between the second radiation unit 22 and the reference electrode layer 23 is also small, so that an influence of the capacitance to ground on a resonance may be effectively reduced, and a bandwidth of the antenna may be increased. The thickness of the third base substrate 1031 may be the same as or different from that of the first base substrate 21, for example, the thickness of the third base substrate 1031 may be set to be 250 μm, which is not limited herein.

It should be noted that a distance between the third substrate 103 and the first substrate 102 defines a thickness of a dielectric layer of the antenna according to the embodiment of the present disclosure, and in a process of feeding the microwave signal transmitted by the first radiation unit 12 to the second radiation unit 22, the microwave signal passes through the dielectric layer between the third substrate 103 and the first substrate 102, and the dielectric layer may include various types of media, such as a glass medium, an air medium, and the like. The thickness of the dielectric layer affects transmission loss, phase, etc. of the microwave signal. If the antenna according to the embodiment of the present disclosure uses an air medium as the dielectric layer, that is, air is present between the third substrate 103 and the first substrate 102, and the microwave signal transmitted by the first radiation unit 12 is fed to the second radiation unit 22 through the air medium, a size of a clearance area of the antenna is defined by the distance between the third substrate 103 and the first substrate 102. If the distance between the third substrate 103 and the first substrate 102 is larger, the clearance area of the antenna is larger, so that a bandwidth of the antenna may be effectively increased, resonance may be weakened, and radiation efficiency of the antenna may be further increased. The distance between the third substrate 103 and the first substrate 102 of the antenna according to the embodiment of the present disclosure may be in a range from 5 millimeters to 50 millimeters. For example, the distance between the third substrate 103 and the first substrate 102 may be 8 millimeters. Specifically, the distance may be set according to the type of the media, a frequency of a microwave signal, and the like, which is not limited herein.

In some examples, with continued reference to FIGS. 16 to 18, the at least one second radiation unit 22 is arranged in a one-to-one correspondence with the at least one first radiation unit 12, that is, in the antenna according to an embodiment of the present disclosure, the number of the second radiation units 22 is the same as that of the first radiation units 12, the second radiation units 22 are arranged in a one-to-one correspondence with the first radiation units 12. An area of each second radiation unit 22 may be slightly greater than that of the first radiation unit 12 corresponding to the second radiation unit 22, that is, an area of the orthographic projection of the second radiation unit 22 on the first base substrate 21 is greater than an area of the orthographic projection of the corresponding first radiation unit 12 on the first base substrate 21. Each second radiation unit 22 is arranged opposite to one corresponding first radiation unit 12, that is, the orthographic projection of the first radiation unit 12 on the first base substrate 21 is located in the orthographic projection of the second radiation unit 22 corresponding to the first radiation unit 12 on the first base substrate 21, which ensures that each second radiation unit 22 completely covers the corresponding first radiation unit 12, and that in a process that the second radiation unit 22 feeds a signal to the first radiation unit 12, the first radiation unit 12 may receive the energy of the signal (for example, a radio frequency signal) fed by the second radiation unit 22 to a maximum extent. Alternatively, the area of the second radiation unit 22 may be equal to the area of the first radiation unit 12, or less than the area of the first radiation unit 12, which is only an exemplary illustration and is not limited to the present disclosure.

In some examples, with continued reference to FIGS. 16 to 18, the size of the first radiation unit 1 and/or the first radiation unit 12 may be set according to a wavelength of the microwave signal transmitted by the antenna. For example, the second radiation unit 22 and/or the first radiation unit 12 may be a square radiation unit, a length of side of the square radiation unit may be one half or one quarter of the wavelength of the microwave signal, and alternatively, the size of the first radiation unit 1 and/or the first radiation unit 12 may also be other sizes, which is not limited herein. Further, the size of the second radiation unit 22 may be slightly greater than the size of the first radiation unit 12. Specifically, a size relationship between the second radiation unit 22 and the first radiation unit 12 may be set according to the wavelength of the microwave signal. For example, the second radiation unit 22 and the first radiation unit 12 may be square radiation units, the length of side of the second radiation unit 22 may be greater than the length of side of the first radiation unit 12 by one eighth of the wavelength of the microwave signal, and alternatively, the size relationship between the second radiation unit 22 and the first radiation unit 12 may be other sizes, which is not limited herein.

In some examples, with continued reference to FIGS. 16 to 18, if the antenna includes a plurality of second radiation units 22 and a plurality of first radiation units 12, a spacing between any two adjacent second radiation units 22 may be set according to the wavelength of the microwave signal transmitted by the antenna. For example, the spacing between any two adjacent second radiation units 22 is one half of the wavelength of the microwave signal. Accordingly, a spacing between any two adjacent first radiation units 12 may be set according to the wavelength of the microwave signal transmitted by the antenna. For example, the spacing between any two adjacent first radiation units 12 is half of the wavelength of the microwave signal. Alternatively, the spacing between adjacent second radiation units 22 or the spacing between adjacent first radiation units 12 may be set in other forms, which is not limited herein.

In some examples, the antenna according to the embodiment of the present disclosure may transmit and receive signals simultaneously, that is, the antenna according to the embodiment of the present disclosure may operate in a transceiving duplex mode, and therefore, the second radiation unit 22 and the first radiation unit 12 have two polarization directions, so that the antenna is a dual-polarized antenna. If the antenna is a dual-polarized antenna, the shape of the second radiation unit 22 and the shape of the first radiation unit 12 are both centrosymmetric patterns. Specifically, the shape of the second radiation unit 22 and the shape of the first radiation unit 12 may be a square, a cross, an equilateral rhombus, etc., and it should be noted that the square, the cross, and the equilateral rhombus may not be a square, a cross, or an equilateral rhombus in a strict sense, and the shape of the second radiation unit 22 and the shape of the first radiation unit 12 may be approximately a square, a cross, or an equilateral rhombus. In the following, as an example, the shape of each first radiation unit 12 and the shape of each second radiation unit 22 are a square.

Further, referring to FIGS. 16 to 18, the shape of the second radiation unit 22 and the shape of the first radiation unit 12 are both centrosymmetric patterns, and the second radiation unit 22 and the corresponding first radiation unit 12 may be arranged directly opposite to each other, that is, an orthographic projection of a symmetrical center of the second radiation unit 22 on the first base substrate 21 coincides with an orthographic projection of a symmetrical center of the first radiation unit 12 corresponding to the second radiation unit 22 on the first base substrate 21. Referring to FIGS. 17 and 18, as an example, the first radiation units 12 in FIG. 17 are square radiation units, the symmetry center of the first radiation unit 12, which is a square radiation unit, is an intersection point of two diagonal lines of the square radiation unit, which is referred to as a first symmetry center O1. As an example, the second radiation units 22 in FIG. 18 are square radiation units, the symmetry center of the second radiation unit 22, which is a square radiation unit, is an intersection point of two diagonal lines of the square radiation unit, which is referred to as a second symmetry center O2. Each second radiation unit 22 is arranged directly opposite to the corresponding first radiation unit 12, so that the orthographic projection of the first symmetric center O1 of each second radiation unit 22 on the first base substrate 21 coincides with the orthographic projection of the second symmetric center O2 of the first radiation unit 12 corresponding to the second radiation unit 22 on the first base substrate 21, thereby ensuring that the second radiation units 22 may receive all the radiation energy of the signal fed by the second radiation units 22 as much as possible, and further improving the radiation efficiency of the antenna. It should be noted that one second radiation unit 12 receives a signal fed from one second radiation unit 22, which means that the second radiation unit 22 corresponds to the first radiation unit 12.

In some examples, with continued reference to FIGS. 16 to 18, the antenna according to the embodiment of the present disclosure may be a dual-polarized antenna, and thus, the shape of the second radiation unit 22 and the shape of the first radiation unit 12 are both centrosymmetric patterns. The following description will be given by taking an example that the shape of the second radiation unit 22 and the shape of the first radiation unit 12 are both square. In order to cause the first radiation unit 12 to form a dual polarization, signals may be input to the first radiation unit 12 through two paths, so that the antenna may include two power division feeding structures 3, namely a first power division feeding structure 31 and a second power division feeding structure 31. The first power division feeding structure 31 may have one first port 31*a* and a plurality of second ports 31*b*, each second port 31*b* of the first power division feeding structure 31 is connected to one first radiation unit 12, and a position at which the second port 31*b* of the first power division feeding structure 31 is connected to the first radiation unit 12 corresponding to the second port 31*b* is a first connecting point a1. The second power division feeding structure 32 may have one first port 32*a* and a plurality of second ports 32*b*, each second port 32*b* of the second power division feeding structure 32 is connected to one first radiation unit 12, and a position at which the second port 32*b* of the second power division feeding structure 32 is connected to the first radiation unit 12 corresponding to the second port 32*b* is a second connecting point b1. That is, each first radiation unit 12 is connected with one second port 31*b* of the first power division feeding structure 31 and one second port 32*b* of the second power division feeding structure 32, the second port 31*b* of the first power division feeding structure 31 and the second port 32*b* of the second power division feeding structure 32 form two polarization directions with the first radiation unit 12, respectively, and the polarization direction formed by the second port 31*b* of the first power division feeding structure 31 and the first radiation unit 12 is different from the polarization direction formed by the second port 32*b* of the second power division feeding structure 32 and the first radiation unit 12. Specifically, the symmetry center of the first radiation unit 12 is the first symmetry center O1, and an extending direction of a line connecting the first connecting point a1 of each first radiation unit 12 and the symmetry center (i.e., the first symmetry center O1) of the first radiation unit 12 intersects with an extending direction of a line connecting the second connecting point b1 of the first radiation unit 12 and the symmetry center (i.e., the first symmetry center O1) of the first radiation unit 12. By taking FIG. 17 as an example, in FIG. 17, the extending direction of the connecting line between the first connecting point a1 of each first radiation unit 12 and the symmetry center (i.e., the first symmetry center O1) of the first radiation unit 12 is a direction shown as a sixth direction S6, the extending direction of the connecting line between the second connecting point b1 of the same first radiation unit 12 and the symmetry center (i.e., the first symmetry center O1) of the first radiation unit 12 is a direction shown as a third direction S3, the sixth direction S6 is not parallel to the third direction S3, and the sixth direction S6 intersects the third direction S3, which ensures that the polarization direction formed by the second port 31*b* of the first power division feeding structure 31 and the first radiation unit 12 is different from the polarization direction formed by the second port 32*b* of the second power division feeding structure 32 and the first radiation unit 12, and therefore, a first path for transmitting a signal formed between the second port 31*b* of the first power division feeding structure 31 and the first radiation unit 12 is isolated from a second path for transmitting a signal formed between the second port 32*b* of the second power division feeding structure 32 and the first radiation unit 12. If the antenna simultaneously transmits and receives signals, the transmitted signal may be fed to the second radiation units 22 through one of the first and second paths, the signal received by the second radiation units 22 may be fed to and are received by the first radiation units 12 through the other of the first and second paths, so that the signals through the first and second paths are not interfered with each other, and the dual-polarized antenna is formed.

In some examples, with continuing reference to FIGS. 16 to 18, specifically, a specific direction of the polarization direction formed by the second port 31*b* of the first power division feeding structure 31 and the first radiation unit 12, and a specific direction of the polarization direction formed by the second port 32*b* of the second power division feeding structure 32 and the first radiation unit 12 may include multiple forms, for example, the polarization direction formed by the second port 31*b* of the first power division feeding structure 31 and the first radiation unit 12 may be at +45°, the polarization direction formed by the second port 32*b* of the second power division feeding structure 32 and the first radiation unit 12 may be at −45°. Based on the above, in order to cause the polarization direction formed by the second port 31*b* of the first power division feeding structure 31 and the first radiation unit 12 to be at +45° and cause the polarization direction formed by the second port 32*b* of the second power division feeding structure 32 and the first radiation unit 12 to be at −45°, the extending direction (for example, the first direction S2) of the connecting line between the first connecting point a1 of each first radiation unit 12 and the symmetry center (i.e., the first symmetry center O1) of the first radiation unit 12 may be perpendicular to the extending direction (for example, the third direction S3) of the connecting line between the second connecting point b1 of the same first radiation unit 12 and the symmetry center (i.e., the first symmetry center O1) of the first radiation unit 12, so that the polarization direction formed by the second port 31*b* of the first power division feeding structure 31 and the first radiation unit 12 is at +45°, and the polarization direction formed by the second port 32*b* of the second power division feeding structure 32 and the first radiation unit 12 is at −45°. The polarization orthogonality of +45° may ensure that an isolation between the antennas of +45° and −45° meets the requirement of intermodulation on the isolation between the antennas (greater than or equal to 30 dB). It should be noted that the polarization direction may be regarded as an angle between the microwave signal transmitted by the second radiation unit 22 or the first radiation unit 12 and the ground plane. In this embodiment, the polarization direction (hereinafter referred to as a first polarization direction) formed by the second port 31*b* of the first power division feeding structure 31 and the first radiation unit 12 is perpendicular to the polarization direction (hereinafter referred to as a second polarization direction) formed by the second port 32*b* of the second power division feeding structure 32 and the first radiation unit 12 (that is, an angle between the first polarization direction and the second polarization direction is 90°), an angle between the first polarization direction and the ground plane is 45°, an angle between the second polarization direction and the ground plane is also 45°, so that one of the first polarization direction and the second polarization direction is defined as +45°, the other is −45°. In the above, the first polarization direction is at +45°, the second polarization direction is at −45°, as an example. Alternatively, the two polarization directions may be at other angles, which is not limited herein.

In some examples, referring to FIG. 17, the power division feeding structure 3 may include multiple types of power division feeding structures. For example, the power division feeding structure 3 may be a transmission line structure, and may alternatively be a waveguide power division structure, which is not limited herein. In this embodiment, the power division feeding structures 3 (for example, the first power division feeding structure 31 and the second power division feeding structure 32) are transmission line structures, as an example. As an example, the power division feeding structure 3 is a one-to-four power division feeding structure, the power division feeding structure 3 is composed of a main segment and four sub-segments, a first port (for example, 31*a*) may be provided at a midpoint of the main segment in a length direction thereof, two ends of the main segment are connected to first ends of two sub-segments, respectively, second ends of the two sub-segments are connected to second ports (for example, 31*b*), respectively, and a second end of each sub-segment extends to the first radiation unit 12 and is connected to the first radiation unit 12. Alternatively, the power division feeding structure 3 may be other structures, which are only exemplary and do not limit the present disclosure.

In some examples, the shape of the second radiation unit 22 and the shape of the first radiation unit 12 are both centrosymmetric patterns. Specifically, the shapes of the second radiation unit 22 and the first radiation unit 12 may be various shapes, for example, referring to FIGS. 17 and 18, the second radiation unit 22 and the first radiation unit 12 are both square radiation units. If the antenna is a dual-polarized antenna, the antenna includes the first power division feeding structure 31 and the second power division feeding structure 32, the second port 31*b* of the first power division feeding structure 31 and the second port 32*b* of the second power division feeding structure 32 are connected to two adjacent sides of the first radiation unit 12, respectively. Specifically, the second port 31*b* of the first power division feeding structure 31 is connected to a midpoint of one side of the first radiation unit 12 in a length direction thereof, that is, the first connecting point a1 is at the midpoint of one side of the first radiation unit 12 in the length direction thereof. The second port 32*b* of the second power division feeding structure 32 is connected to a midpoint of a side of the first radiation unit 12 adjacent to the above side in a length direction thereof, that is, the second connecting point b1 is at the midpoint of the side of the first radiation unit 12 adjacent to the above side in the length direction thereof. Since any two adjacent sides of the first radiation unit 12, which is the square radiation unit, are perpendicular to each other, the extending direction (for example, the first direction S2) of the connecting line between the first connecting point a1 of each first radiation unit 12 and the symmetry center (i.e., the first symmetry center O1) of the first radiation unit 12 is also perpendicular to the extending direction (for example, the third direction S3) of the connecting line between the second connecting point b1 of the same first radiation unit 12 and the symmetry center (i.e., the first symmetry center O1) of this first radiation unit 12, so that the polarization direction formed by the second port 31*b* of the first power division feeding structure 31 and the first radiation unit 12 is at +45°, and the polarization direction formed by the second port 32*b* of the second power division feeding structure 32 and the first radiation unit 12 is at −45°.

Figure 19:
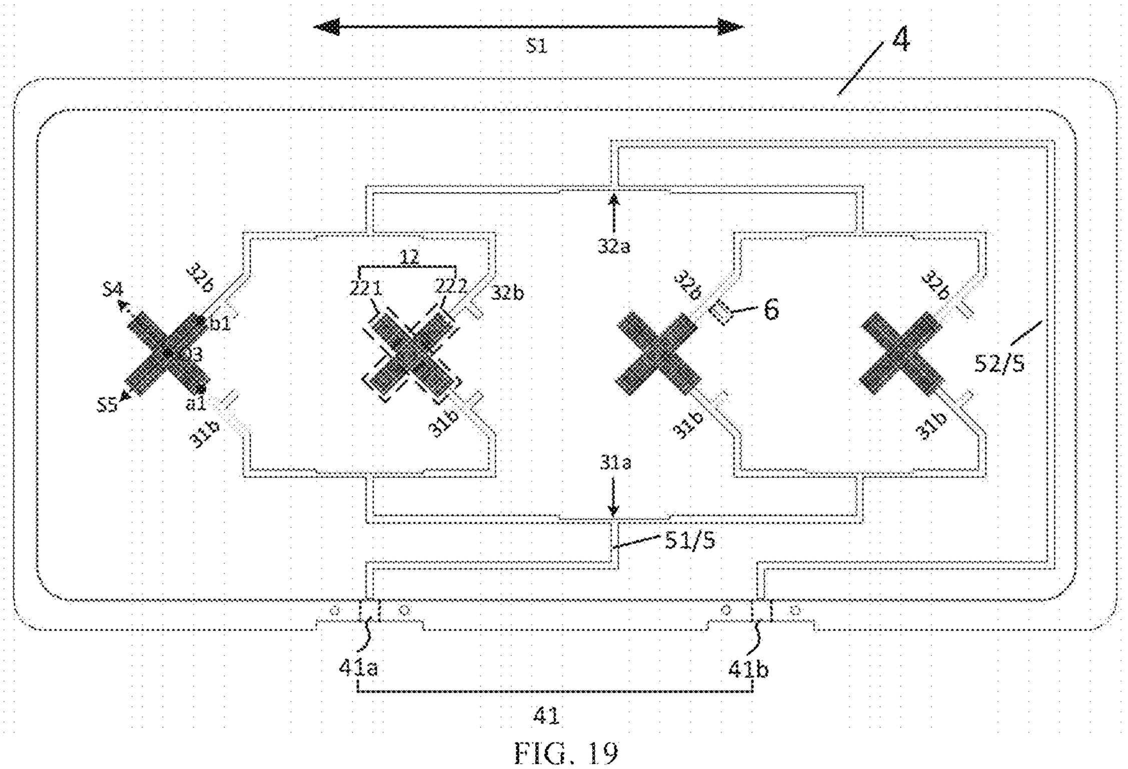
FIG. 19 is a top view of another embodiment (a first substrate) of an antenna according to an embodiment of the present disclosure.
Figure 20:
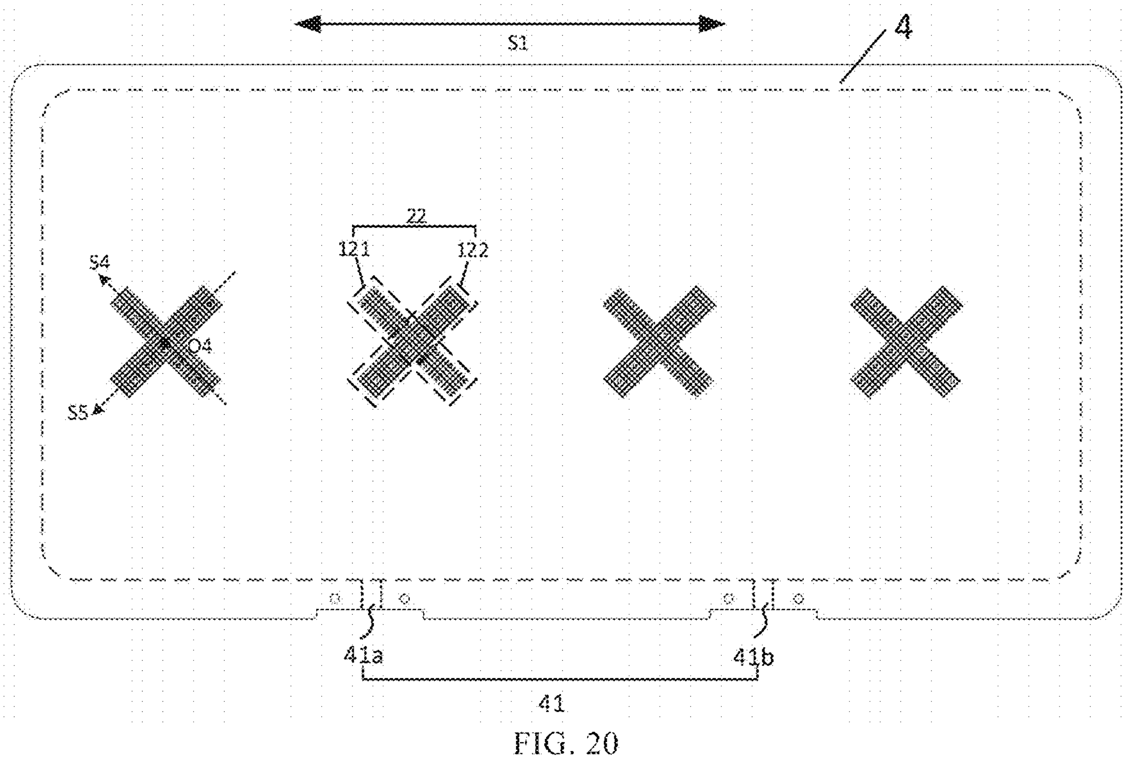
FIG. 20 is a top view of another embodiment (a third substrate) of an antenna according to an embodiment of the present disclosure.
Figure 21:
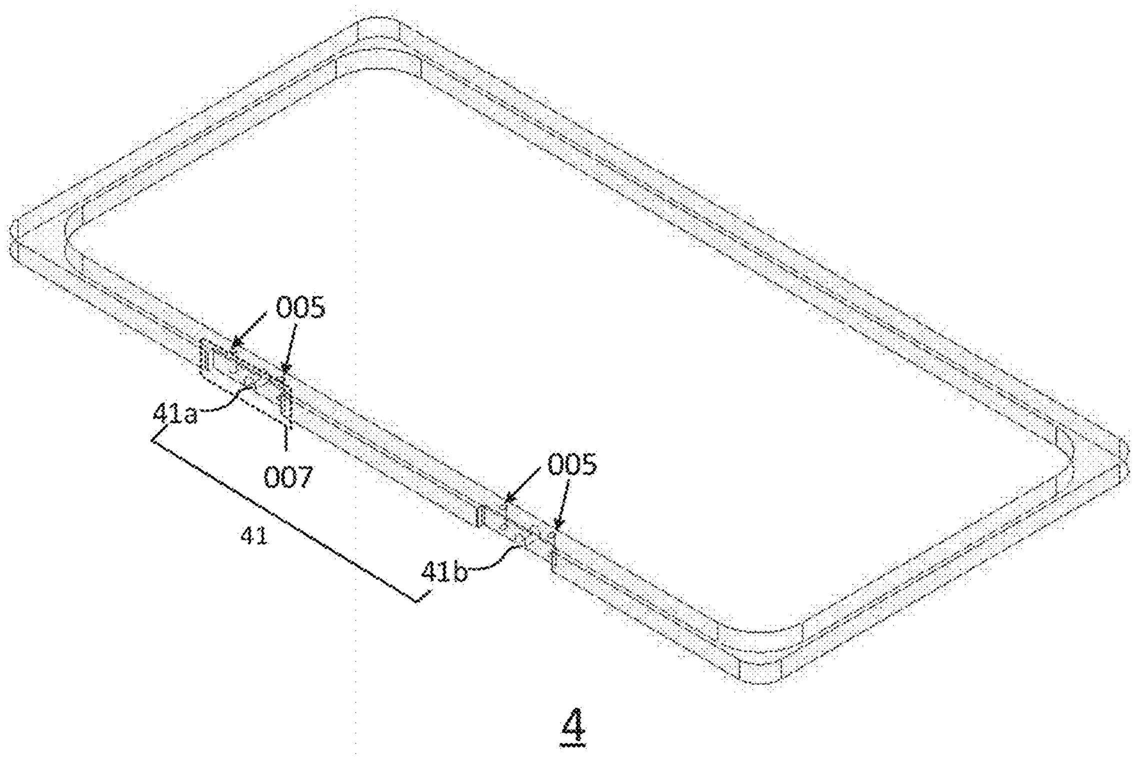
FIG. 21 is a schematic diagram of a structure of an embodiment of a support frame of an antenna according to an embodiment of the present disclosure.

For another example, referring to FIGS. 19 and 20, as shown in FIG. 20, the second radiation unit 22 may include a first radiation sub-unit 121 and a second radiation sub-unit 122, an extending direction of the first radiation sub-unit 121 intersects an extending direction of the second radiation sub-unit 122, and an intersection of the first radiation sub-unit 121 and the second radiation sub-unit 122 is a symmetry center of the second radiation unit 22. As shown in FIG. 19, the first radiation unit 12 includes a third radiation sub-unit 221 and a fourth radiation sub-unit 222, an extending direction of the third radiation sub-unit 221 intersects an extending direction of the fourth radiation sub-unit 222, and an intersection of the third radiation sub-unit 221 and the fourth radiation sub-unit 222 is a symmetry center of the first radiation unit 12. As an example, all of the first radiation sub-unit 121, the second radiation sub-unit 122, the third radiation sub-unit 221, and the fourth radiation sub-unit 222 are rectangular radiation units, as shown in FIGS. 19 and 20, a length and a width of the first radiation sub-unit 121 are same as those of the second radiation sub-unit 122, respectively, so that a midpoint of the length of the first radiation sub-unit 121 in the extending direction thereof intersects with a midpoint of the length of the second radiation sub-unit 122 in the extending direction thereof, an intersection point is a symmetry center of the second radiation unit 22 and is referred to as a fourth symmetry center O4. The extending direction (for example, the direction shown as S4) of the first radiation sub-unit 121 is perpendicular to the extending direction (for example, the direction shown as S5) of the second radiation sub-unit 122, thereby forming a cross-shaped first radiation sub-unit 12. A length and a width of the third radiation sub-unit 221 are same as those of the fourth radiation sub-unit 222, respectively, so that a midpoint of the length of the third radiation sub-unit 221 in the extending direction thereof intersects with a midpoint of the length of the fourth radiation sub-unit 222 in the extending direction thereof, the intersection point is a symmetry center of the first radiation unit 12 and is referred to as a third symmetry center O3. The extending direction (for example, the direction shown as S4) of the third radiation sub-unit 221 is perpendicular to the extending direction (for example, the direction shown as S5) of the fourth radiation sub-unit 222, thereby forming a cross-shaped first radiation sub-unit 12. Moreover, the extending direction of the first radiation sub-unit 121 of the second radiation unit 22 is the same as the extending direction of the third radiation sub-unit 221 of the first radiation unit 12 (for example, both directions are indicated as S4), and the extending direction of the second radiation sub-unit 122 of the second radiation unit 22 is the same as the extending direction of the fourth radiation sub-unit 222 of the first radiation unit 12 (for example, both directions are indicated as S5), so that the orthographic projection of the first radiation unit 12 on the first base substrate 21 may be located within the orthographic projection of the second radiation unit 22 on the first base substrate 21. If the antenna is a dual-polarized antenna, the antenna includes the first power division feeding structure 31 and the second power division feeding structure 32, where the second port 31*b* of the first power division feeding structure 31 is connected to the third radiation sub-unit 221 of the first radiation unit 12 corresponding to the second port 31*b*; the second port 32*b* of the second power division feeding structure 32 is connected to the fourth radiation sub-unit 222 of the first radiation unit 12 corresponding to the second port 32*b*. Specifically, the second port 31*b* of the first power division feeding structure 31 is connected to one end of the third radiation sub-unit 221 of the first radiation unit 12 corresponding to the second port 31*b*, that is, the first connecting point a1 is located at a midpoint of the end; the second port 32*b* of the second power division feeding structure 32 is connected to one end of the fourth radiation sub-unit 222 of the first radiation unit 12 corresponding to the second port 32*b*, that is, the second connecting point b1 is located at the midpoint of the end. Since the extending direction (for example, the direction shown as S4) of the third radiation sub-unit 221 is perpendicular to the extending direction (for example, the direction shown as S5) of the fourth radiation sub-unit 222, the extending direction (for example, the direction shown as S4) of the connecting line between the first connecting point a1 of each first radiation unit 12 and the symmetry center (for example, the third symmetry center O3) of the first radiation unit 12 is also perpendicular to the extending direction (for example, the direction shown as S5) of the connecting line between the second connecting point b1 of the same first radiation unit 12 and the symmetry center (for example, the third symmetry center O3) of the first radiation unit 12, so that the polarization direction formed by the second port 31*b* of the first power division feeding structure 31 and the first radiation unit 12 is at +45°, and the polarization direction formed by the second port 32*b* of the second power division feeding structure 32 and the first radiation unit 12 is at −45°. Alternatively, the specific structure of the second radiation unit 22 and the first radiation unit 12 may have various forms, which is not limited herein.

In some examples, as shown in FIGS. 16 to 20, by taking an exemplary antenna as an example, the antenna is a dual-polarized antenna having two polarization directions at ±45°. The third substrate 103 of the antenna may include four second radiation units 22 arranged along the first direction S1; the first substrate 102 of the antenna may include four first radiation units 12 arranged along the first direction S1. The antenna includes two power division feeding structures 3, which are the first power division feeding structure 31 and the second power division feeding structure 32, respectively. The first power division feeding structure 31 includes one first port 31*a* and four second ports 31*b*, each second port 31*b* is connected to one first radiation unit 12 at the first connecting point a1; the second power division feeding structure 32 includes one first port 32*a* and four second ports 32*b*, each second port 32*b* is connected to one first radiation unit 12 at the second connecting point b1. The second radiation unit 22 and the first radiation unit 12 are both centrosymmetric patterns, and the extending direction of the connecting line between the first connecting point a1 of each first radiation unit 12 and the symmetry center of the first radiation unit 12 is also perpendicular to the extending direction (for example, the third direction S3) of the connecting line between the second connecting point b1 of the same first radiation unit 12 and the symmetry center of this first radiation unit 12, so as to form two polarization directions at ±45°.

Figure 22:
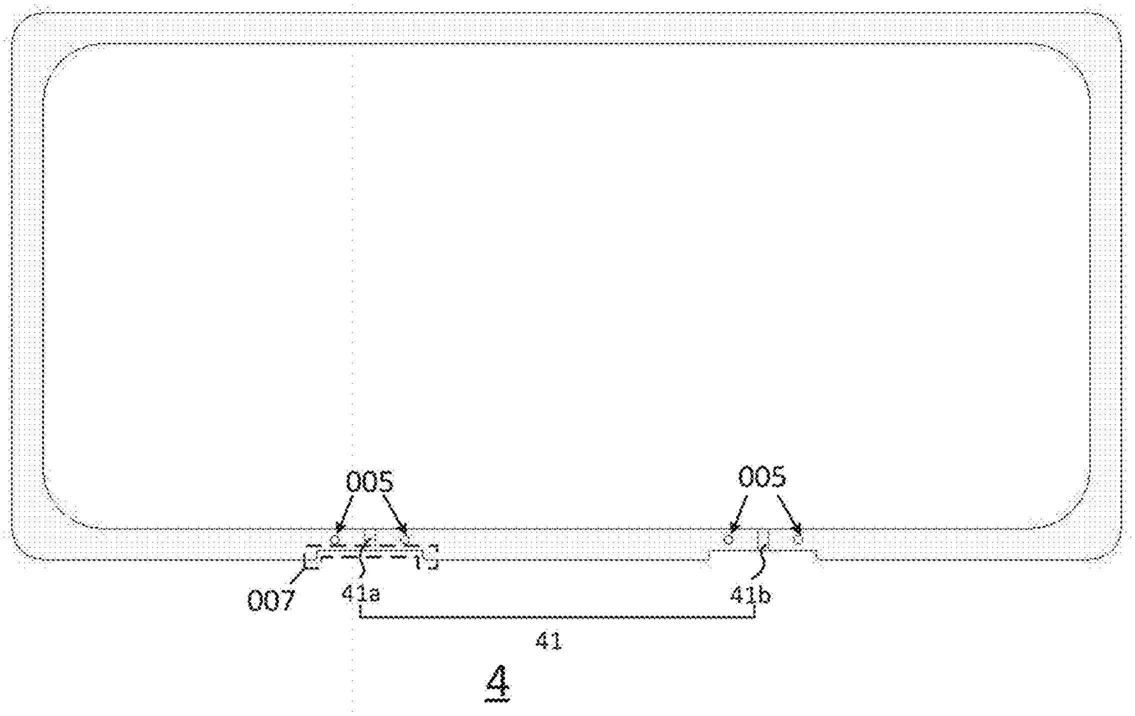
FIG. 22 is a top view of an embodiment of a support frame of an antenna according to an embodiment of the present disclosure.
Figure 23:
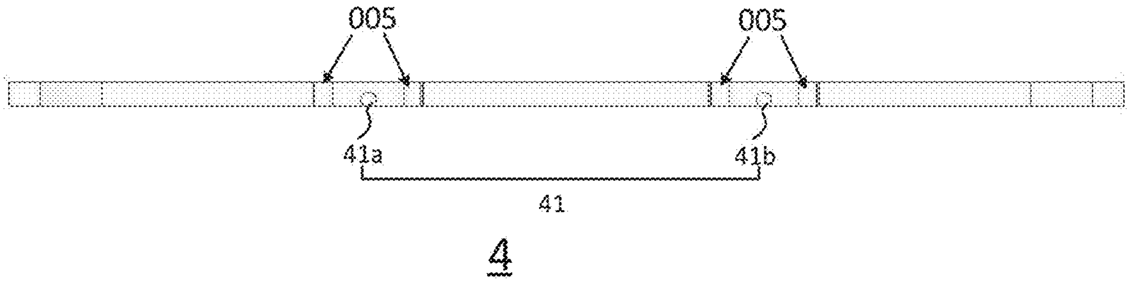
FIG. 23 is a side view of an embodiment of a support frame of an antenna according to an embodiment of the present disclosure.

In some examples, as shown in FIGS. 16 and 21 to 23, FIG. 21 is a schematic diagram of an exemplary structure of a support frame of an antenna according to an embodiment of the present disclosure, FIG. 22 is an exemplary front view of a support frame of an antenna according to the embodiment of the present disclosure, and FIG. 23 is an exemplary side view of a support frame of an antenna according to the embodiment of the present disclosure. The antenna according to the embodiment of the present disclosure has a radiation region and a peripheral region arranged around the radiation region, the second radiation unit 22 and the first radiation unit 12 are both arranged in the radiation region, and the power division feeding structure 3 is also arranged in the radiation region. The antenna according to the embodiment of the present disclosure further includes a support frame 4, and the support frame 4 may be arranged in the peripheral region and configured to support the third substrate 103 and the first substrate 102. The third substrate 103 and the first substrate 102 are supported to form a certain space therebetween, and a hollow portion is formed between the first radiation unit 12 and the third base substrate 1031, so that the signal radiated by the first radiation unit 12 may be fed to the second radiation unit 22 through an air medium in the hollow portion. Compared with the case that the signal is fed to the second radiation unit 22 through a solid medium or a liquid crystal medium, the dielectric constant of air is 1, and the dielectric loss of the signal propagating in the air is close to 0, thereby effectively reducing the dielectric loss. The support frame 3 supports the third substrate 103 and the first substrate 102 to form a space therebetween which is used as a clearance area of the antenna, so that the clearance area of the antenna is increased, and therefore, the bandwidth of the antenna may be effectively increased, and the resonance may be weakened, thereby increasing the radiation efficiency of the antenna.

In some examples, the clearance area of the antenna may be increased by increasing a height of the support frame 4, and the support frame 4 is arranged between the third substrate 103 and the first substrate 102 to support the third substrate 103 and the first substrate 102, so that the height of the support frame 4 may also define a distance between the third substrate 103 and the first substrate 102. Specifically, the height of the support frame 4 may be in a range of 5 mm to 50 mm. For example, the height of the support frame 4 may be 8 mm, so that the distance between the third substrate 103 and the first substrate 102 is 8 mm. A width of the frame body of the support frame 4 may alternatively be in various forms, as long as the second radiation unit 22 and the first radiation unit 12 are not shielded. For example, the width may be 9.5 mm, which is not limited herein.

Figure 25:
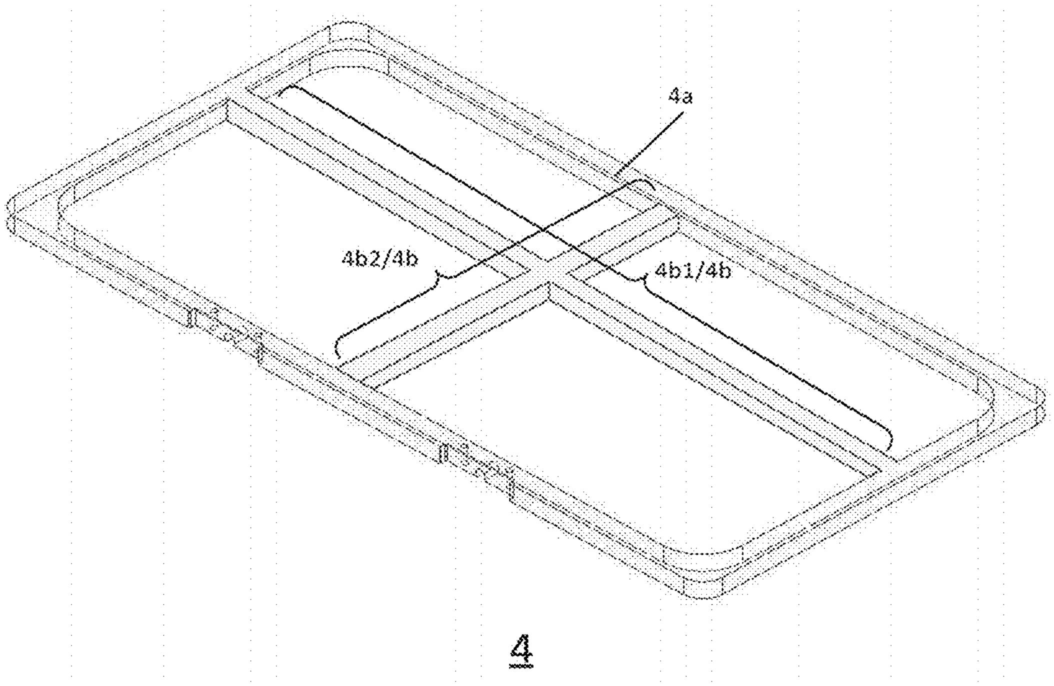
FIG. 25 is a schematic diagram of a structure of another embodiment of a support frame of an antenna according to an embodiment of the present disclosure.

In some examples, referring to FIG. 25, the support frame 4 may further have a main body structure 4*a* and a plurality of auxiliary support portions 4*b*. The main body structure 4*a* is arranged in the peripheral region, the plurality of auxiliary support portions 4*b* are distributed in the radiation region, but the auxiliary support portions 4*b* are not in contact with the second radiation unit 22 and the first radiation unit 12, that is, orthographic projections of the plurality of auxiliary support portions 4*b* on the first base substrate 21 do not overlap orthographic projections of the plurality of second radiation units 22 and the plurality of first radiation units 12 on the first base substrate 21. The support frame 3 formed by the main body structure 4*a* and the plurality of auxiliary support portions 4*b* is configured to support the third substrate 103 and the first substrate 102, and the auxiliary support portions 4*b* may increase the support force of the support frame 4. The auxiliary support portion 4*b* may include various forms, for example, the auxiliary support portion 4*b* may be a plurality of support columns distributed among the plurality of first radiation units 12 in the radiation region. For another example, referring to FIG. 25, the auxiliary support portion 4*b* may include a first auxiliary support portion 4*b*1 and a second auxiliary support portion 4*b*2, an extending direction of the first auxiliary support portion 4*b*1 intersects an extending direction of the second auxiliary support portion 4*b*2, and both ends of the first auxiliary support portion 4*b*1 extend to two opposite sides of the main body structure 4*a* of the support frame 4, respectively; both ends of the second auxiliary support portion 4*b*2 extend to the other two opposite sides of the main body structure 4*a* of the support frame 4, respectively. As shown in FIG. 25, the first auxiliary support portion 4*b*1 and the second auxiliary support portion 4*b*2 intersect with each other and are combined with the main body structure 4*a* to form the support frame 4 shaped like a Chinese character “tian” (which means “farmland” in English). Further, the auxiliary support structures 4*b* and the main body structure 4*a* may be separate structures, and are not connected to each other; the auxiliary support structures 4*b* may alternatively be integrally formed with the main body structure 4*a*, for example, in FIG. 25, the first auxiliary support portion 4*b*1 and the second auxiliary support portion 4*b*2 are integrally formed with the main body structure 4*a* to form the support frame 4 having a shape of a Chinese character “tian”, which is not limited herein.

The support frame 4 may have various shapes, such as a rectangular shape, a circular shape, a hexagonal shape, etc. In the following, the support frame 4 is a rectangular support frame, as an example, which does not limit the present disclosure.

In some examples, the antenna according to the embodiment of the present disclosure may further include a first adhesive layer and a second adhesive layer. The first adhesive layer is located between the support frame 4 and the third substrate 103 and is used for fixing the support frame 4 and the third substrate 103 together, an orthographic projection of the first adhesive layer on the third substrate 103 at least partially overlaps an orthographic projection of the support frame 4 on the third substrate 103. If the first adhesive layer is formed between the support frame 4 and the third substrate 103 according to the pattern of the support frame 4, the orthographic projection of the first adhesive layer on the third substrate 103 completely overlaps the orthographic projection of the support frame 4 on the third substrate 103. The second adhesive layer is located between the support frame 4 and the first substrate 102, and is used for fixing the support frame 4 and the first substrate 102 together, an orthographic projection of the second adhesive layer on the first substrate 102 at least partially overlaps an orthographic projection of the support frame 4 on the first substrate 102. If the second adhesive layer is formed between the support frame 4 and the first substrate 102 according to the pattern of the support frame 4, the orthographic projection of the second adhesive layer on the first substrate 102 completely overlaps the orthographic projection of the support frame 4 on the first substrate 102. The first adhesive layer and the second adhesive layer may each include multiple materials. For example, the first adhesive layer and the second adhesive layer may be made of an Optically Clear Adhesive (OCA), and alternatively, may be made of other materials, which is not limited herein.

In some examples, referring to FIGS. 17 to 23, the antenna according to the embodiment of the present disclosure further includes at least one connecting line 5. Referring to FIGS. 17 and 19, the at least one connecting line 5 is arranged on a side of the first base substrate 21 close to the third substrate 103, that is, the at least one connecting line 5 is arranged in a same layer as the power division feeding structure 3 and the first radiation unit 12. A side of the support frame 4 has at least one opening 41 therein, one end of each connecting line 5 is connected to the first port of one power division feeding structure 3, the other end of the connecting line 5 extends to one opening 41 in the side of the support frame 4, and an external signal line is connected to the connecting line 5 through the opening 41 to transmit a signal (e.g., a radio frequency signal) to the power division feeding structure 3 through the connecting line 5. If the power division feeding structure 3 is a transmission line structure, the power division feeding structure 3 and the connecting line 5 may have a one-piece structure.

In some examples, referring to FIGS. 26 to 31, the antenna according to an embodiment of the present disclosure further includes a first connector 7 and a first fixing plate 8. The first connector 7 is used for connecting an external signal line and the connecting line 5, and the first fixing plate 8 is used for fixing the first connector 7 to the side of the support frame 4. Specifically, referring to FIGS. 27 and 28, the first fixing plate 8 has a first through hole 001 therein, the first connector 7 pass through the first through hole 001 of the first fixing plate 8 and is fixed to the first fixing plate 8, and the first fixing plate 8 is fixed to the side of the support frame 4, so that the first connector 7 is fixed to the support frame 4.

Figure 26:
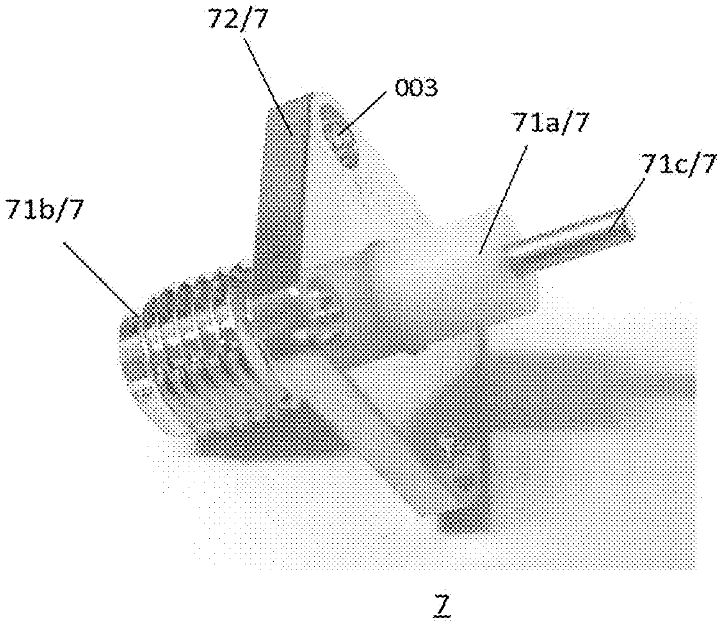
FIG. 26 is a schematic diagram of a structure of an embodiment of a first connector of an antenna according to an embodiment of the present disclosure.

Specifically, referring to FIG. 26, the first connector 7 may include various types of connectors, for example, the first connector 7 may be an SMA (Small A type) connector. The first connector 7 has a first end 71*a* and a second end 71*b*, the first end 71*a* is inserted into the opening 41 in the side of the support frame 4 to be connected to the connecting line 5, and the second end 71*b* of the first connector 7 is connected to an external signal line, so that an external signal is input to the connecting line 5 through the first connector 7.

Further, the first connector 7 has a connecting structure 72 between the first end 71*a* and the second end 71*b*, a conductive pin 71*c* may be provided at a tip of the first end 71*a*, the first end 71*a* is inserted into the opening 41 in the side of the support frame 4, and the conductive pin 71*c* at the tip of the first end 71*a* is connected to the connecting line 5, so as to input a signal to the connecting line 5. The conductive pin 71*c* and the connecting line 5 may be fixed together by solder 006, or alternatively by other fixing manners, which is not limited herein.

Figure 27:
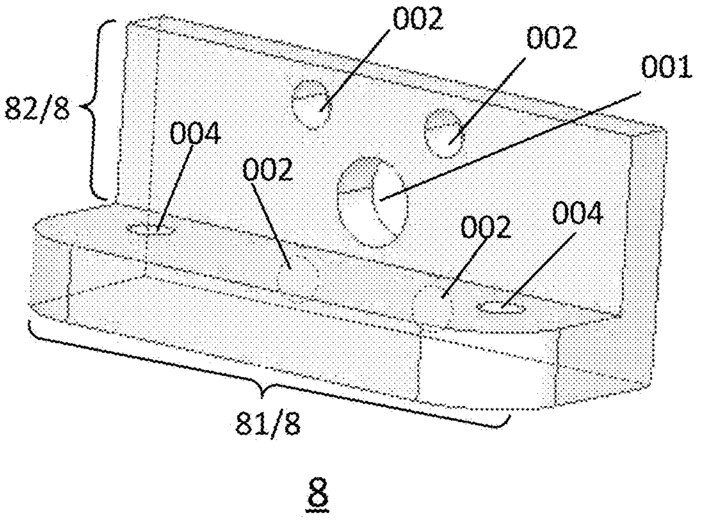
FIG. 27 is a schematic diagram of a structure of an embodiment of a first fixing plate of an antenna according to an embodiment of the present disclosure.
Figure 28:
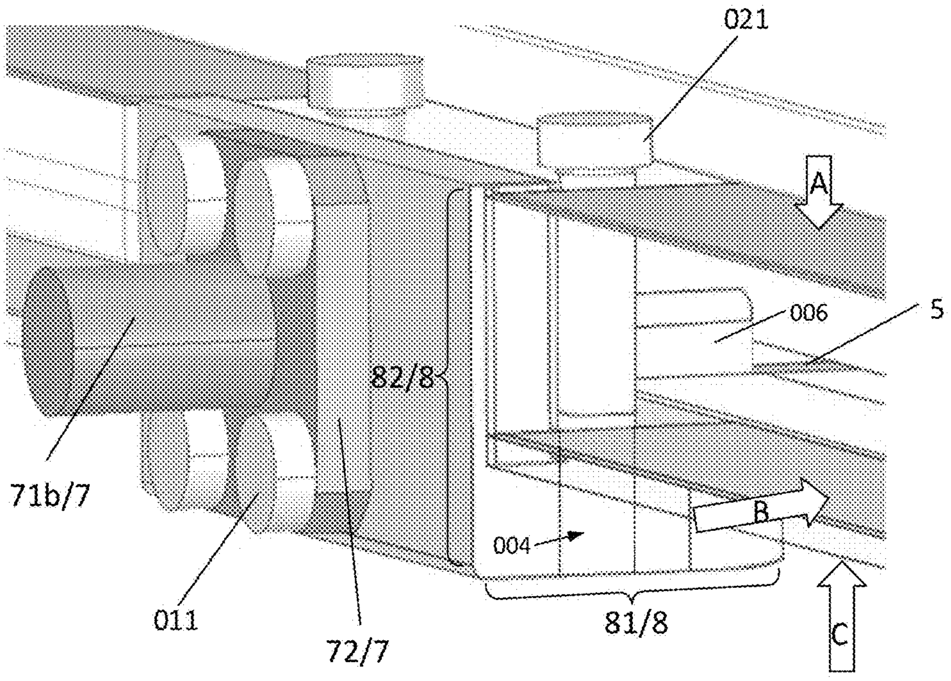
FIG. 28 is a first schematic diagram illustrating a connection among a first connector, a first fixing plate and a support frame of an antenna according to the embodiment of the present disclosure.
Figure 29:
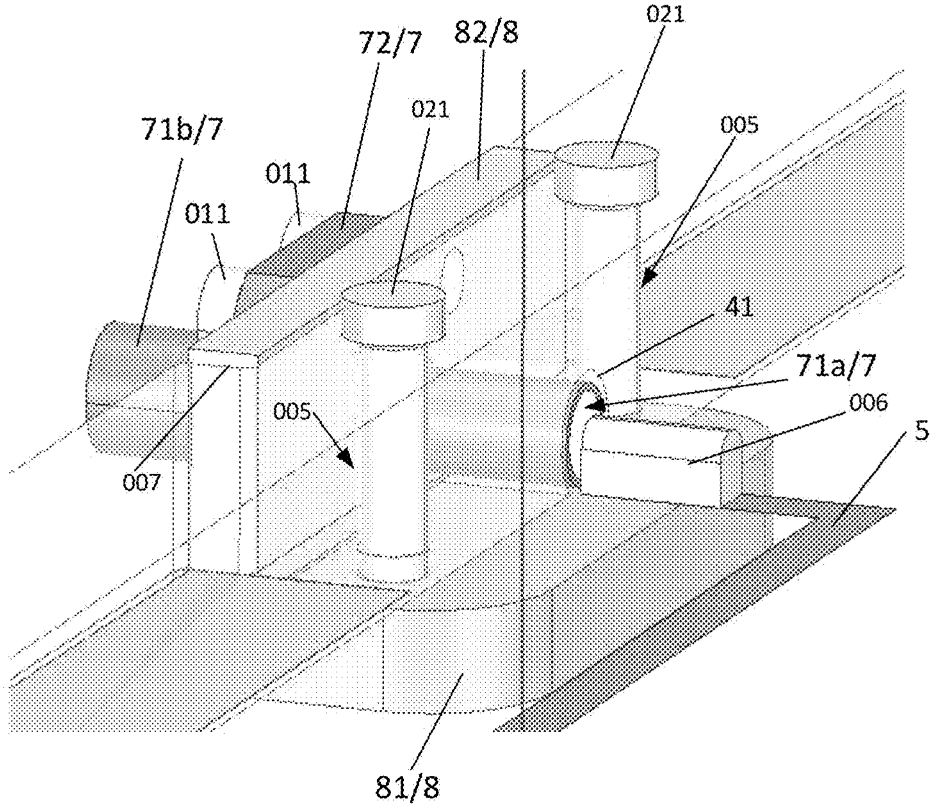
FIG. 29 is a second schematic diagram illustrating a connection among a first connector, a first fixing plate and a support frame of an antenna according to the embodiment of the present disclosure.
Figure 30:
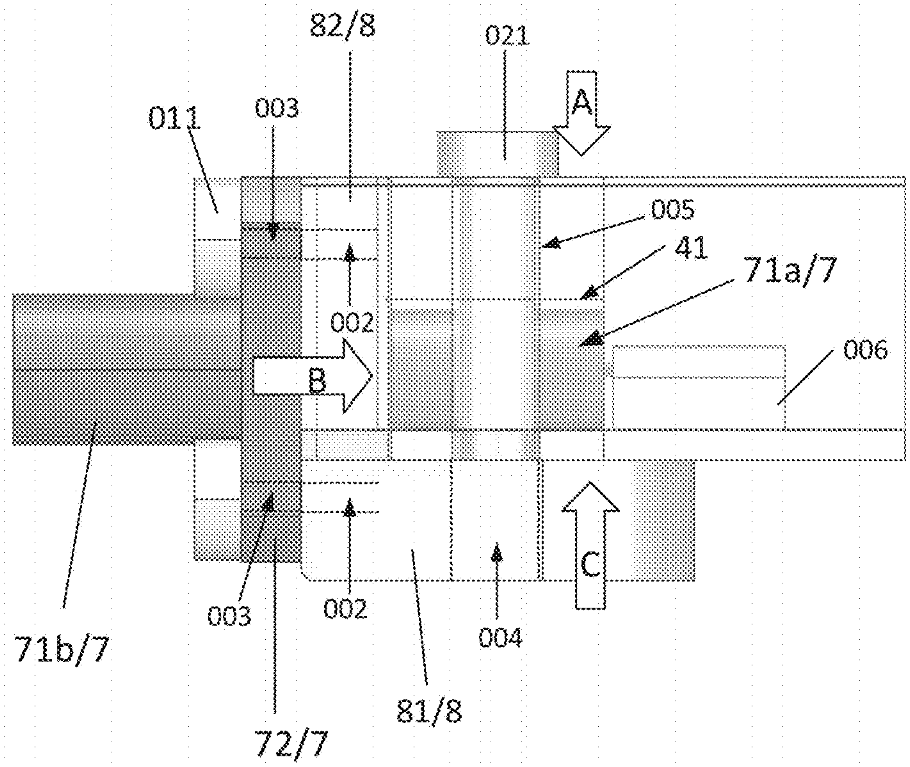
FIG. 30 is a third schematic diagram illustrating a connection among a first connector, a first fixing plate and a support frame of an antenna according to the embodiment of the present disclosure.

In some examples, as shown in FIGS. 27 and 29, as an example, the antenna includes the plurality of first radiation units 12 arranged along the first direction S1, and the antenna includes the first power division feeding structure 31 and the second power division feeding structure 32, accordingly, two openings 41 (i.e., a first opening 41*a* and a second opening 41*b*) may be provided in a side of the support frame 4. The first opening 41*a* and the second opening 41*b* may be provided in the same side of the support frame 4, or may be provided in different sides of the support frame 4, respectively. By taking an example in which the first opening 41*a* and the second opening 41*b* may be provided in the same side of the support frame 4, the first power division feeding structure 31 and the second power division feeding structure 32 are arranged opposite to each other along the arrangement direction (the first direction S1) of the plurality of first radiation units 12, the first power division feeding structure 31 is closer to the first opening 41*a* and the second opening 41*b* than the second power division feeding structure 32. Since the connecting line 5 is connected to the power division feeding structure 31 through each opening 41, the antenna in this embodiment includes a first connecting line 51 and a second connecting line 52. One end of the first connecting line 51 is connected to the first port 31*a* of the first power division feeding structure 31, the other end of the first connecting line 51 extends to the first opening 41*a* in the side of the support frame 4, is connected to the first connector 7 (not shown in FIG. 17) at the first opening 41*a*, receives a signal input from an external signal line through the first connector 7. One end of the second connecting line 52 is connected to the first port 32*a* of the second power division feeding structure 32, the other end of the second connecting line 52 extends to the second opening 41*b* in the side of the support frame 4, receives a signal input from an external signal line through the first connector 7. The first connectors 7 connected to the first connecting line 51 and the second connecting line 52 are different first connectors 7, which may be connected to different external signal lines, respectively, and thus a signal received by the first connecting line 51 may be different from a signal received by second connector 52, so that signals received through the first port 31*a* of the first power division feeding structure 31 and the first port 32*a* of the second power division feeding structure 32 are different from each other. Since the first power division feeding structure 31 is closer to the first opening 41*a* and the second opening 41*b* than the second power division feeding structure 32, and the first opening 41*a* and the second opening 41*b* are arranged in the same side of the support frame 4, a length of the second connecting line 52 connected between the second opening 41*b* and the second power division feeding structure 32 is greater than a length of the first connecting line 51 connected between the first opening 41*a* and the first power division feeding structure 31.

Figure 24:
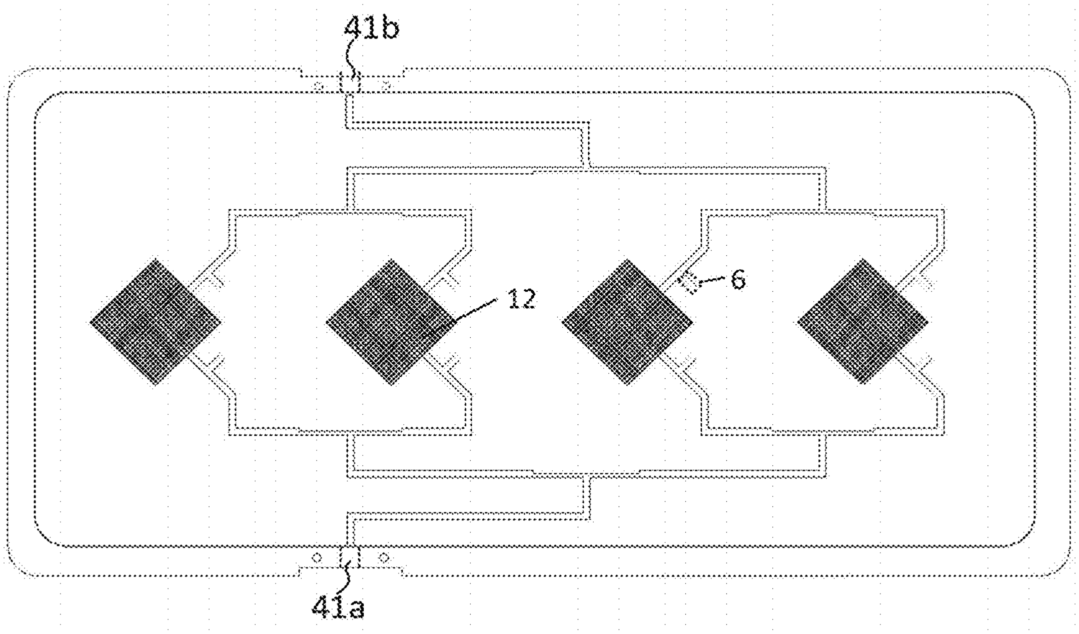
FIG. 24 is a top view of an embodiment of an antenna (with openings arranged on opposite sides) according to an embodiment of the present disclosure.

In some examples, referring to FIG. 24, the openings 41 of the support frame 4 may alternatively be arranged in different sides of the support frame 4. As an example, the antenna includes the plurality of first radiation units 12 arranged along the first direction S1, and the antenna includes the first power division feeding structure 31 and the second power division feeding structure 32, accordingly, two openings 41 (i.e., the first opening 41*a* and the second opening 41*b*) may be provided in a side of the support frame 4. The first opening 41*a* and the second opening 41*b* may be arranged in different sides of the support frame 4, for example, as shown in FIG. 24, the first opening 41*a* and the second opening 41*b* are arranged in two opposite sides of the support frame 4, respectively. The first power division feeding structure 31 and the second power division feeding structure 32 are arranged opposite to each other along the arrangement direction (the first direction S1) of the plurality of first radiation units 12, and the first power division feeding structure 31 is close to the first opening 41*a*, the second power division feeding structure 32 is close to the second opening 41*b*, and thus a length of the second connecting line 52 connected between the second opening 41*b* and the second power division feeding structure 32 may be the same as a length of the first connecting line 51 connected between the first opening 41*a* and the first power division feeding structure 31. In a word, the openings 41 in the support frame 4 may have multiple arrangements, specifically may be provided as required. If the openings 41 are provided on a same side, the antenna may be installed outdoors such that one side of the antenna, in which the openings 41 are provided, is away from the sky, so that the rainwater may be prevented from flowing into the antenna through the openings 41, and the structure inside the antenna may be prevented from being impaired.

In some examples, referring to FIG. 26, the first connector 7 has the main body (including 71*a*, 71*b*, 71*c*) and the connecting structure 72, the main body extends through the connecting structure 72. As shown in FIG. 26, the main body may be a cylindrical interface, the connecting structure 72 may be a connecting plate, a extending direction of the cylindrical interface is perpendicular to an extending direction of the connecting structure 72 as the connecting plate, and the connecting structure 72 is fixed to the first fixing plate 8, so as to fix the first connector 7 to the first fixing plate 8.

In some examples, referring to FIGS. 26 to 31, the first fixing plate 8 may have a bottom plate 81 and a side plate 82, the side plate 82 may be arranged at an edge of the bottom plate 81. If a planar direction of the side plate 82 is perpendicular to a planar direction of the bottom plate 81, an L-shaped first fixing plate 8 is formed. In the following, the first fixing plate 8 is an L-shaped fixing plate as an example. Alternatively, the first fixing plate 8 may have other structures. Specifically, the side plate 82 of the first fixing plate 8 is used for fixing the first connector 7 to the side of the support frame 4, and the bottom plate 81 of the first fixing plate 8 is used for fixing the first fixing plate 8 to the side of the support frame 4. The side plate 82 has a plurality of second through holes 002 therein, the connecting structure 72 of the first connector 7 has a plurality of third through holes 003 therein, the second through holes 002 and the third through holes 003 are in one-to-one correspondence with each other. The antenna further includes a plurality of first fixing members 011, and the first fixing members 011 and the second through holes 002 in the side plate 82 are in one-to-one correspondence with each other. If the side plate 82 of the first fixing plate 8 fixes the first connector 7 to the side of the support frame 4, the first end 71*a* of the main body of the first connector 7 passes through the first through hole 001 in the side plate 82, so that the connecting structure 72 of the first connector 7 abuts against the side plate 82 of the first fixing plate 8, the first end 71*a* of the main body of the first connector 7 is inserted into the opening 41 in the side of the support frame 4, and each first fixing member 011 passes through the second through hole 002 in the side plate 82 of the first fixing plate 8 and the third through hole 003 in the connecting structure 72 of the first connector 7 which abuts against the side plate 82 of the first fixing plate 8, so as to fix the connecting structure 72 and the side plate 82 together, thereby fixing the first connector 7 and the first fixing plate 8 together. The side plate 82 has four second through holes 002 therein, as an example. The four second through holes 002 are distributed on a periphery of the first through hole 001. Four third through holes 003 are also arranged in the connecting structure 72 of the first connector 7, positions of the third through holes 003 correspond to positions of the first through holes 001. Accordingly, the antenna also has four first fixing members 011, each first fixing member 011 is respectively inserted into one second through hole 002 in the side plate 82 and a third through hole 003 in the connecting structure 72 overlapping the second through hole 002, so as to fix the first fixing plate 8 and the first connector 7 together.

In some examples, the first fixing member 011 may be various types of structures, and in an embodiment of the present disclosure, by taking each first fixing member 011 being a screw as an example, the outer side of each first fixing member 011 as a screw is provided with threads, and hole walls of each second through hole 002 and each third through hole 003 are also provided with threads, respectively, the threads on the outer side of the first fixing member 011 are matched with the threads on the hole walls of the second through hole 002 and the third through hole 003, so that the first fixing member 011 as a screw is screwed into the corresponding second through hole 002 and the corresponding third through hole 003, to fix the side plate 82 of the first fixing plate 8 and the connecting structure 72 of the first connector 7 together.

In some examples, as shown in FIGS. 26 to 31, the first fixing plate 8 is fixed on the side of the support frame 4, and the connecting structure 72 of the first connector 7 abuts against a side of the side plate 82 of the first fixing plate 8 away from the side of the support frame 4, and is fixed on the side plate 82 of the first fixing plate 8 by the first fixing members 011. The side of the support frame 4 having the opening 41 has a first surface A, a second surface B, and a third surface C, the second surface B is connected between the first surface A and the third surface C, a plane direction of the first surface A intersects a plane direction of the second surface B, and a plane direction of the third surface C intersects with the plane direction of the second surface B, the plane direction of the first surface A and the plane direction of the third surface C extend in a same direction. The following description will be given by taking as an example that the second surface B extends in a direction perpendicular to the ground, and the first surface A and the third surface C are perpendicular to the second surface B. The bottom plate 81 of the first fixing plate 8 abuts against the third surface C of the side of the support frame 4, the side plate 82 of the first fixing plate 8 abuts against the second surface B of the side of the support frame 4, the opening 41 in the side of the support frame 4 are arranged in the second surface B of the side of the support frame 4, and the first through hole 001 in the side plate 82 of the first fixing plate 8 is arranged corresponding to the opening 41, so that the first end 71*a* of the main body of the first connector 7 passes through the first through hole 001, then is inserted into the opening 41, and is connected to the connecting line 5. The bottom plate 81 of the first fixing plate 8 has two fourth through holes 004 therein, and the two fourth through holes 004 are respectively arranged at two sides of the first through hole 001 in the side plate 82. The side of the support frame 4 has two fifth through holes 005 therein, orthographic projections of the two fifth through holes 005 on the third surface C are respectively located on two sides of the opening 41, the fifth through holes 005 extend along a direction from the third surface C to the first surface A of the side, and an extending direction of the opening 41 is perpendicular to an extending direction of the fifth through holes 005, see FIG. 29, that is, the fifth through holes 005 are through holes in a vertical direction, and the opening 41 is an opening in a direction parallel to the first base substrate 21. If the bottom plate 81 of the first fixing plate 8 is fixed to the third surface C of the side of the support frame 4, an orthographic projection of each fifth through hole 005 in the side on the bottom plate 81 of the first fixing plate 8 has an overlapping area with a corresponding fourth through hole 004 in the bottom plate 81 of the first fixing plate 8, that is, the fifth through holes 005 and the fourth through holes 004 are arranged in a one-to-one correspondence with each other. Accordingly, the bottom plate 81 has two fourth through holes 004 therein, the third surface C of the side has two fifth through holes 005 therein, and the antenna has two second fixing members 021. If the bottom plate 81 of the first fixing plate 8 abuts against the third surface C of the side of the support frame 4, each second fixing member 021 passes through the fourth through hole 004 in the bottom plate 81 of the first fixing plate 8 and the fifth through hole 005 in the third surface C of the side of the support frame 4 abutting against the bottom plate 81 of the first fixing plate 8, so as to fix the third surface C of the side of the support frame 4 and the bottom plate 81 of the first fixing plate 8 together, thereby fixing the side of the support frame 4 and the first fixing plate 8 together. Since the first connector 7 is fixed to the side plate 82 of the first fixing plate 8 through the connecting structure 72, the fixation of the side of the support frame 4 to the first fixing plate 8 is also a fixation of a relative position between the first connector 7 and the side of the support frame 4.

In some examples, the second fixing member 021 may have various types of structures, and in the embodiment of the present disclosure, by taking each second fixing member 021 being a screw as an example, the outer side of each second fixing member 021 as a screw is provided with threads, and hole walls of each fourth through hole 004 and each fifth through hole 005 are also provided with threads, respectively, the threads on the outer side of the second fixing member 021 are matched with the threads on the hole walls of the fourth through hole 004 and the fifth through hole 005, so that the second fixing member 021, which is a screw, is screwed into the corresponding fourth through hole 004 and the corresponding fifth through hole 005, to fix the bottom plate 81 of the first fixing plate 8 and the third surface A of the side of the support frame 4 together.

Figure 31:
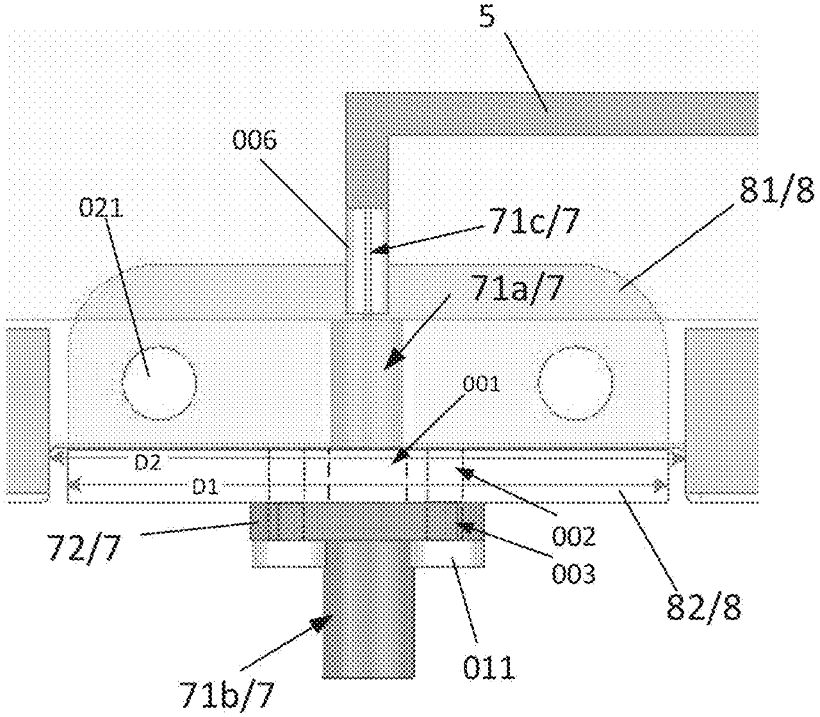
FIG. 31 is a fourth schematic diagram illustrating a connection among a first connector, a first fixing plate and a support frame of an antenna according to the embodiment of the present disclosure.

In some examples, referring to FIGS. 21 to 22 and 28 to 31, the side plate 82 of the first fixing plate 8 abuts against the second surface B of the side of the support frame 4, the second surface B is further provided with a first groove 007, the opening 41 in the side of the support frame 4 is located in the groove bottom of the first groove 007. Referring to FIG. 31, a width D2 of the first groove 007 is not less than a width D1 of the side plate 82 of the first fixing plate 8, i.e., D2 is greater than or equal to D1, so that the side plate 82 of the first fixing plate 8 may be embedded into the first groove 007. The first through hole 001 in the side plate 82 is opposite to the opening 41 in the groove bottom of the first groove 007, so that the first end 71*a* of the first connector 7 may pass through the first through hole 001 and be inserted into the opening 41. The side plate 82 of the first fixing plate 8 may be embedded into the first groove 007, so that the first fixing plate 8 may be tightly combined with the side of the support frame 4, and the first fixing plate 8 will not affect the overall width of the antenna.

In some examples, a second groove is provided on a side of the third base substrate 1031 of the third substrate 103 close to the opening 41 in the side of the support frame 4, and a third groove is provided on a side of the first base substrate 21 of the first substrate 102 close to the opening 41 in the side of the support frame 4. The first groove, the second groove and the third groove are connected to form a groove, that is, an orthographic projection of the first groove on the first base substrate 21 and an orthographic projection of the second groove on the first base substrate 21 at least partially overlap the third groove. If the widths of the first groove, the second groove and the third groove are equal to each other, the orthographic projection of the first groove on the first base substrate 21 and the orthographic projection of the second groove on the first base substrate 21 may completely coincide with the third groove, so that the side plate of the first fixing plate 8 may be embedded into the groove formed by connecting the first groove, the second groove and the third groove to each other, so that the first fixing plate 8 may be tightly combined with the side of the support frame 4, and the first fixing plate 8 will not affect the overall width of the antenna.

In some examples, the connecting lines 5 on the first base substrate 21 of the antenna may be connected to external signal lines in other manners. Specifically, the antenna may include the first connector 7 and a connecting cable (not shown in the drawings). The first connector 7 may include various types of connectors, for example, the first connector 7 may be an SMA (Small A type) connector, the first end 71*a* of the first connector 7 may be an SMA connector having an inner hole, the second end 71*b* of the first connector 7 has a connecting port to which the external signal lines may be connected. A first end of the connecting cable is connected to the first end 71*a* of the first connector 7 through the inner hole of the first end 71*a* of the first connector 7, a second end of the connecting cable passes through the opening 41 in the side of the support frame 4 to be connected to the connecting line 5 extending to the opening 41, the second end 71*b* of the first connector 7 is connected to the external signal line. The external signal line transmits a radio frequency signal to the connecting cable through the first end 71*a* of the first connector 7, the connecting cable inputs the radio frequency signal to the connecting line 5, and the connecting line 5 transmits the radio frequency signal to the power division feeding structure 3. In the connecting mode of the present embodiment, the first fixing plate 8 is unnecessarily arranged, and the opening 41 is only required to be arranged in the side of the support frame 4 rather than the fifth through holes 005. Alternatively, the antenna according to the embodiment of the present disclosure may have other connecting manners, which is not limited herein.

Figure 32:
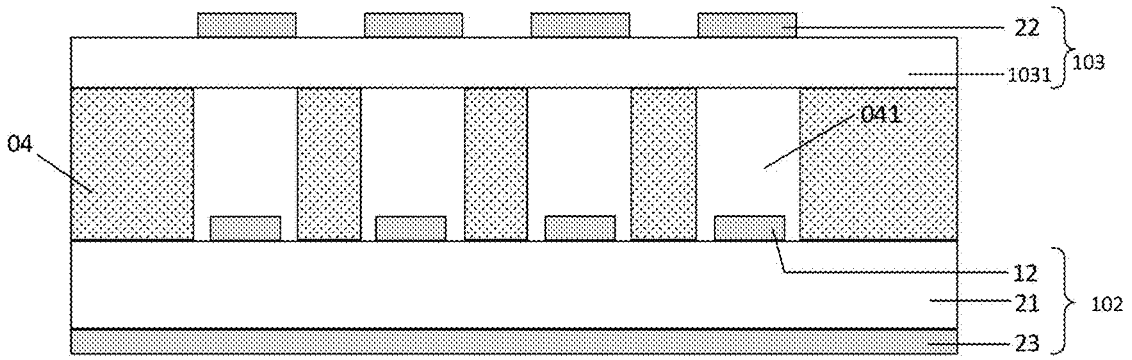
FIG. 32 is a side view of an embodiment of a dielectric substrate of an antenna according to an embodiment of the present disclosure.
Figure 33:
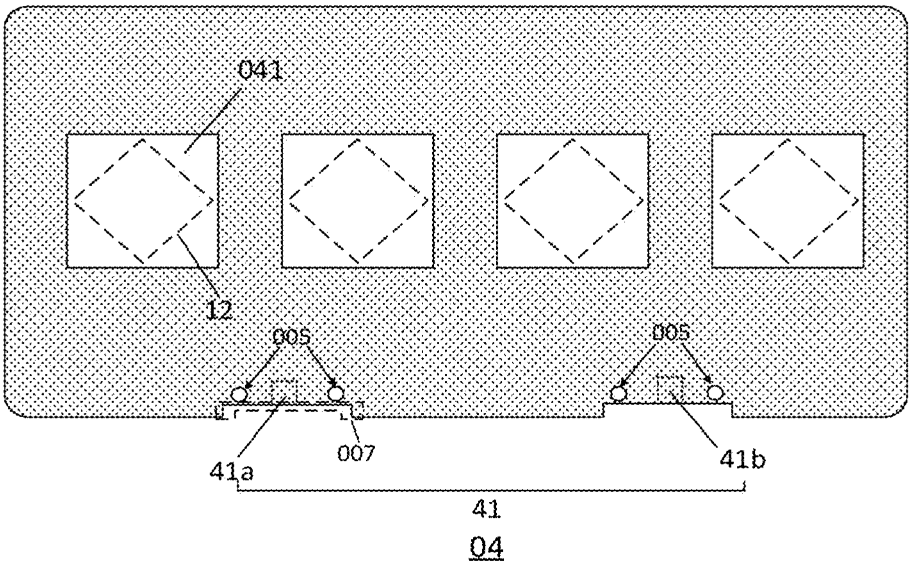
FIG. 33 is a top view of an embodiment of a dielectric substrate of an antenna according to an embodiment of the present disclosure.
Figure 34:
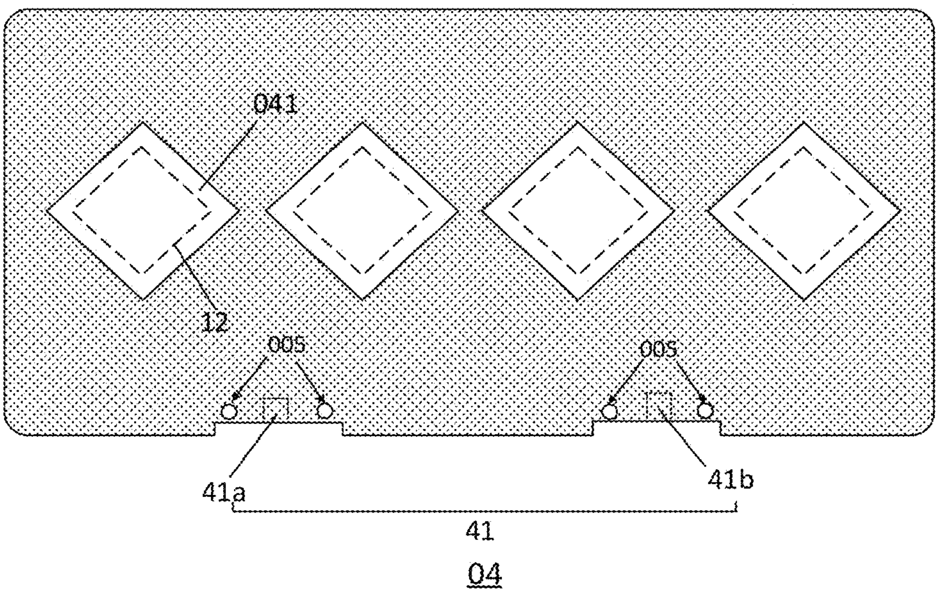
FIG. 34 is a top view of another embodiment of a dielectric substrate of an antenna according to an embodiment of the present disclosure.

In some examples, referring to FIGS. 32 to 34, the antenna according to the embodiment of the present disclosure includes the dielectric layer located between the third substrate 103 and the first substrate 102, the radio frequency signal output by the first radiation unit 12 is fed to the second radiation unit 22 through the dielectric layer, the dielectric layer may include a dielectric substrate 04, the dielectric substrate 04 may be a thick plate, for example, a glass substrate, and alternatively, other materials may be used to form the dielectric substrate 04. Specifically, the dielectric substrate 04 has at least one hollow portion 041, each hollow portion 041 is arranged corresponding to one second radiation unit 22, and also corresponding to one second radiation unit 022, that is, the radio frequency signal radiated by each first radiation unit 12 is fed to one second radiation unit 22 through air medium in the hollow portion 041, then the hollow portion 041 corresponds to the first radiation unit 12 and the second radiation unit 22. Specifically, an orthographic projection of the second radiation unit 22 on the first base substrate 21 is within an orthographic projection, of the hollow portion 041 corresponding to the second radiation unit 22 in the dielectric substrate 04, on the first base substrate 21, and an orthographic projection of the first radiation unit 12 corresponding to the second radiation unit 22 on the first base substrate 21 is within the orthographic projection, of the hollow portion 041 corresponding to the first radiation unit 12 in the dielectric substrate 04, on the first base substrate 21, that is, the hollow portion 041 in the dielectric substrate 04 at least covers the corresponding second radiation unit 22 and the corresponding first radiation unit 12, so that the dielectric layer between the first radiation unit 12 and the second radiation unit 22 is still the air medium, and the transmission loss of the radio frequency signal may be reduced.

Alternatively, as shown in FIG. 34, a shape of the cross section of the hollow portion 041 may be the same as a shape of the second radiation unit 22 or the first radiation unit 12, and an area of the cross section of the hollow portion 041 is not less than an area of the second radiation unit 22 or the first radiation unit 12. As shown in FIG. 33, the shape of the cross section of the hollow portion 041 may be different from the shape of the second radiation unit 22 or the first radiation unit 12, as long as the hollow portion 041 may cover the corresponding second radiation unit 22 or the corresponding first radiation unit 12.

In some examples, the antenna according to the embodiment of the present disclosure may further include a first adhesive layer and a second adhesive layer, where the first adhesive layer is located between the dielectric substrate 04 and the third substrate 103 and is used to fix the dielectric substrate 04 and the third substrate 103 together, an orthographic projection of the first adhesive layer on the third substrate 103 at least partially overlaps an orthographic projection of the dielectric substrate 04, which is provided with the hollow portion 041, on the third substrate 103. If the first adhesive layer is formed between the dielectric substrate 04 and the third substrate 103 according to a pattern of the dielectric substrate 04 which is provided with the hollow portion 041, the orthographic projection of the first adhesive layer on the third substrate 103 completely overlaps the orthographic projection of the dielectric substrate 04, which is provided with the hollow portion 041, on the third substrate 103. The second adhesive layer is located between the dielectric substrate 04 and the first substrate 102 and used for fixing the dielectric substrate 04 and the first substrate 102 together, an orthographic projection of the second adhesive layer on the first substrate 102 at least partially overlaps an orthographic projection of the dielectric substrate 04, which is provided with the hollow portion 041, on the first substrate 102. If the second adhesive layer is formed between the dielectric substrate 04 and the first substrate 102 according to the pattern of the dielectric substrate 04 which is provided with the hollow portion 041, the orthographic projection of the second adhesive layer on the first substrate 102 completely overlaps the orthographic projection of the dielectric substrate 04, which is provided with the hollow portion 041, on the first substrate 102. The first adhesive layer and the second adhesive layer may each include multiple materials, for example, the first adhesive layer and the second adhesive layer may be made of an Optically Clear Adhesive (OCA), and alternatively may also be made of other materials, which is not limited herein.

In some examples, if the antenna according to this embodiment uses the dielectric substrate 04 as a dielectric layer, the dielectric substrate 04 has a plurality of hollow portions 041 therein, and each hollow portion 041 corresponds to one second radiation unit 22. Similarly, the side of the dielectric substrate 04 has at least one opening 41. In the antenna, the first substrate 102 further includes at least one connecting line 5, the at least one connecting line 5 is arranged on a side of the first base substrate 21 close to the third substrate 103, and is arranged in the same layer as the power division feeding structure 3 and the first radiation unit 12, one end of each connecting line 5 is connected to the first port of one power division feeding structure 3, and the other end of the connecting line 5 extends to one opening 41 to be connected to an external signal line through the opening 41.

In some examples, similar to the above-described embodiment where the antenna uses the support frame 4 to support the third substrate 103 and the first substrate 102, the antenna according to the embodiment of the present disclosure may further include the first connector 7 and the first fixing plate 8, where the dielectric substrate 04 is used as a dielectric layer. The first connector 7 is used for connecting an external signal line to the connecting line 5, and the first fixing plate 8 is used for fixing the first connector 7 and the side of the dielectric substrate 04 together. Specifically, the first fixing plate 8 has the first through hole 001, the first connector 7 passes through the first through hole 001 in the first fixing plate 8 and is fixed to the first fixing plate 8, and the first fixing plate 8 is fixed to the side of the dielectric substrate 04, so that the first connector 7 is fixed to the dielectric substrate 04. The first end 71*a* of the first connector 7 is inserted into the opening 41 in the side of the dielectric substrate 04 to be connected to the connecting line 5, and the second end 71*b* of the first connector 7 is connected to an external signal line, so that the external signal is input to the connecting line 5 through the first connector 7. It should be noted that the connecting line 5 may be formed in the dielectric substrate 04, but one end of the connecting line 4 extending to the opening 41 needs to be exposed at the opening 41, to be connected to the first end 71*a* of the first connector 7.

In some examples, similar to the above embodiment in which the antenna uses the support frame 4 to support the third substrate 103 and the first substrate 102, in an embodiment in which the dielectric substrate 04 is used as a dielectric layer, a plurality of openings 41 may be provided on the side of the dielectric substrate 04, and the plurality of openings 41 may be arranged in the same side of the dielectric substrate 04 or arranged in different sides of the dielectric substrate 04, which is not limited herein. Similarly, if the side plate 82 of the first fixing plate 8 fixes the first connector 7 to the side of the dielectric substrate 04, the first end 71*a* of the main body of the first connector 7 passes through the first through hole 001 in the side plate 82, so that the connecting structure 72 of the first connector 7 abuts against the side plate 82 of the first fixing plate 8, the first end 71*a* of the main body of the first connector 7 is inserted into the opening 41 in the side of the dielectric substrate 04, and each first fixing member 011 passes through the second through hole 002 in the side plate 82 of the first fixing plate 8 and the third through hole 003 in the connecting structure 72 of the first connector 7 abutting against the side plate 82 of the first fixing plate 8, so as to fix the connecting structure 72 and the side plate 82 together, thereby fixing the first connector 7 and the first fixing plate 8 together.

In some examples, similar to the above-mentioned embodiment in which the antenna uses the support frame 4 to support the third substrate 103 and the first substrate 102, in the embodiment in which the dielectric substrate 04 is used as a dielectric layer, the first fixing plate 8 is fixed on the side of the dielectric substrate 04, and the connecting structure 72 of the first connector 7 abuts against a side of the side plate 82 of the first fixing plate 8 away from the side of the dielectric substrate 04, and is fixed onto the side plate 82 of the first fixing plate 8 by the first fixing member 011. The side of the dielectric substrate 04 having the opening 41 has the first surface A, the second surface B, and the third surface C, the second surface B is connected between the first surface A and the third surface C, the plane direction of the first surface A intersects the plane direction of the second surface B, and the plane direction of the third surface C intersects the plane direction of the second surface B, the plane direction of the first surface A and the plane direction of the third surface C extend in the same direction. The following description will be given by taking an example that the second surface B extends in a direction perpendicular to the ground, and the first surface A and the third surface C are perpendicular to the second surface B. The bottom plate 81 of the first fixing plate 8 abuts against the third surface C of the side of the dielectric substrate 04, the side plate 82 of the first fixing plate 8 abuts against the second surface B of the side of the dielectric substrate 04, the opening 41 in the side of the dielectric substrate 04 is arranged in the second surface B of the side of the dielectric substrate 04, and the first through hole 001 in the side plate 82 of the first fixing plate 8 is arranged corresponding to the opening 41, so that the first end 71*a* of the main body of the first connector 7 passes through the first through hole 001, then is inserted into the opening 41, and is connected to the connecting line 5. The bottom plate 81 of the first fixing plate 8 has two fourth through holes 004 therein, and the two fourth through holes 004 are respectively arranged at two sides of the first through hole 001. The side of the dielectric substrate 04 has two fifth through holes 005 therein, orthographic projections of the two fifth through holes 005 on the third surface C are respectively located on two sides of the opening 41, the fifth through holes 005 extend along a direction from the third surface C to the first surface A of the side, and an extending direction of the opening 41 is perpendicular to an extending direction of the fifth through hole 005, see FIG. 29, that is, the fifth through holes 005 are through holes in a vertical direction, and the opening 41 is an opening in a direction parallel to the first base substrate 21. If the bottom plate 81 of the first fixing plate 8 is fixed to the third surface C of the side of the dielectric substrate 04, the orthographic projection of the fifth through hole 005 in the side on the bottom plate 81 of the first fixing plate 8 has an overlapping area with the corresponding fourth through hole 004 in the bottom plate 81 of the first fixing plate 8, that is, the fifth through holes 005 and the fourth through holes 004 are arranged in one-to-one correspondence with each other. Accordingly, the bottom plate 81 has two fourth through holes 004 therein, the third surface C of the side has two fifth through holes 005 therein, the antenna has two second fixing members 021. If the bottom plate 81 of the first fixing plate 8 abuts against the third surface C of the side of the dielectric substrate 04, each second fixing member 021 passes through the fourth through hole 004 in the bottom plate 81 of the first fixing plate 8 and the fifth through hole 005 in the third surface C of the side of the dielectric substrate 04 abutting against the bottom plate 81 of the first fixing plate 8, so as to fix the third surface C of the side of the dielectric substrate 04 and the bottom plate 81 of the first fixing plate 8 together, thereby fixing the side of the dielectric substrate 04 and the first fixing plate 8 together. Since the first connector 7 is fixed to the side plate 82 of the first fixing plate 8 by the connecting structure 72, the fixation of the side of the dielectric substrate 04 to the first fixing plate 8 is also a fixation of a relative position between the first connector 7 and the side of the dielectric substrate 04.

In some examples, similar to the above-mentioned embodiment in which the antenna uses the support frame 4 to support the third substrate 103 and the first substrate 102, in an embodiment in which the dielectric substrate 04 is used as a dielectric layer, the side plate 82 of the first fixing plate 8 abuts against the second surface B of the side of the dielectric substrate 04, the second surface B is further provided with a first groove 007, the opening 41 in the side of the dielectric substrate 04 is located in the groove bottom of the first groove 007. Referring to FIG. 31, a width D2 of the first groove 007 is not less than a width D1 of the side plate 82 of the first fixing plate 8, that is, D2 is greater than or equal to D1, the side plate 82 of the first fixing plate 8 may be embedded into the first groove 007, the first through hole 001 in the side plate 82 is opposite to the opening 41 in the groove bottom of the first groove 007, and the first end **71*a* of the first connector 7 may pass through the first through hole 001 and be inserted into the opening 41. The side plate 82 of the first fixing plate 8 may be embedded into the first groove 007, so that the first fixing plate 8 may be tightly combined with the side of the dielectric substrate 04, and the first fixing plate 8** will not affect the overall width of the antenna.

In some examples, similar to the above-mentioned embodiment in which the antenna uses the support frame 4 to support the third substrate 103 and the first substrate 102, in the embodiment in which the dielectric substrate 04 is used as a dielectric layer, the connecting lines 5 on the first base substrate 21 of the antenna may be connected to external signal lines in other manners. Specifically, the antenna may include a first connector 7 and a connecting cable (not shown in the drawings), the first connector 7 may include various types of connectors, for example, the first connector 7 may be a SMA (Small A type) connector, the first end **71*a* of the first connector 7 may be a SMA connector having an inner hole, the second end 71*b* of the first connector 7 has a connecting port to which the external signal lines may be connected. A first end of the connecting cable is connected to the first end 71*a* of the first connector 7 through the inner hole of the first end 71*a* of the first connector 7, a second end of the connecting cable passes through the opening 41 in the side of the dielectric substrate 04 to be connected to the connecting line 5 extending to the opening 41, the second end 71*b* of the first connector 7 is connected to an external signal line. The external signal line transmits a radio frequency signal to the connecting cable through the first end 71*a* of the first connector 7, the connecting cable inputs the radio frequency signal to the connecting line 5, and the connecting line 5 transmits the signal to the power division feeding structure 3. In the connecting mode of the present embodiment, the first fixing plate 8 is unnecessarily arranged, and the opening 41 is only required to be arranged in the side of the dielectric substrate 04 rather than the fifth through hole 005**. Alternatively, the antenna according to the embodiment of the present disclosure may have other connecting manners, which is not limited herein.

In some examples, referring to FIGS. 17 and 19, the antenna according to the embodiment of the present disclosure may further include a plurality of impedance matching structures 6, where an impedance matching structure 6 is connected between each second port of each power division feeding structure 3 and the first radiation unit 12 connected to the second port, and the impedance matching structure 6 is configured to match an impedance between the first radiation unit 12 and the second port of the power division feeding structure 3, so as to reduce transmission loss of a signal. The impedance matching structure 6 may be of various types of structures, for example, as shown in FIGS. 17 and 19, the impedance matching structure 6 is a convex conductive structure connected between each second port of the power division feeding structure 3, which is a transmission line, and the first radiation unit 12 connected to the second port, so that the cross section of the transmission line may be changed, and the impedance of the transmission line may be adjusted. The impedance matching structure 6 may alternatively be a trapezoid electrode, and the cross section of the trapezoid electrode is gradually reduced in a direction from the long side to the short side of the trapezoid electrode, so that the impedance is gradually increased. One of the long side and the short side of the trapezoid electrode is connected to the second port of the power division feeding structure 3, and the other one is connected to the first radiation unit 12, so that the impedance matching may be performed on the second port of the power division feeding structure 3 and the first radiation unit 12, by adjusting a length ratio of the long side to the short side. Alternatively, the impedance matching structure 6 may be of other structures, which is not limited herein. It should be noted that the impedance matching structure 6 may be made of the same material as the power division feeding structure 3, and thus, the impedance matching structure 6 and the power division feeding structure 3 may have a one-piece structure.

The antenna according to the embodiment of the present disclosure may be manufactured as a transparent antenna, and thus, in order to cause the antenna to be transparent, at least one of the second radiation unit 22 and the first radiation unit 12 includes a mesh structure (a metal mesh). If the transparency of the antenna is to be increased, both the second radiation unit 22 and the first radiation unit 12 may be of the mesh structure, and the power division feeding structure 3, the connecting line 5, the impedance matching structure 6, and the like, which are arranged in a same layer as the first radiation unit 12 on a side of the first base substrate 21 close to the third substrate 103, may all be of the mesh structure. Similarly, if the reference electrode layer 24 is arranged on a side of the first base substrate 21 of the first substrate 102 away from the first radiation unit 12 of the antenna, the reference electrode layer 23 may also be of a mesh structure.

In some examples, at least one of the second radiation unit 22, the first radiation unit 12, the power division feeding structure 3, the connecting line 5, the impedance matching structure 6, and the reference electrode layer 23 may be a mesh structure formed by intersecting a plurality of first conductive filaments and a plurality of second conductive filaments, wherein the first conductive filaments and the second conductive filaments extend in different directions. For example, referring to FIGS. 35 and 36, taking the first radiation unit 12 as an example, the first radiation unit 12 may be of a mesh structure formed by intersecting a plurality of first conductive filaments 2211 and a plurality of second conductive filaments 2212, wherein the first conductive filaments 2211 extend along a fourth direction S4, the second conductive filaments 2212 extend along a fifth direction, the fourth direction S4 is not parallel to the fifth direction S5. Specifically, the fourth direction S4 and the fifth direction S5 may be in various manners, for example, referring to FIG. 35, the extending direction of the first conductive filament 2211 (the fourth direction S4) and the extending direction of the second conductive filament 2212 (the fifth direction S5) may be set according to the polarization direction of the first radiation unit 12 (i.e. a direction of the current generated by a signal input by the power division feeding structure 3). For example, the antenna is a dual-polarized antenna having polarization directions at +45° and −45°, as an example, referring to the antenna shown in FIG. 17, the first radiation unit 12 has a polarization direction shown as the sixth direction S6 and a polarization direction shown as the third direction S3, then the extending direction of the first conductive filament 2211 may be parallel to the sixth direction S6, i.e. the fourth direction S4 is parallel to the sixth direction S6; the extending direction of the second conductive filament 2212 may be parallel to the third direction S3, i.e., the fifth direction S5 is parallel to the third direction S3. For another example, referring to FIG. 36, the extending direction of the first conductive filament 2211 (fourth direction S4) and the extending direction of the second conductive filament 2212 (fifth direction S5) may be perpendicular to each other, and alternatively, the extending direction of the first conductive filament 2211 (fourth direction S4) and the extending direction of the second conductive filament 2212 (fifth direction S5) may be arranged in various manners, which is not limited herein. The mesh structures of the second radiation unit 22, the power division feeding structure 3, the connecting line 5, the impedance matching structure 6, and the reference electrode layer 23 are the same as the mesh structure of the first radiation unit 12, and the mesh structures of the second radiation unit 22, the first radiation unit 12, the power division feeding structure 3, the connecting line 5, the impedance matching structure 6, and the reference electrode layer 23 may be the same as or different from each other, which is not limited herein.

In some examples, the conductive filaments of mesh structures of the second radiation unit 22, the first radiation unit 12, the power division feeding structure 3, the connecting line 5, the impedance matching structure 6, and the reference electrode layer 23 may be made of various conductive materials, for example, a metal material such as copper, silver, aluminum, or the like, which is not limited herein. In a case where a width of the conductive filament of a mesh structure is extremely small, human eyes cannot recognize the conductive filament, so that the mesh structure may be regarded as a transparent structure, and the second radiation unit 22, the first radiation unit 12, the power division feeding structure 3, the connecting line 5, the impedance matching structure 6 and the reference electrode layer 23 which adopt the mesh structure may form a transparent antenna.

In some examples, based on the above, if the antenna according to the embodiment of the present disclosure is a transparent antenna, the third base substrate 1031 and the first base substrate 21 may be made of a transparent material. Specifically, the third base substrate 1031 and the first base substrate 21 may be made of various types of transparent materials, for example, the materials of the third base substrate 1031 and the first base substrate 21 may each include at least one of Polyethylene terephthalate (PET) having a thermoplasticity, copolymers of cycloolefin (COC). Accordingly, the support frame 4 or the dielectric substrate 04, which is provided between the third substrate 103 and the first substrate 102 to support the third substrate 103 and the first substrate 102, may be made of a transparent material, for example, the support frame 4 or the dielectric substrate 04 may be made of polymethyl methacrylate (PMMA), or the like.

Figure 37:
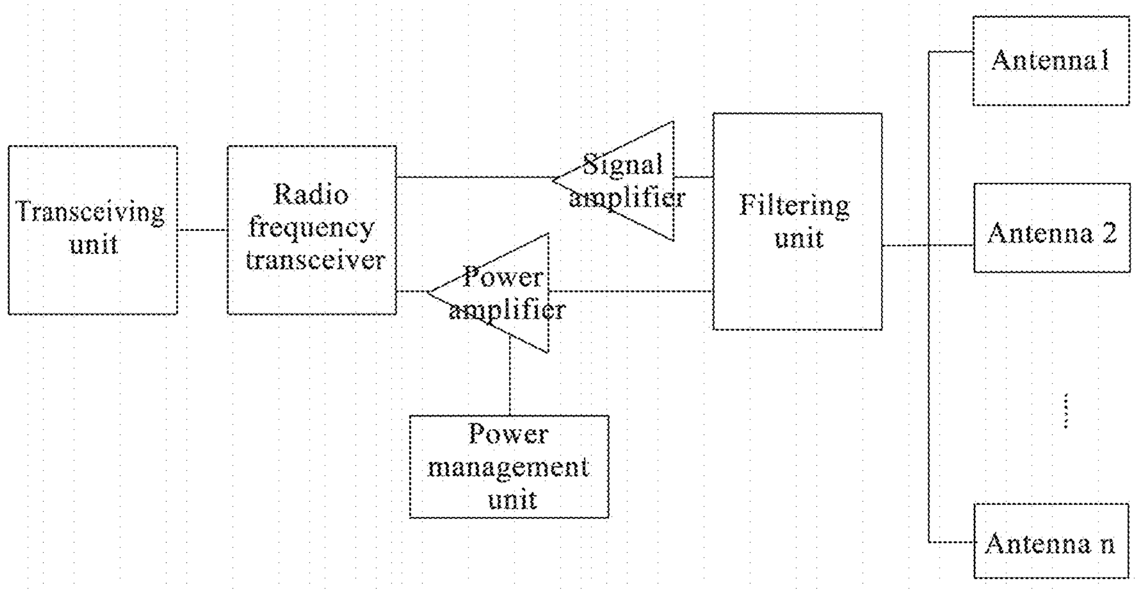
FIG. 37 is a diagram of a system architecture of an embodiment of an antenna system according to an embodiment of the present disclosure.

In a second aspect, referring to FIG. 37, an embodiment of the present disclosure provides an antenna system (i.e., a communication system) including at least one antenna as described above.

In some examples, the antenna system according to an embodiment of the present disclosure further includes a transceiving unit, a radio frequency transceiver, a signal amplifier, a power amplifier, and a filtering unit. The transparent antenna in the antenna system may be used as a transmitting antenna or as a receiving antenna. The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After receiving a signal, the transparent antenna in the antenna system may transmit the signal to a receiving terminal in the transceiving unit after the signal is processed by the filtering unit, the power amplifier, the signal amplifier, and the radio frequency transceiver, where the receiving terminal may be, for example, an intelligent gateway.

Further, the radio frequency transceiver is connected to the transceiving unit and is used for modulating the signals transmitted by the transceiving unit or for demodulating the signals received by the transparent antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The transparent antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Further, the radio frequency transceiver is connected to the signal amplifier and the power amplifier, the signal amplifier and the power amplifier are further connected to the filtering unit, and the filtering unit is connected to at least one antenna. In the process of transmitting a signal by the antenna system, the signal amplifier is used for improving a signal-to-noise ratio of the signal output by the radio frequency transceiver and then transmitting the signal to the filtering unit; the power amplifier is used for amplifying a power of the signal output by the radio frequency transceiver and then transmitting the signal to the filtering unit; the filtering unit specifically includes a duplexer and a filtering circuit, the filtering unit combines signals output by the signal amplifier and the power amplifier into a signal and filters out noise waves and then transmits the signal to the transparent antenna, and the antenna radiates the signal. In the process of receiving a signal by the antenna system, the antenna receives the a signal and then transmits the signal to the filtering unit, the filtering unit filters out noise waves in the signal received by the antenna and then transmits the signal to the signal amplifier and the power amplifier, and the signal amplifier gains the signal received by the antenna and increases the signal-to-noise ratio of the signal; the power amplifier amplifies a power of the signal received by the antenna. The signal received by the antenna is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein.

In some examples, the antenna system according to an embodiment of the present disclosure further includes a power management unit connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various changes and modifications may be made without departing from the spirit and scope of the present disclosure, and these changes and modifications are to be considered within the scope of the present disclosure.

What is claimed is:

1. An antenna, comprising a first substrate, wherein the first substrate comprises:

a first base substrate;

at least one first radiation unit on a side of the first base substrate;

a first electrode layer on a side of the first base substrate away from the at least one first radiation unit; and at least one second radiation unit on a side of the at least one first radiation unit away from the first electrode layer, wherein an orthographic projection of each of the at least one second radiation unit on the first base substrate at least partially overlaps an orthographic projection of a corresponding one of the at least one first radiation unit on the first base substrate; and an orthographic projection of the at least one first radiation unit on the first base substrate is within an orthographic projection of the first electrode layer on the first base substrate, wherein the antenna further comprises a second electrode layer, which is in a same layer as the at least one first radiation unit, wherein the orthographic projection of the at least one first radiation unit on the first base substrate does not overlap an orthographic projection of the second electrode layer on the first base substrate.

2. The antenna according to claim 1, wherein the first base substrate comprises a first side extending in a first direction;

the second electrode layer comprises at least one second sub-electrode;

each of the at least one second sub-electrode is on a side of one of the at least one first radiation unit close to the first side;

each of the at least one second sub-electrode comprises a first structure and a second structure;

the first structure extends along the first direction, and the second structure extends along a second direction; and the first direction intersects with the second direction.

3. The antenna according to claim 2, further comprising a first feeding unit, which is in a same layer as the at least one first radiation unit; wherein the first feeding unit comprises a plurality of first feeding lines, and each of the at least one first radiation unit is electrically connected to at least one of the plurality of first feeding lines.

4. The antenna according to claim 3, wherein every two of the plurality of first feeding lines are electrically connected to one of the at least one first radiation unit, and for each of the at least one first radiation unit, one of the at least one second sub-electrode is between the two first feeding lines electrically connected to the first radiation unit, to isolate signals in the two first feeding lines from each other.

5. The antenna according to claim 1, further comprising a third electrode layer, which is in a same layer as the at least one second radiation unit, wherein an orthographic projection of the at least one second radiation unit on the first base substrate does not overlap an orthographic projection of the third electrode layer on the first base substrate.

6. The antenna according to claim 5, wherein the first base substrate further comprises a second side extending in a first direction;

an orthographic projection of the third electrode layer on the first base substrate is on a side of the first base substrate close to the second side;

the third electrode layer comprises a main body structure, and a first extension structure and a second extension structure which are connected to both sides of the main body structure, respectively, the main body structure extends along the first direction, and the first extension structure and the second extension structure both extend along a second direction; and wherein the first direction and the second direction intersect with each other.

7. The antenna according to claim 1, further comprising a first feeding unit, which is in a same layer as the at least one first radiation unit; wherein the first feeding unit comprises a plurality of first feeding lines, and every two of the plurality of first feeding lines are electrically connected to one of the at least one first radiation unit.

8. The antenna according to claim 7, wherein each of the at least one first radiation unit has a shape of a centrosymmetric pattern having a symmetry center;

for each of the at least one first radiation unit, a position where one of the two first feeding lines is connected to the first radiation unit is a first connecting point, and a position where the other of the two first feeding lines is connected to the first radiation unit is a second connecting point, and wherein for each of the at least one first radiation unit, an extending direction of a connecting line between the first connecting point and the symmetry center of the first radiation unit intersects with an extending direction of a connecting line between the second connecting point and the symmetry center of the first radiation unit.

9. The antenna according to claim 7, further comprising a second substrate; wherein the second substrate comprises a second base substrate and a second feeding unit on a side of the second base substrate and electrically connected to the first feeding unit.

10. The antenna according to claim 9, wherein an included angle is between the second substrate and the first substrate.

11. The antenna according to claim 9, wherein the second feeding unit comprises a first feeding sub-unit and a second feeding sub-unit, each of the first feeding sub-unit and the second feeding sub-unit comprises one first port and at least one second port; and for each of the at least one first radiation unit, one of the two first feeding lines electrically connected to the first radiation unit is electrically connected to one of the at least one second port of the first feeding sub-unit, and different first feeding lines are connected to different second ports of the first feeding sub-unit, respectively; and the other of the two first feeding lines electrically connected to the first radiation unit is electrically connected to one of the at least one second port of the second feeding sub-unit, and different first feeding lines are connected to different second ports of the second feeding sub-unit, respectively.

12. The antenna according to claim 1, further comprising a third substrate, which is on a side of the first substrate away from the first electrode layer;

wherein the third substrate comprises a third base substrate; and wherein the at least one second radiation unit is on a side of the third base substrate.

13. The antenna according to claim 1, further comprising a fourth substrate, which is on a side of the first substrate away from the at least one first radiation unit;

wherein the fourth substrate comprises a fourth base substrate; and wherein the first electrode layer is on a side of the fourth base substrate close to the first substrate.

14. The antenna according to claim 1, wherein the first substrate further comprises a first metal mesh layer, which is on a side of the first base substrate away from the first electrode layer;

the first metal mesh layer comprises the at least one first radiation unit;

the first metal mesh layer has at least one first cutout therein, and each of the at least one first cutout separates out one of the at least one first radiation unit.

15. The antenna according to claim 1, further comprising a third substrate, which is on a side of the first substrate away from the first electrode layer;

wherein the third substrate comprises a third base substrate and a second metal mesh layer on a side of the third base substrate away from the first base substrate;

the second metal mesh layer comprises the at least one second radiation unit;

the second metal layer has at least one second cutout therein, and each of the at least one second cutout separates out one of the at least one second radiation unit.

16. The antenna according to claim 1, wherein at least one first groove is on a side of the first base substrate away from the at least one first radiation unit, and an orthographic projection of each of the at least one first groove on the first base substrate covers an orthographic projection of a corresponding one of the at least one first radiation unit on the first base substrate.

17. The antenna according to claim 10, wherein the first base substrate is divided by the second base substrate into a first region and a second region along a length direction of the first base substrate; and a width of the first region in a direction perpendicular to the length direction of the first base substrate is less than a width of the second region in the direction perpendicular to the length direction of the first substrate.

18. The antenna according to claim 17, further comprising a third substrate, which is on a side of the first substrate away from the first electrode layer;

wherein the third substrate comprises a third base substrate and a surrounding plate obliquely arranged at an edge of the third base substrate;

wherein the at least one second radiation unit is on a side of the third base substrate away from the at least one first radiation unit;

the antenna further comprises a fourth substrate, which is arranged on a side of the first substrate away from the at least one first radiation unit;

the fourth substrate comprises a fourth base substrate;

wherein the first electrode layer is on a side of the fourth base substrate close to the first substrate; and the second base substrate, a part of the third base substrate corresponding to the first region, the surrounding plate closest to the second base substrate and a part of the third base substrate corresponding to the first region define an accommodating space.

19. A communication system, comprising an antenna according to claim 1.

* * * * *